United States Patent [19]

Reed

[11] Patent Number: 5,996,020
[45] Date of Patent: Nov. 30, 1999

[54] MULTIPLE LEVEL MINIMUM LOGIC NETWORK

[75] Inventor: Coke S. Reed, Austin, Tex.

[73] Assignee: National Security Agency, Ft. Meade, Mo.

[21] Appl. No.: 08/505,513

[22] Filed: Jul. 21, 1995

[51] Int. Cl.[6] .................................................. G06F 13/00
[52] U.S. Cl. .......................... 709/238; 709/239; 709/240
[58] Field of Search .............................. 395/200.03, 800, 395/200.62, 200.65, 200.68, 200.69, 200.7, 800.11, 800.12; 370/221

[56] References Cited

U.S. PATENT DOCUMENTS

| | | | |
|---|---|---|---|
| 4,814,980 | 3/1989 | Peterson et al. | 395/200.46 |
| 4,933,836 | 6/1990 | Tulpule et al. | 395/800.12 |
| 5,181,017 | 1/1993 | Frey, Jr. et al. | 340/825.02 |
| 5,253,248 | 10/1993 | Dravida et al. | 370/228 |
| 5,339,396 | 8/1994 | Muramatsu et al. | 395/312 |
| 5,377,333 | 12/1994 | Nakagoshi et al. | 395/312 |
| 5,471,623 | 11/1995 | Napolitano, Jr. | 395/200.03 |
| 5,546,596 | 8/1996 | Geist | 395/200.73 |
| 5,553,078 | 9/1996 | Horie | 370/389 |
| 5,577,029 | 11/1996 | Lu et al. | 379/59 |
| 5,583,990 | 12/1996 | Birrittella et al. | 395/800.29 |
| 5,606,551 | 2/1997 | Kartalopoulos | 370/406 |
| 5,617,413 | 4/1997 | Monacos | 370/400 |

FOREIGN PATENT DOCUMENTS

| | | |
|---|---|---|
| 94 12939 | 6/1994 | WIPO . |
| 95 16240 | 6/1995 | WIPO . |

OTHER PUBLICATIONS

Aruna V. Ramanan, "Ultrafast Space–Time Networkds for Multiprocessors", a thesis, 1993, pp. 1–170.

Malek M., et al.: "The Cylindrical Banyan Multicomputer: A Reconfigurable Systolic Architecture", May 1, 1989, pp. 319–327, Parallel Computing, XP000065558.

Isaac Yi–Yuan Lee et al.: "A Versatile Ring–Connected Hypercube", Jun. 1, 1994, pp. 60–67, IEEE Micro., pp. 60–67, XP000448657.

Narashima Reddy: "I/O Embedding in Hypercubes", Aug. 19, 1988, pp. 331–338, Proceedings of the 1988 Intern'l Conf. on Parallel Processing, Pennsylvania State Univ., XP002016775.

Catier: "Une architecture " hypercube".", Sep. 1986, pp. 59–64, Electronique Industrielle, XP002016776.

Welty: "Hypercube architectures", Jun. 19, 1986, pp. 495–501, AFIPS Conference Proceedings 1986 National Computer Conference, XP002016777.

Proceedings of the Third IEEE Symposium on Parallel and Distributed Processing (Cat. No. 91TH0396–2), Dallas, TX, USA, Dec. 2–5, 1991, ISBN 0–8186–2310–1, Los Alamitos, CA, USA, IEEE Compt. Soc. Press, USA, pp. 564–571.

Young, S.D., et al.: "Adaptive Routing in Generalized Hypercube Architectures", IEEE Symposium, Dec. 2–5, 1991, pp. 564–571, XP002024983.

Gaughan, P.T., et al.: "Adaptive Routing Protocols for Hypercube Interconnection Networks", *Computer*, vol. 26, No. 5, May 1, 1993, pp. 12–16, 17–23, XP000365279.

*Primary Examiner*—Meng-Ai T. An
*Assistant Examiner*—Walter D. Davis, Jr.
*Attorney, Agent, or Firm*—Skjerven, Morrill, MacPherson, Franklin & Friel LLP; Ken J. Koestner

[57] ABSTRACT

A network or interconnect structure utilizes a data flow technique that is based on timing and positioning of messages communicating through the interconnect structure. Switching control is distributed throughout multiple nodes in the structure so that a supervisory controller providing a global control function and complex logic structures are avoided. The interconnect structure operates as a "deflection" or "hot potato" system in which processing and storage overhead at each node is minimized. Elimination of a global controller and buffering at the nodes greatly reduces the amount of control and logic structures in the interconnect structure, simplifying overall control components and network interconnect components and improving speed performance of message communication.

83 Claims, 30 Drawing Sheets

MULTIPLE LEVEL MINIMUM LOGIC NETWORK

FIELD OF THE INVENTION

The present invention relates to interconnection structures for computing and communication systems. More specifically, the present invention relates to multiple level interconnection structures in which control and logic circuits are minimized.

BACKGROUND OF THE INVENTION

Many advanced computing systems, including supercomputers for example, utilize multiple computational units to improve performance in what is called a parallel system. The system of interconnections among parallel computational units is an important characteristic for determining performance. One technique for interconnecting parallel computational units involves construction of a communication network similar to a telephone network in which groups of network elements are connected to switching systems. The switching systems are interconnected in a hierarchical manner so that any switching station manages a workable number of connections.

One disadvantage of a network connection is an increase in the latency of access to another computational unit since transmission of a message traverses several stages of a network. Typically, periods of peak activity occur in which the network is saturated with numerous messages so that many messages simultaneously contend for the use of a switching station. Various network types have been devised with goals of reducing congestion, improving transmission speed and achieving a reasonable cost. These goals are typically attained by rapidly communicating between nodes and minimizing the number of interconnections that a node must support.

One conventional interconnection scheme is a ring of nodes with each node connected to two other nodes so that the line of interconnections forms a circle. The definition of a ring, in accordance with a standard definition of a ring network in the art of computing (*IBM Dictionary of Computing*, McDaniel G. ed., McGraw-Hill, Inc., 1994, p. 584) is a network configuration in which devices are connected by unidirectional transmission links to form a closed path. Another simple conventional scheme is a mesh in which each node is connected to its four nearest neighbors. The ring and mesh techniques advantageously limit the number of interconnections supported by a node. Unfortunately, the ring and mesh networks typically are plagued by lengthy delays in message communication since the number of nodes traversed in sending a message from one node to another may be quite large. These lengthy delays commonly cause a computational unit to remain idle awaiting a message in transit to the unit.

The earliest networks, generally beginning with telephone networks, utilize circuit switching in which each message is routed through the network along a dedicated path that is reserved for the duration of the communication analogous to a direct connection via a single circuit between the communicating parties. Circuit switching disadvantageously requires a lengthy setup time. Such delays are intolerable during the short and quick exchanges that take place between different computational units. Furthermore, a dedicated pathway is very wasteful of system bandwidth. One technique for solving the problems arising using circuit switching is called packet switching in which messages sent from one computational unit to another does not travel in a continuous stream to a dedicated circuit. Instead, each computational unit is connected to a node that subdivides messages into a sequence of data packets. A message contains an arbitrary sequence of binary digits that are preceded by addressing information. The length of the entire message is limited to a defined maximum length. A "header" containing at least the destination address and a sequence number is attached to each packet, and the packets are sent across the network. Addresses are read and packets are delivered within a fraction of a second. No circuit setup delay is imposed because no circuit is set up. System bandwidth is not wasted since there is no individual connection between two computational units. However, a small portion of the communication capacity is used for routing information, headers and other control information. When communication advances in isolated, short bursts, packet switching more efficiently utilizes network capacity. Because no transmission capacity is specifically reserved for an individual computational unit, time gaps between packets are filled with packets from other users. Packet switching implements a type of distributed multiplexing system by enabling all users to share lines on the network continuously.

Advances in technology result in improvement in computer system performance. However, the manner in which these technological advances are implemented will greatly determine the extent of improvement in performance. For example, performance improvements arising from completely optical computing strongly depend on an interconnection scheme that best exploits the advantages of optical technology.

SUMMARY OF THE INVENTION

In accordance with the present invention, a multiple level minimum logic network interconnect structure has a very high bandwidth and low latency. Control of interconnect structure switching is distributed throughout multiple nodes in the structure so that a supervisory controller providing a global control function is not necessary. A global control function is eliminated and complex logic structures are avoided by a novel data flow technique that is based on timing and positioning of messages communicating through the interconnect structure. Furthermore, the interconnect structure implements a "deflection" or "hot potato" design in which processing and storage overhead at each node is minimized by routing a message packet through an additional output port rather than holding the packet until a desired output port is available. Accordingly, the usage of buffers at the nodes is eliminated. Elimination of a global controller and buffering at the nodes greatly reduces the amount of control and logic structures in the interconnect structure, simplifying overall control components and network interconnect components, improving speed performance of message communication and potentially reducing interconnection costs substantially. Implementation of the interconnect structure is highly flexible so that fully electronic, fully optical and mixed electronic-optical embodiments are achieved. An implementation using all optical switches is facilitated by nodes exploiting uniquely simple logic and elimination of buffering at the nodes.

The multiple level minimum logic network interconnect architecture is used for various purposes. For example, in some embodiments the architecture is used as an interconnect structure for a massively parallel computer such as a supercomputer. In other exemplary embodiments, the architecture forms an interconnect structure linking a group of workstations, computers, terminals, ATM machines, elements of a national flight control system and the like.

Another usage is an interconnect structure in various telecommunications applications or an interconnect structure for numerous schedulers operating in a business main frame.

In accordance with one aspect of the present invention, an interconnect apparatus includes a plurality of nodes and a plurality of interconnect lines selectively connecting the nodes in a multiple level structure in which the levels include a richly interconnected collection or rings. The multiple level structure includes a plurality of J+1 levels in a hierarchy of levels and a plurality of $2^J K$ nodes at each level. If integer K is an odd number, the nodes on a level M are situated on $2^{J-M}$ rings with each ring including $2^M K$ nodes. Message data leaves the interconnect structure from nodes on a level zero. Each node has multiple communication terminals. Some are message data input and output terminals. Others are control input and output terminals. For example, a node A on level 0, the innermost level, receives message data from a node B on level 0 and also receives message data from a node C on level 1. Node A sends message data to a node D on level 0 and also sends message data to a device E that is typically outside the interconnect structure. One example of a device E is an input buffer of a computational unit. Node A receives a control input signal from a device F which is commonly outside the interconnect structure. An example of a device F is an input buffer of a computational unit. Node A sends a control signal to a node G on level 1.

All message data enters the interconnect structure on an outermost level J. For example, a node A on level J, the outermost level, receives message data from a node B on level J and also receives message data from a device C that is outside the interconnect structure. One example of device C is an output buffer of a computational unit. Node A sends message data to a node D on level J and also sends message data to a node E on level J−1. Node A receives a control input signal from a node F on level J−1. Node A sends a control signal to a device G that is typically outside the interconnect structure. An example of a device G is an output buffer of a computational unit.

Nodes between the innermost level 0 and the outermost level J communicate message data and control signals among other nodes. For example, a node A on a level T that is neither level 0 or level J receives message data from a node B on level T and also receives message data from a node C on level T+1. Node A sends message data to a node D on level T and also sends message data to a node E on level T−1. Node A receives a control input signal from a node F on level T−1. Node A sends a control signal to a node G on level T+1.

Level M has $2^{J-M}$ rings, each containing $2^M K$ nodes for a total of $2^J K$ nodes on level M. Specifically:

Level 0 has $2^J$ rings, each containing $2^0 K = K$ nodes for a total of $2^J K$ nodes on level 0.

Level 1 has $2^{J-1}$ rings, each containing $1^1 K = 2K$ nodes for a total of $2^J K$ nodes on level 1.

Level 2 has $2^{J-2}$ rings, each containing $2^2 K = 4K$ nodes for a total of $2^J K$ nodes on level M.

Level J−2 has $2^{J-(J-2)} = 4$ rings, each containing $2^{(J-2)} K$ nodes for a total of $2^J K$ nodes on level J−2.

Level J−1 has $2^{J-(J-1)} = 2$ rings, each containing $2^{(J-1)} K$ nodes for a total of $2^J K$ nodes on level J−1.

Level J has $2^{J-J} = 1$ ring containing $2^{(J-0)} K$ nodes for a total of $2^J K$ nodes on level J.

For a ring $R_T$ on a level T which is not the outermost level J, then one ring $R_{T+1}$ on level T+1 exists such that each node A on ring $R_T$ receives data from a node B on ring $R_T$ and a node C on ring $R_{T+1}$. For a ring $R_T$ on a level T which is not the innermost level 0, then there exist exactly two rings $R1_{T-1}$ and $R2_{T-1}$ on level T−1 such that a node A on ring $R_T$ sends message data to a node D on ring $R_T$ and a node E on either ring $R1_{T-1}$ or ring $R2_{T-1}$. A message on any level M of the interconnect structure can travel to two of the rings on level M−1 and is eventually able to travel to $2^M$ of the rings on level 0.

In the following discussion a "predecessor" of a node sends message data to that node. An "immediate predecessor" sends message data to a node on the same ring. A "successor" of a node receives message data from that node. An "immediate successor" receives message data to a node on the same ring.

For a node $A_{RT}$ on ring $R_T$ on level T, there are nodes $B_{RT}$ and $D_{RT}$ on ring $R_T$ of level T such that node $B_{RT}$ is an immediate predecessor of node $A_{RT}$ and node $D_{RT}$ is an immediate successor of node $A_{RT}$. Node $A_{RT}$ receives message data from node $B_{RT}$ and sends message data to node $D_{RT}$. Node $A_{RT}$ receives message data from a device C that is not on the ring $R_T$ and sends data to a device E that is not on ring $R_T$. If the level is not the innermost level 0, then device E is a node on level T−1 and there is an immediate predecessor node F on the same ring as device E. Node $A_{RT}$ receives control information from device F. If node $A_{RT}$ is on node T equal to zero, then device E is outside the interconnect structure and device E sends control information to node $A_{RT}$. For example, if device E is an input buffer of a computational unit, then the control information from device E to node $A_{RT}$ indicates to node $A_{RT}$ whether device E is ready to receive message data from node $A_{RT}$. Node $D_{RT}$ receives message data from a device G that is not on ring $R_T$. Node $A_{RT}$ sends a control signal to device G.

Control information is conveyed to resolve data transmission conflicts in the interconnect structure. Each node is a successor to a node on the adjacent outer level and an immediate successor to a node on the same level. Message data form the immediate predecessor has priority. Control information is send from nodes on a level to nodes on the adjacent outer level to warn of impending conflicts.

When the levels are evenly spaced and the nodes on each ring and each level are evenly spaced, the interconnect structure forms a three-dimensional cylindrical structure. The interconnect structure is fully defined by designating the interconnections for each node A of each level T to devices or nodes B, C, D, E, F and G. Each node or device has a location designated in three-dimensional cylindrical coordinates (r, θ, z) where radius r is an integer which specifies the cylinder number from 0 to J, angle θ is an integer multiple of 2π/K, which specifies the spacing of nodes around the circular cross-section of a cylinder from 0 to K−1, and height z is a binary integer which specifies distance along the z-axis from 0 to $2^J-1$. Height z is expressed as a binary number because the interconnection between nodes in the z-dimension is most easily described as a binary digit manipulation. On the innermost level 0, one ring is spanned in one pass through the angles θ from 0 to K-1 and each height z designates a ring. On level 1, one ring is spanned in two passes through the angles θ and two heights z are used to designate one ring. The ring structure proceeds in this manner through the outermost ring J in which one ring is spanned in all $2^J$ heights along the z-axis.

Node A on a ring R receives message data from a node B, which is an immediate predecessor of node A on ring R. For a node A located at a node position N(r,θ, z), node B is positioned at $N(r,(θ-1) \bmod K, H_r(z))$ on level r. (θ−1) mod K is equal to K−1 when θ is equal to 0 and equal to θ−1 otherwise. The conversion of z to $H_r(z)$ on a level r is described for $z=[z_{J-1}, z_{J-2}, \ldots, Z_r, z_{r-1}, \ldots, z_2, z_1, z_0]$ by reversing the order of low-order z bits from $z_{r-1}$ to $z_0$ into the form $z=[z_{J-1}, z_{J-2}, \ldots, z_r, z_0, z_1, z_2, \ldots, z_{4-1}]$, subtracting one (modulus $2^r$) from the low-order bits and reversing back the modified low-order z bits.

Node A also receives message data from a device C which is not on level r. If node A is positioned on the outermost level r=J, then device C is outside of the interconnect structure. If node A is not positioned on the outermost level, then device C is a node located at position $N(r+1, (\theta-1) \bmod K, z)$ on level r+1.

Node A sends message data to a node D, which is an immediate successor to node A on ring R. Node D is located at node position $N(r, (\theta+1) \bmod K, h_r(z))$ on level r. $(\theta+1) \bmod K$ is equal 0 when $\theta$ is equal to K−1 and equal to $\theta+1$ otherwise. The conversion of z to $h_r(z)$ on a level r is described for $z=[z_{J-1}, z_{J-2}, \ldots, z_r, z_{4-1}, \ldots, z_2, z_1, z_0]$ by reversing the order of low-order z bits from $z_{r-1}$ to $z_0$ into the form $z=[z_{J-1}, z_{J-2}, \ldots, z_r, z_0, z_2, \ldots, z_{4-1}]$, adding one (modulus $2^r$) to the low-order bits and reversing back the low-order z bits.

Note that the term $h_r$ looks forward in z and the term $H_r$ looks backward. Thus, $h_r$ and $H_r$ are mutual inverse so that $H_r(h_r(z))=h_r(H_r(z))=z$.

Node A also sends message data to a device E that is not on the same level r as node A. If node A is on the innermost level r=0, node A at node position $N(r,\theta,z)$ is interconnected with a device (e.g. a computational unit) outside of the interconnect structure. Otherwise, node A is interconnected to send message data to device E, which is a node located at node position $N(r-1,(\theta+1) \bmod K, z)$ on level r−1.

Node A receives control information from a device F. If node A is on the innermost level r=0, the device F is the same as device E. If node A is not on the innermost level, device F is a node which is distinct from the device E. Node F is located at node position $N(r-1,\theta, H_{4-1}(z))$ on level r−1.

Node A sends control information to a device G. If node A is on the outermost level r=J, then device G is positioned outside of the interconnect structure. Device G is a device, for example a computational unit, that sends message data to node D. If node A is not positioned on level r=J, then device G is a node which is located at node position $N(r+1,\theta h_r(z))$ on level r+1 and device G sends message data to node D.

In accordance with a second aspect of the present invention, a method is shown of transmitting a message from a node N to a target destination in a first, a second and a third dimension of three dimensions in an interconnect structure arranged as a plurality of nodes in a topology of the three dimensions. The method includes the steps of determining whether a node en route to the target destination in the first and second dimensions and advancing one level toward the destination level of the third dimension is blocked by another message, advancing the message one level toward the destination level of the third dimension when the en route node is not blocked and moving the message in the first and second dimensions along a constant level in the third dimension otherwise. This method further includes the step of specifying the third dimension to describe a plurality of levels and specifying the first and second dimensions to described a plurality of nodes on each level. A control signal is sent from the node en route to the node N on a level g in the third dimension, the control signal specifying whether the node en route is blocked. Transmission of a message is timed using a global clock specifying timing intervals to keep integral time modulus the number of nodes at a particular cylindrical height, the global clock time interval being equal to the second time interval and the first time interval being smaller than the global time interval. A first time interval α is set for moving the message in only the first and second dimensions. A second time interval α−β is set for advancing the message one level toward the destination level. A third time interval is set for sending the control signal from the node en route to the node N, the third time interval being equal to β.

In accordance with a third aspect of the present invention, a method is shown of transmitting a message from an input device to an output device through an interconnect structure. The message travels through the interconnect structure connecting a plurality of nodes in a three dimensional structure. The message has a target destination corresponding to a target ring on level 0 of the interconnect structure. A message M at a node N on level T en route to a target ring on level 0 advances to a node N' on level T−1 so long as the target ring is accessible from node N' and no other higher priority message is progressing to node N' to block the progress of message M. Whether the target ring is accessible from node N' is typically efficiently determined by testing a single bit of a binary code designating the target ring. Whether a higher priority message is blocking the progress of message M is efficiently determined using timed control signals. If a message is blocked at a time t, the message is in position to progress to the next level at time t+2. If a message is blocked by a message M' on level T−1, then a limited time duration will transpire before the message M' is able to block message M again.

A global clock controls traffic flow in the interconnect structure. Data flow follows rules that allow much of the control information to be "hidden" in system timing so that, rather than encoding all control information in a message packet header, timing considerations convey some information. For example, the target ring is encoded in the message packet header but, in some embodiments of the interconnect structure, designation of the target computational unit is determined by the timing of arrival of a message with respect to time on the global clock.

The disclosed multiple level interconnect structure has many advantages. One advantage is that the structure is simple, highly ordered and achieves fast and efficient communication for systems having a wide range of sizes, from small systems to enormous systems.

In addition, the interconnect structure is highly advantageous for many reasons. The interconnect structure resolves contention among messages directed toward the same node and ensures that a message that is blocked makes a complete tour of the nodes on a level before the blocking message is in position to block again. In this manner, a message inherently moves to cover all possible paths to the next level. A blocking message typically proceeds to subsequent levels so that overlying message are not blocked for long.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION

Figure 1A:
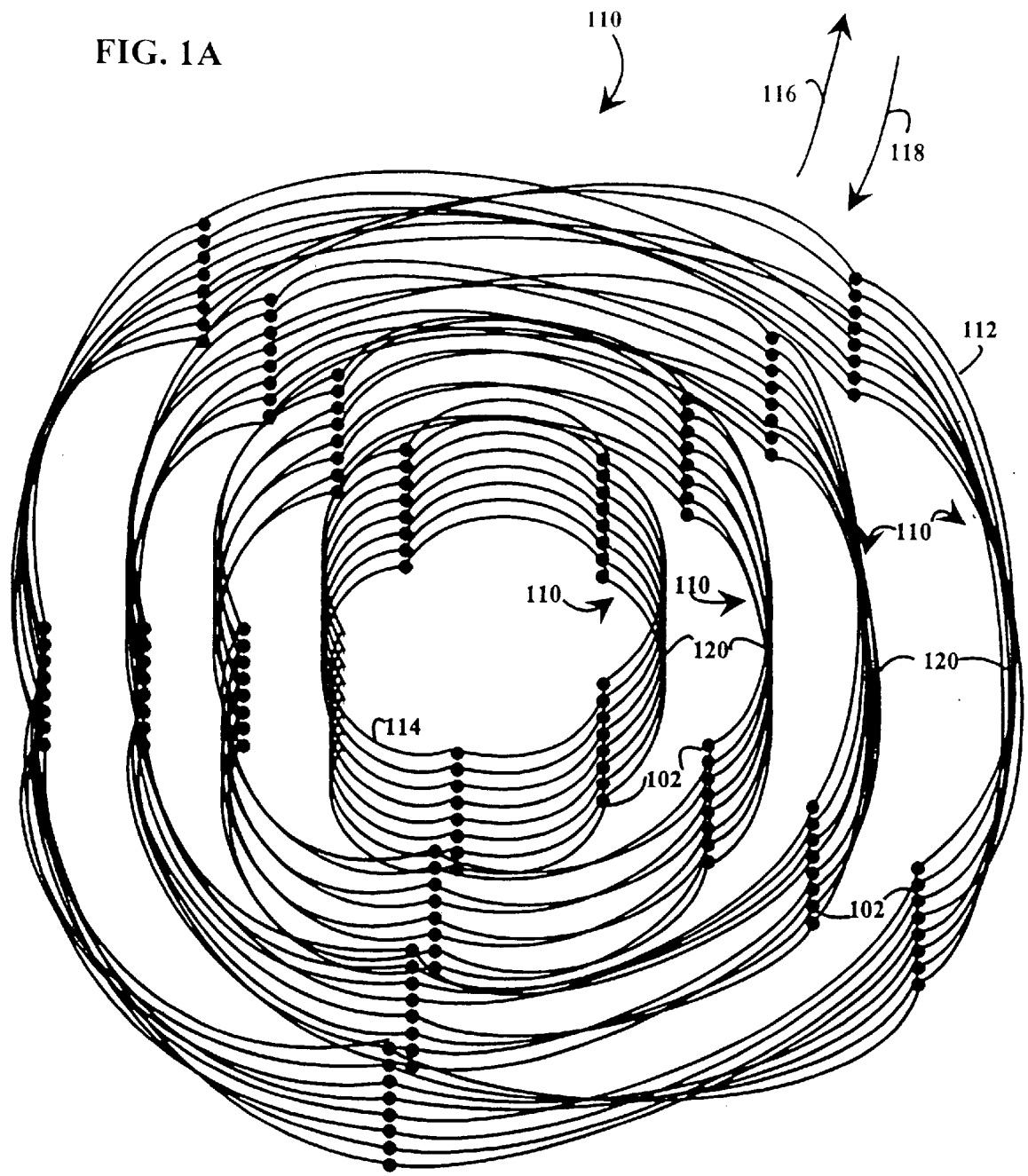
FIGS. 1A, 1B, 1C and 1D are abstract three-dimensional pictorial illustrations of the structure of an embodiment of a multiple level minimum logic interconnect apparatus.

Referring to FIGS. 1A, 1B, 1C and 1D, an embodiment of a multiple level minimum logic interconnect apparatus 100 includes multiple nodes 102 which are connected in a multiple level interconnect structure by interconnect lines. The multiple level interconnect structure is shown illustratively as a three-dimensional structure to facilitate understanding.

The nodes 102 in the multiple level interconnect structure are arranged to include multiple levels 110, each level 110 having a hierarchical significance so that, after a message is initiated in the structure, the messages generally move from an initial level 112 to a final level 114 in the direction of levels of a previous hierarchical significance 116 to levels of a subsequent hierarchical significance 118. Illustratively, each level 110 includes multiple structures which are called rings 120. Each ring 120 includes multiple nodes 102. The term "rings" is used merely to facilitate understanding of the structure of a network in the abstract in which visualization of the structure as a collection of concentric cylindrical levels 110 is useful.

Figure 1B:
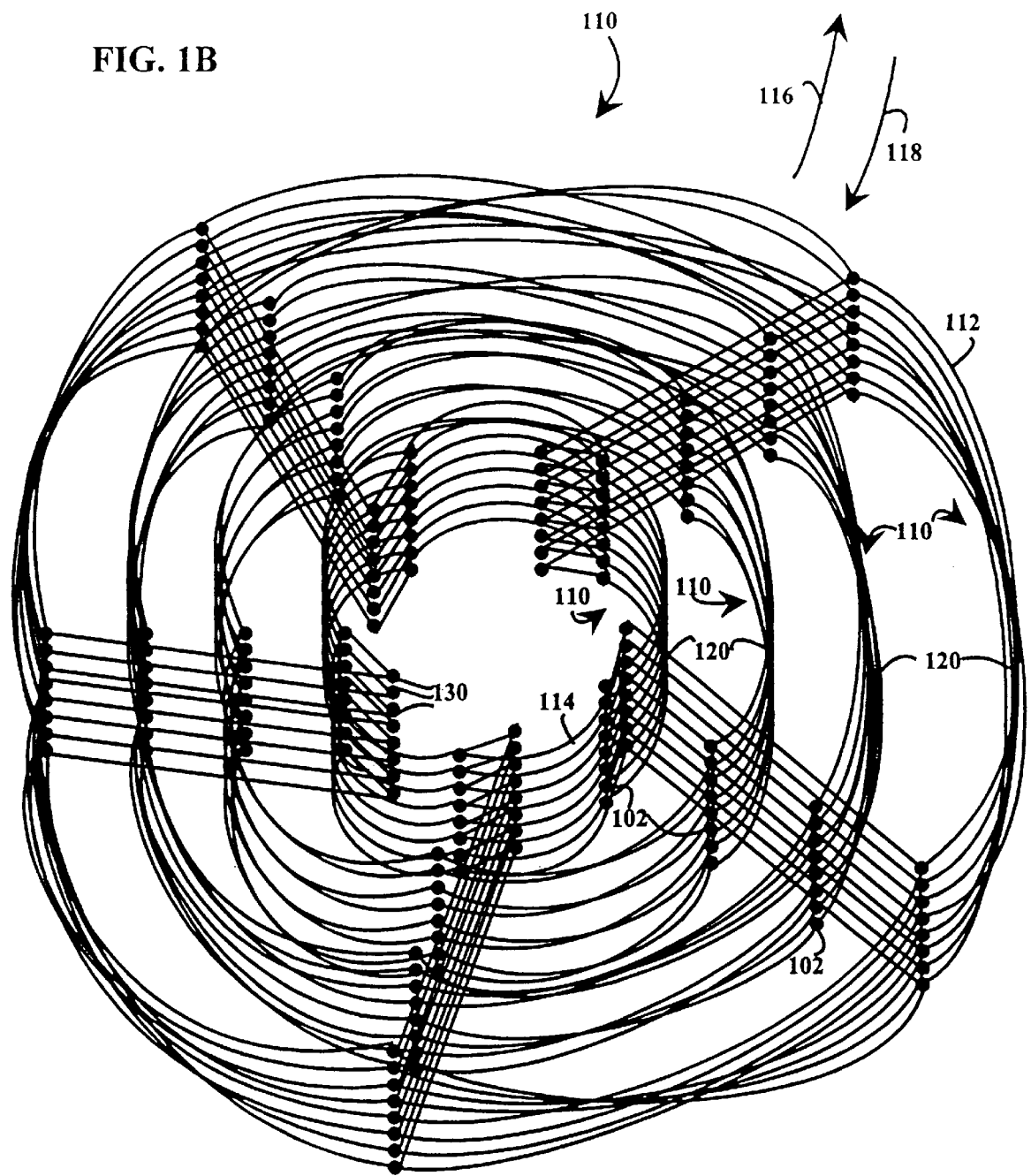
Figure 1C:
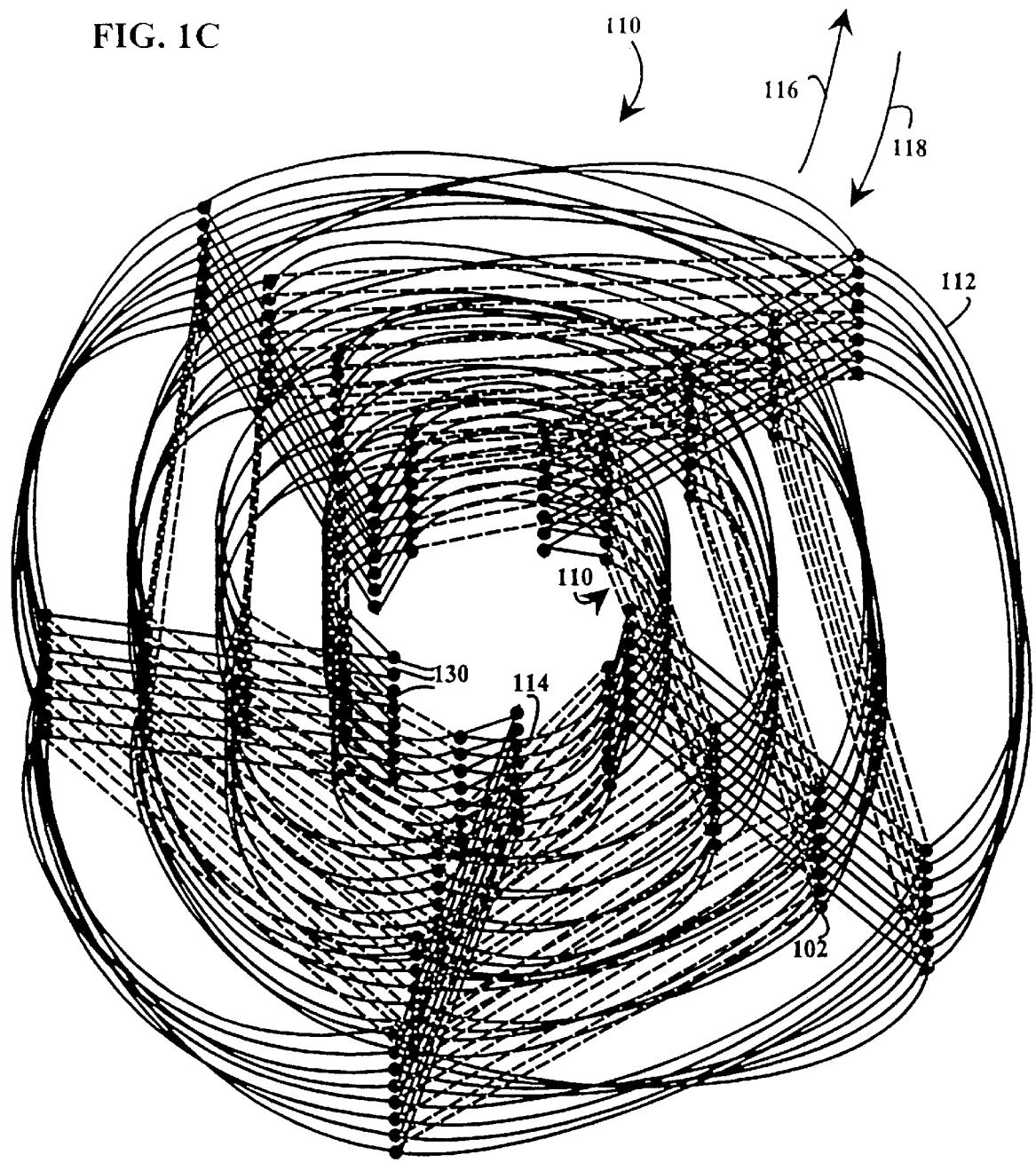
Figure 1D:
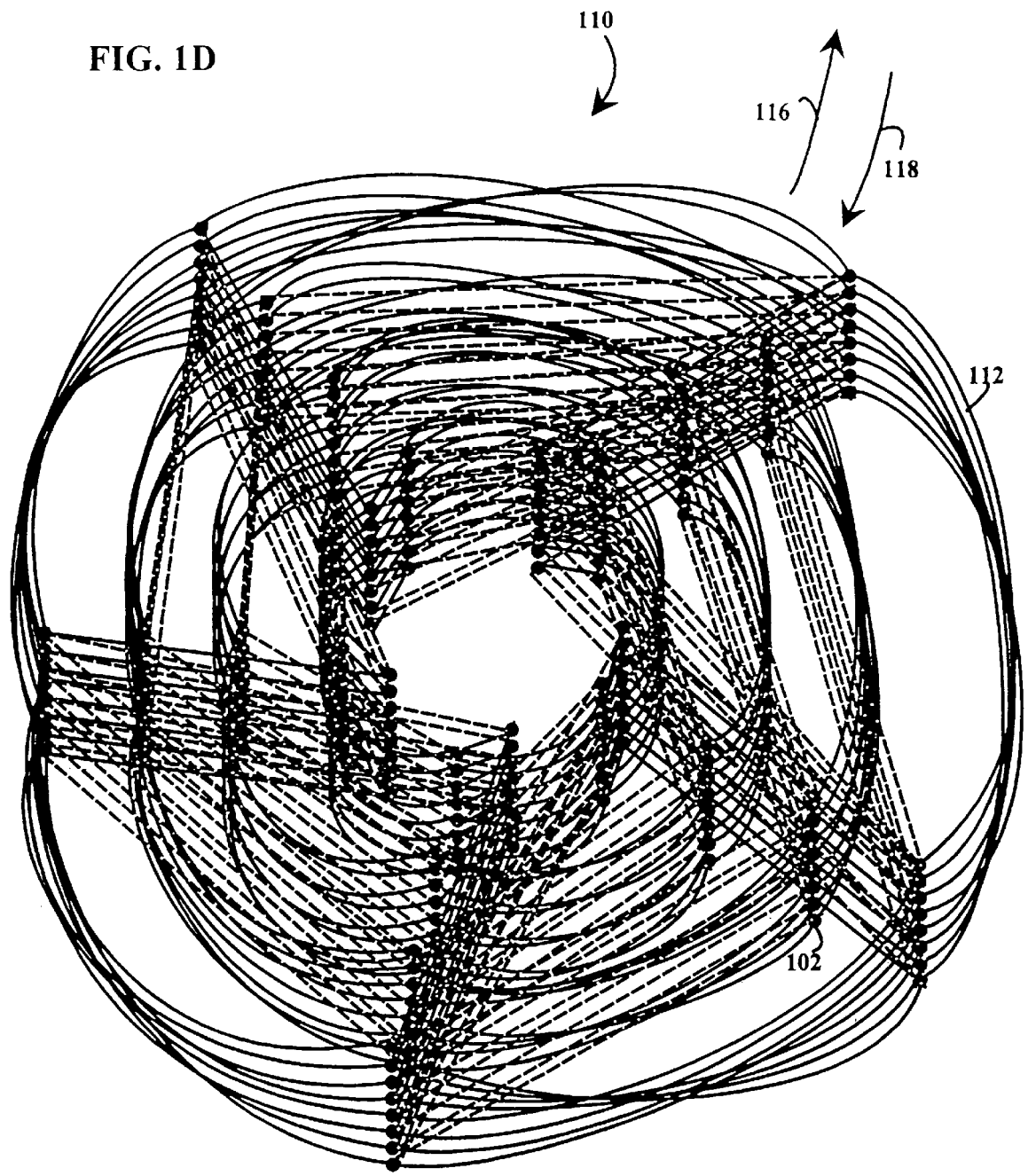

The different FIGS. 1A, 1B, 1C and 1D are included to more easily visualize and understand the interconnections between nodes. FIG. 1A illustrates message data transmission interconnections between nodes 102 on the various cylindrical levels 110. FIG. 1B adds a depiction of message data transmission interconnections between nodes 102 and devices 130 to the interconnections illustrated in FIG. 1A. FIG. 1C further shows message data interconnection between nodes 102 on different levels. FIG. 1D cumulatively shows the interconnections shown in FIG. 1A, 1B and 1C in addition to control interconnections between the nodes 102.

The actual physical geometry of an interconnect structure is not to be limited to a cylindrical structure. What is important is that multiple nodes are arranged in a first class of groups and the first class of groups are arranged into a second class of groups. Reference to the first class of groups as rings and the second class of groups as levels is meant to be instructive but not limiting.

The illustrative interconnect apparatus 100 has a structure which includes a plurality of J+1 levels 110. Each level 110 includes a plurality of $2^J K$ nodes 102. Each level M contains $2^{J-M}$ rings 120, each containing $2^M K$ nodes 102. The total number of nodes 102 in the entire structure is $(J+1)2^J K$. The interconnect apparatus 100 also includes a plurality $2^J K$ devices 130. In the illustrative embodiment, each device of the $2^J K$ devices 130 is connected to a data output port of each of the K nodes 102 in each ring of the $2^J$ rings of the final level 114. Typically, in an interconnect structure of a computer a device 130 is a computational unit such as a processor-memory unit or a cluster of processor-memory units and input and output buffers.

Figure 2:
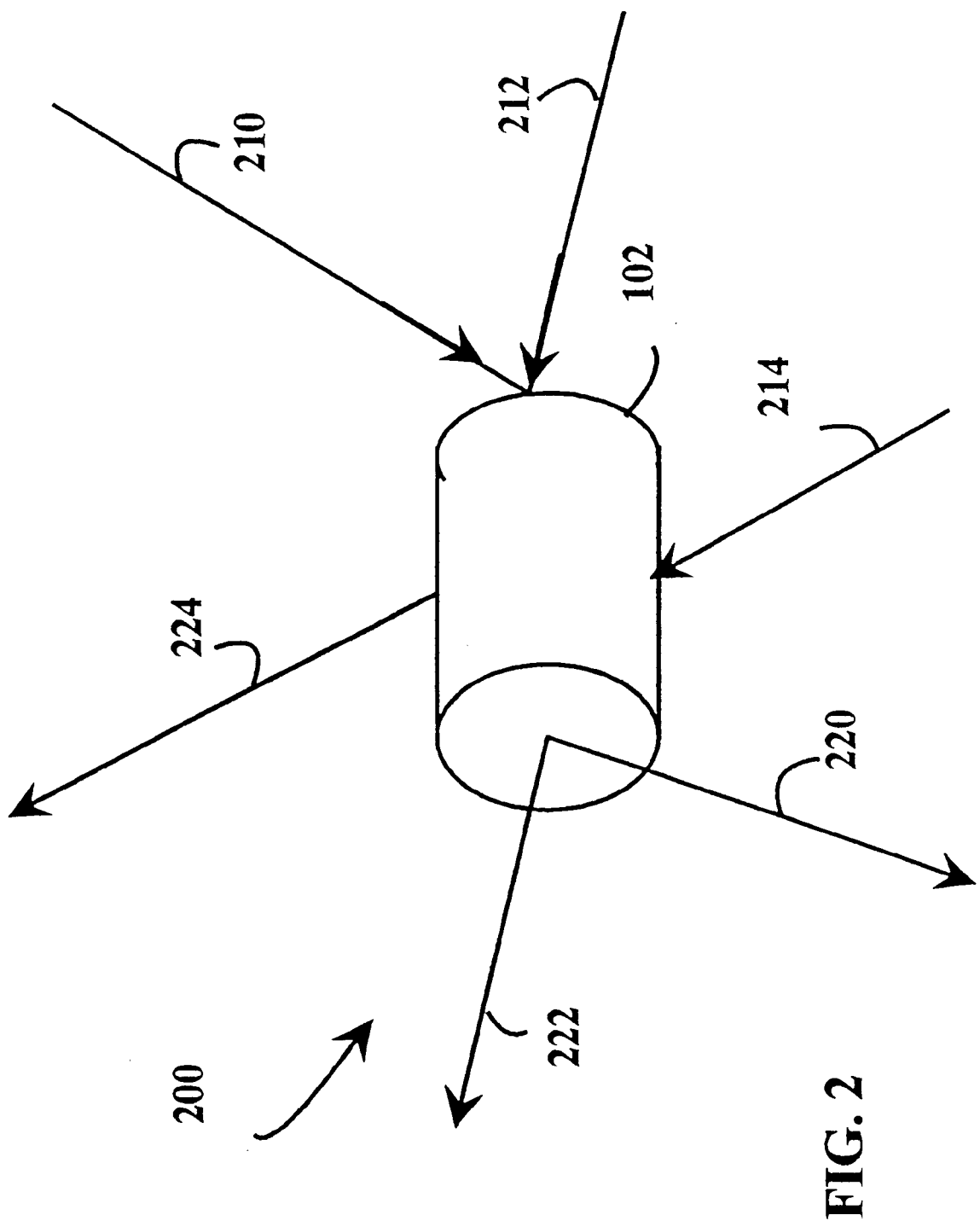
FIG. 2 is a schematic diagram of a node, node terminals and interconnection lines connected to the terminals.

Referring to FIG. 2, an interconnect structure 200 of a node 102 has three input terminals and three output terminals. The input terminals include a first data input terminal 210, a second data input terminal 212 and a control input terminal 214. The output terminals include a first data output terminal 220, a second data output terminal 222 and a control output terminal 224. The data input and output terminals of a node communicate message data with other nodes. The control terminals communicate control bits with other nodes for controlling transmission of message data. The number of control bits for controlling message transmission is efficiently reduced since much of the logic throughout the interconnect structure 200 is determined by timing of the receipt of control bits and message data in a manner to be detailed hereinafter. Only one control bit enters a node and only one control bit leaves at a given time step. Messages are communicated by generating a clock signal for timing time units. Message transmission is controlled so that, during one time unit, any node 102 receives message data from only one input terminal of the data input terminals 212 and 214. Since, a node 202 does not have a buffer, only one of the node's output ports is active in one time unit.

Referring to FIGS. 3 through 16, the topology of an interconnect structure 300 is illustrated. To facilitate understanding, the structure 300 is illustrated as a collection of concentric cylinders in three dimensions r, θ and z. Each node or device has a location designated (r, θ, z) which relates to a position (r, 2πθ/K, z) in three-dimensional cylindrical coordinates where radius r is an integer which specifies the cylinder number from 0 to J, angle θ is an integer which specifies the spacing of nodes around the circular cross-section of a cylinder from 0 to K−1, and height z is a binary integer which specifies distance along the z-axis from 0 to $2^J-1$. Height z is expressed as a binary number because the interconnection between nodes in the z-dimension is most easily described as a manipulation of binary digits. Accordingly, an interconnect structure 300 is defined with respect to two design parameters J and K.

Figure 3A:
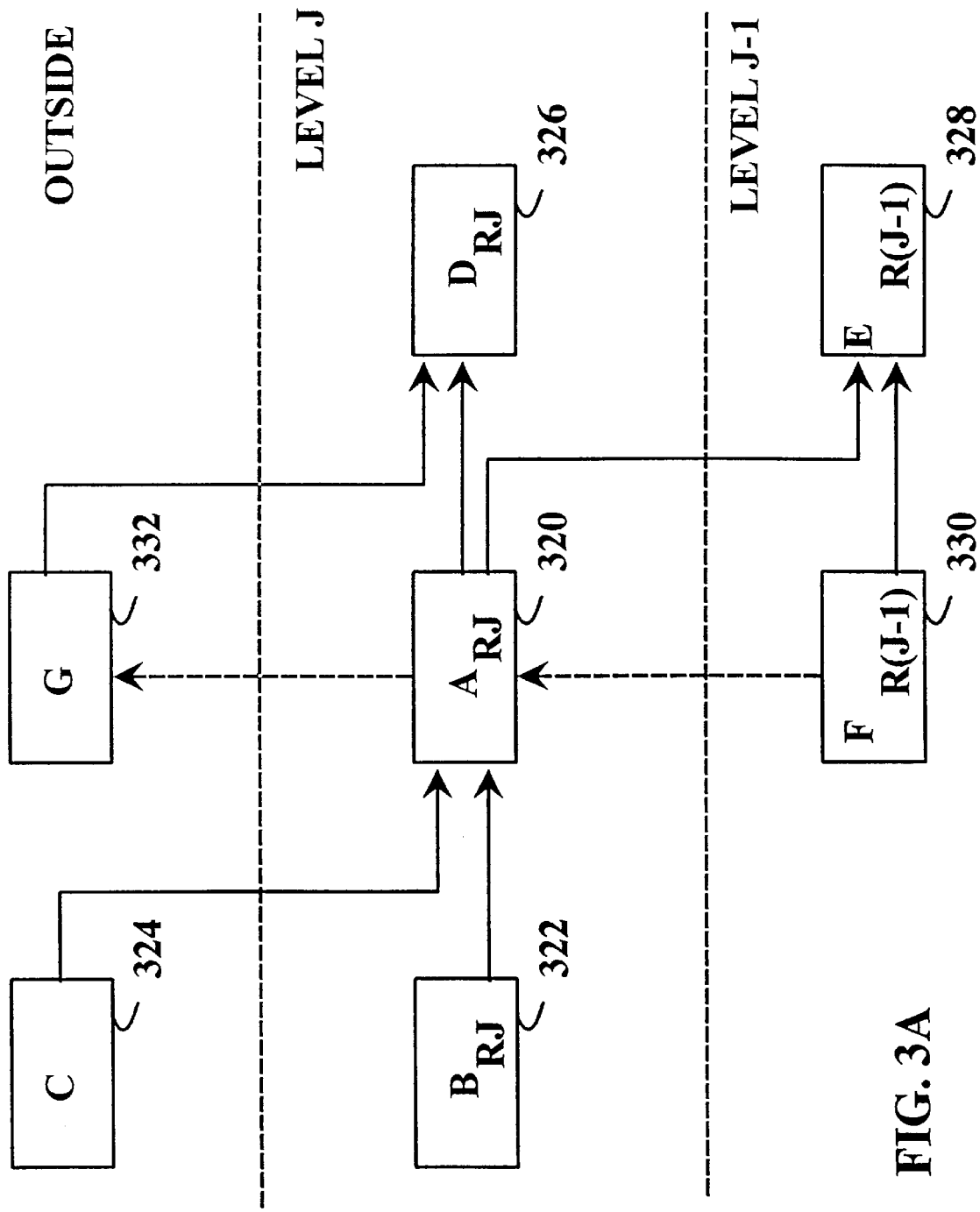
FIGS. 3A, 3B and 3C are schematic block diagrams that illustrate interconnections of nodes on various levels of the interconnect structure.
Figure 3B:
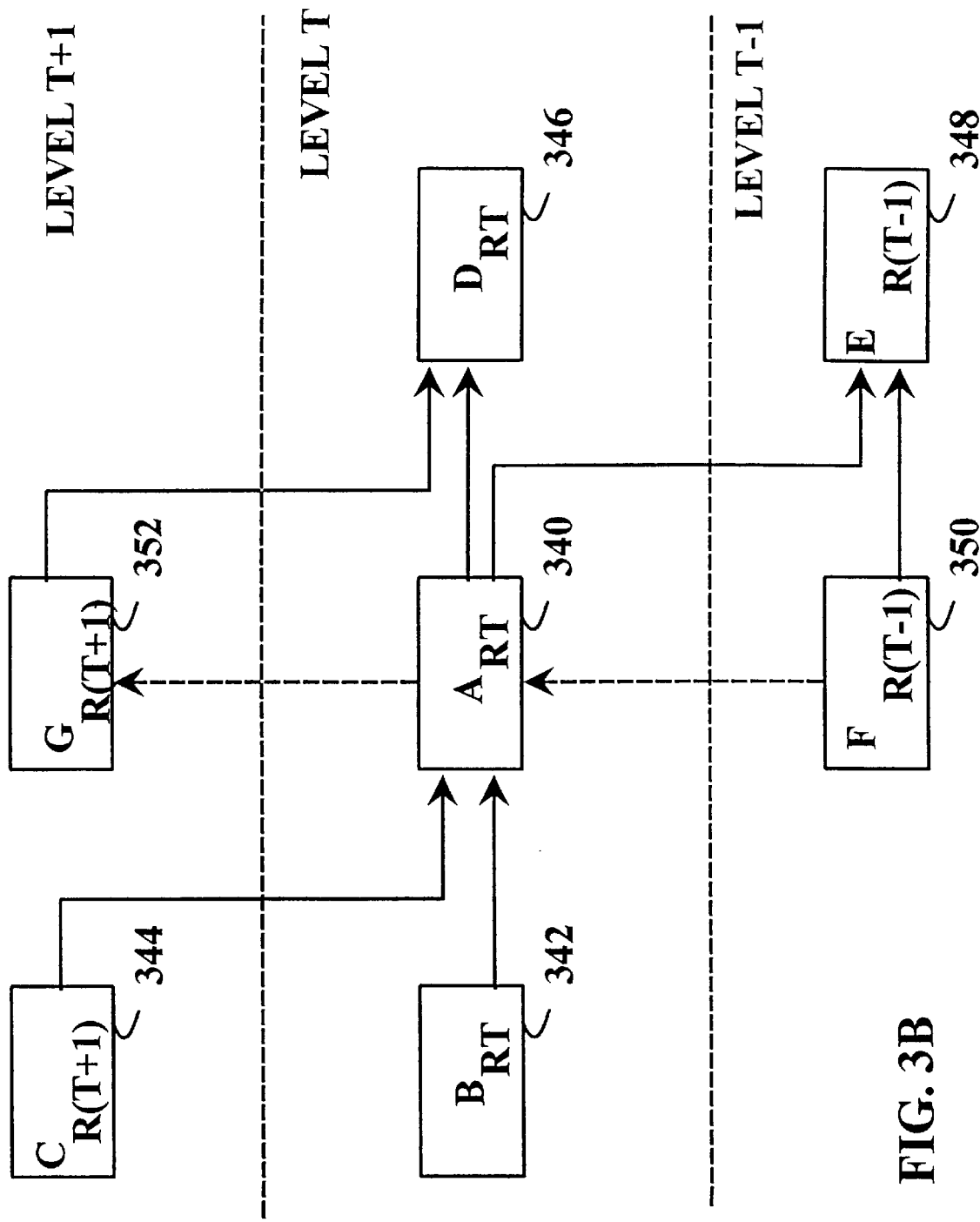
Figure 3C:
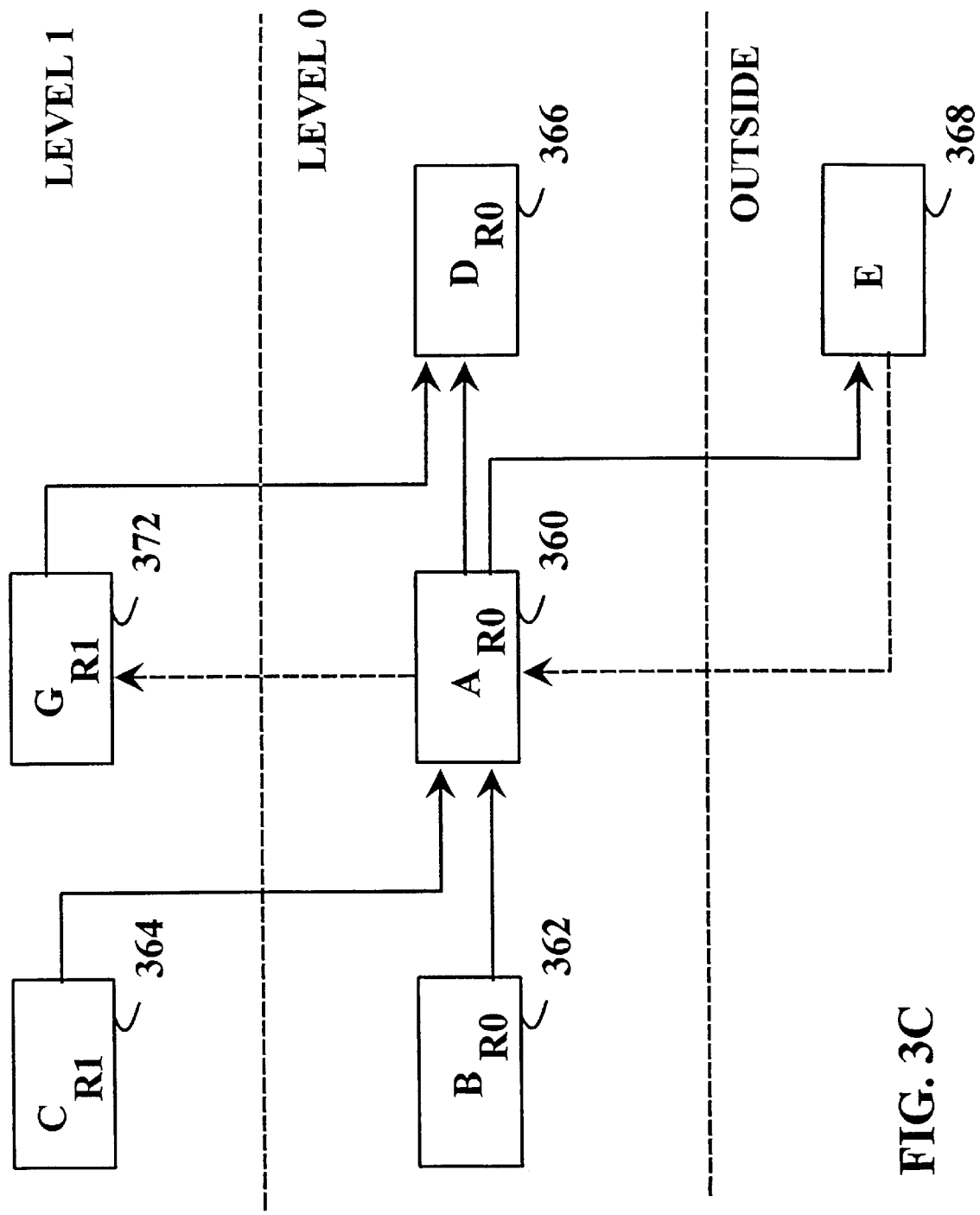

FIGS. 3A, 3B and 3C are schematic block diagrams that show interconnections of nodes on various levels of the interconnect structure. FIG. 3A shows a node $A_{RJ}$ 320 on a ring R of outermost level J and the interconnections of node $A_{RJ}$ 320 to node $B_{RJ}$ 322, device C 324, node $D_{RJ}$ 326, node $E_{R(J-1)}$ 328, node $F_{R(J-1)}$ 330 and device G 332. FIG. 3B shows a node $A_{RT}$ 340 on a ring R of a level J and the interconnections of node $A_{RT}$ 340 to node $B_{RT}$ 342, node $C_{R(T+1)}$ 344, node $D_{RT}$ 346, node $E_{R(T-1)}$ 348, node $F_{R(T-1)}$ 350 and node $G_{R(T+1)}$ 352. FIG. 3C shows a node $A_{R0}$ 360 on a ring R of innermost level 0 and the interconnections of node $A_{R0}$ 360 to node $B_{R0}$ 362, node $C_{R1}$ 364, node $D_{R0}$ 366, device E 368 and node $G_{R1}$ 372.

In FIGS. 3A, 3B and 3C interconnections are shown with solid lines with arrows indicating the direction of message data flow and dashed lines with arrows indicating the direction of control message flow. In summary, for nodes A, B and D and nodes or devices C, E, F, G:

(1) A is on level t=r.

(2) B and C send data to A.

(3) D and E receive data from A.

(4) F sends a control signal to A.

(5) G receives a control signal from A.

(6) B and D are on level T.

(7) B is the immediate predecessor of A.

(8) D is the immediate successor to A.

(9) C, E, F and G are not on level T.

The positions in three-dimensional cylindrical notation of the various nodes and devices is as follows:

(10) A is positioned at node N(r, θ, z).

(11) B is positioned at node N(r, θ−1, $H_T$(z)).

(12) C is either positioned at node N(r+1, θ−1, z) or is outside the interconnect structure.

(13) D is positioned at node N(r, θ+1, $h_T$(z)).

(14) E is either positioned at node N(r−1, θ+1, z) or is outside the interconnect structure and the same as device F.

(15) F is either positioned at node N(r−1, θ, $H_{T-1}$(z)) or is outside the interconnect structure and the same as device E.

(16) G is either positioned at node N(r+1, θ, $h_T$(z)) or is outside the interconnect structure.

Note that the terms θ+1 and θ−1 refer to addition and subtraction, respectively, modulus K.

In this notation, (θ−1)mod K is equal K when θ is equal to 0 and equal to θ−1 otherwise. The conversion of z to $H_r$(z) on a level r is described for z=[$z_{J-1}$, $z_{J-2}$, . . . , $z_r$, $z_{r-1}$, . . . , $z_2$, $z_1$, $z_0$] by reversing the order of low-order z bits from $z_{r-1}$ to $z_0$] into the form z=[$z_{J-1}$, $z_{J-2}$, . . . , $z_r$, $z_0$, $z_1$, $z_2$, . . . , $z_{r-1}$], subtracting one (modulus $2^r$) and reversing back the low-order z bits. Similarly, (θ+1)mod K is equal 0 when θ is equal to K−1 and equal to θ+1 otherwise. The conversion of z to $h_r$(z) on a level r is described for z=[$z_{J-1}$, $z_{J-2}$, . . . , $z_r$, $z_{r-1}$, . . . , $z_2$, $z_1$, $z_0$] by reversing the order of low-order z bits from $z_{r-1}$ to $z_0$] into the form z=[$z_{J-1}$, $z_{J-2}$, . . . , $z_r$, $z_0$, $z_1$, $z_2$, . . . , $z_{r-1}$], adding one (modulus $2^r$) and reversing back the low-order z bits.

Figure 4:
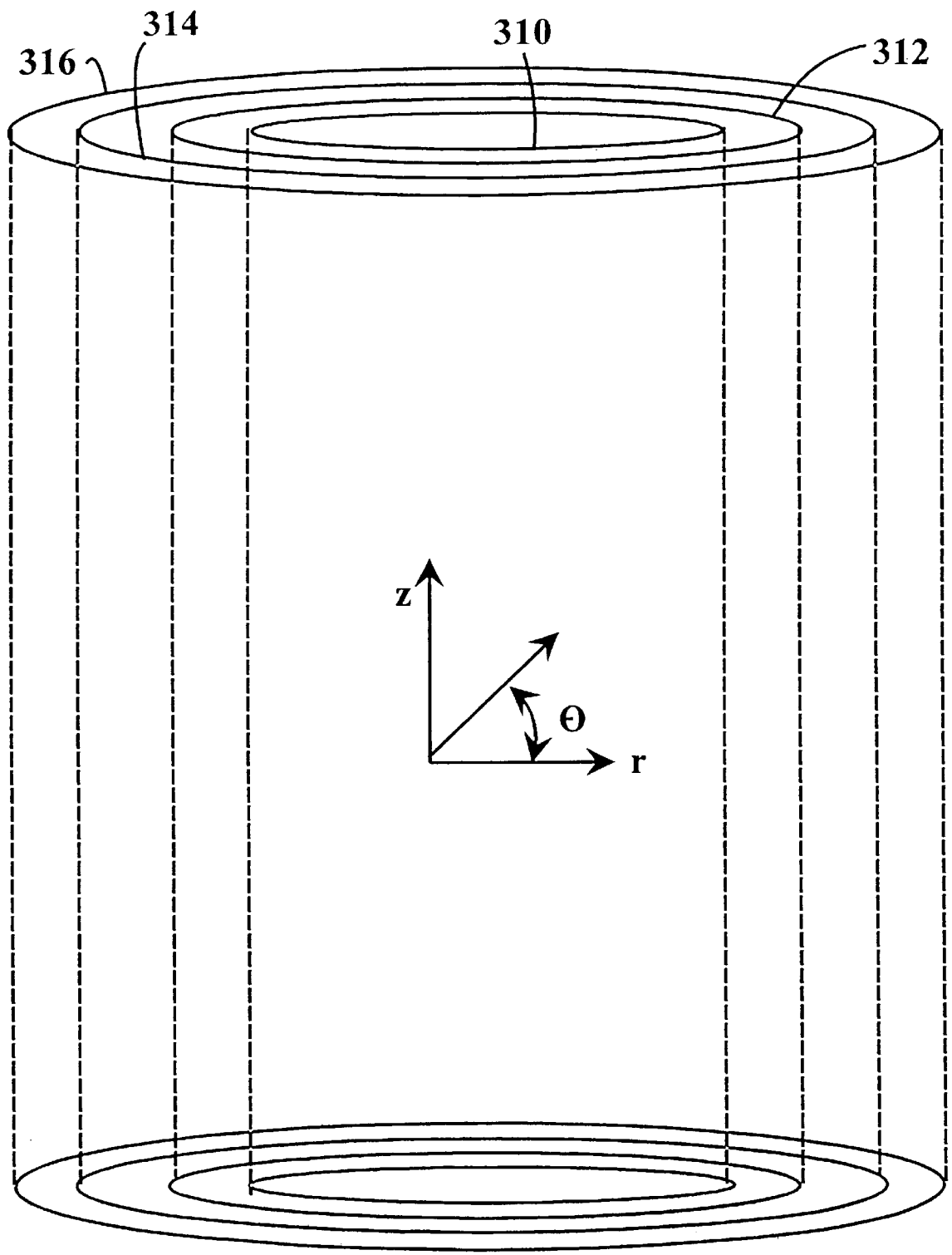
FIG. 4 is an abstract schematic pictorial diagram showing the topology of levels of an interconnect structure.

Referring to FIG. 4, concentric cylindrical levels zero 310, one 312, two 314 and three 316 are shown for a J=3 interconnect structure 300 where level 0 refers to the innermost cylindrical level, progressing outward and numerically to the outermost cylindrical level 3. A node 102 on a level T is called a level T node.

Figure 5:
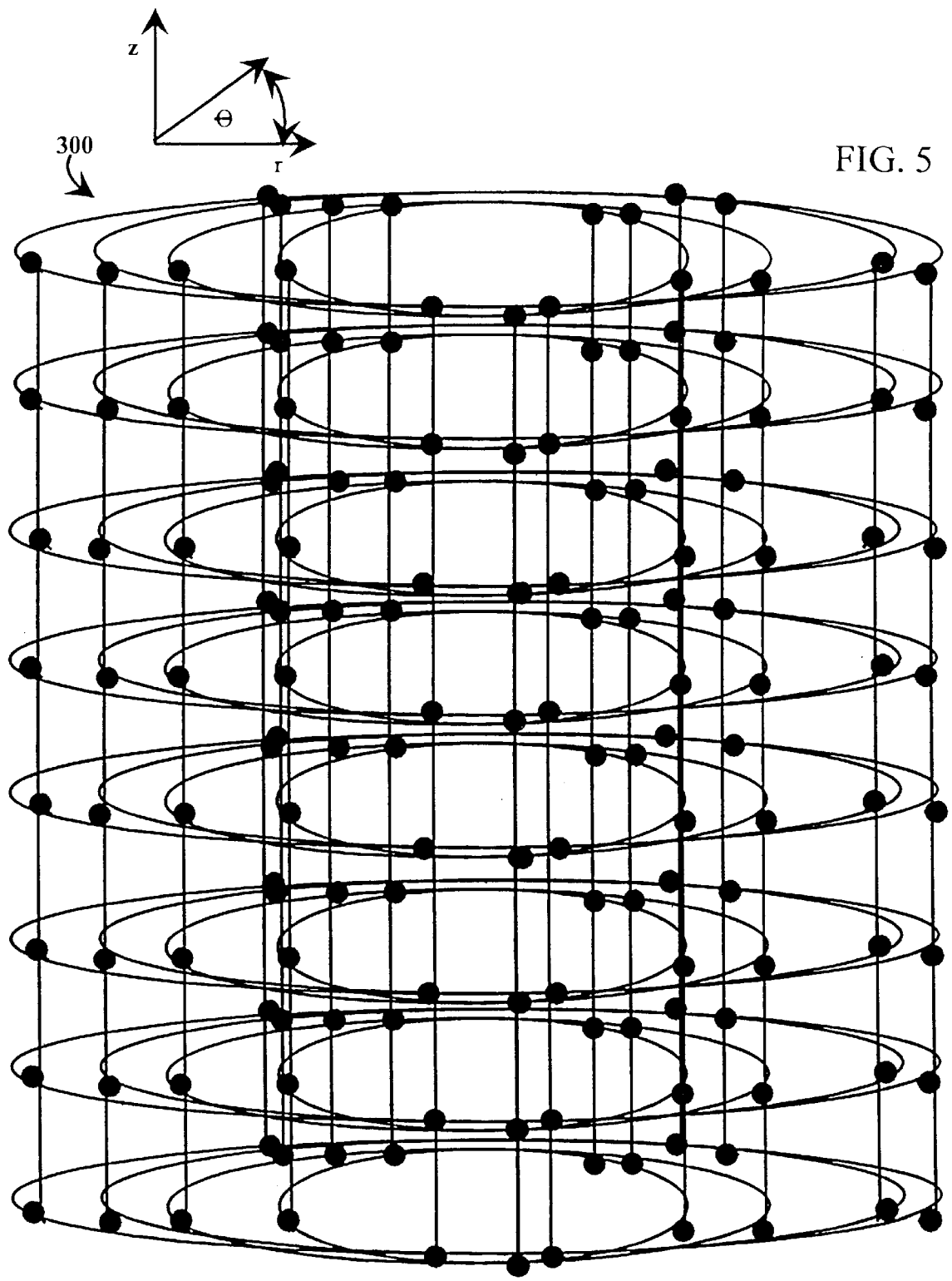
FIG. 5 is an abstract schematic pictorial diagram showing the topology of nodes of an interconnect structure.

An interconnect structure has J+1 levels and $2^J$K nodes on each level. Referring to FIG. 5, the design parameter K is set equal to 5 so that the interconnect structure 300 has four levels (J+1=3+1=4) with 40 ($2^J$K=($2^3$)5=40) nodes on each level.

Referring to FIGS. 6 through 10, the notation is modified, and made more concise, so that a letter at a node location (r,θ,z) is denoted as the letter followed by the location designation. For example, node A at location (r,θ,z) is designated node A(r,θ,z).

Figure 6:
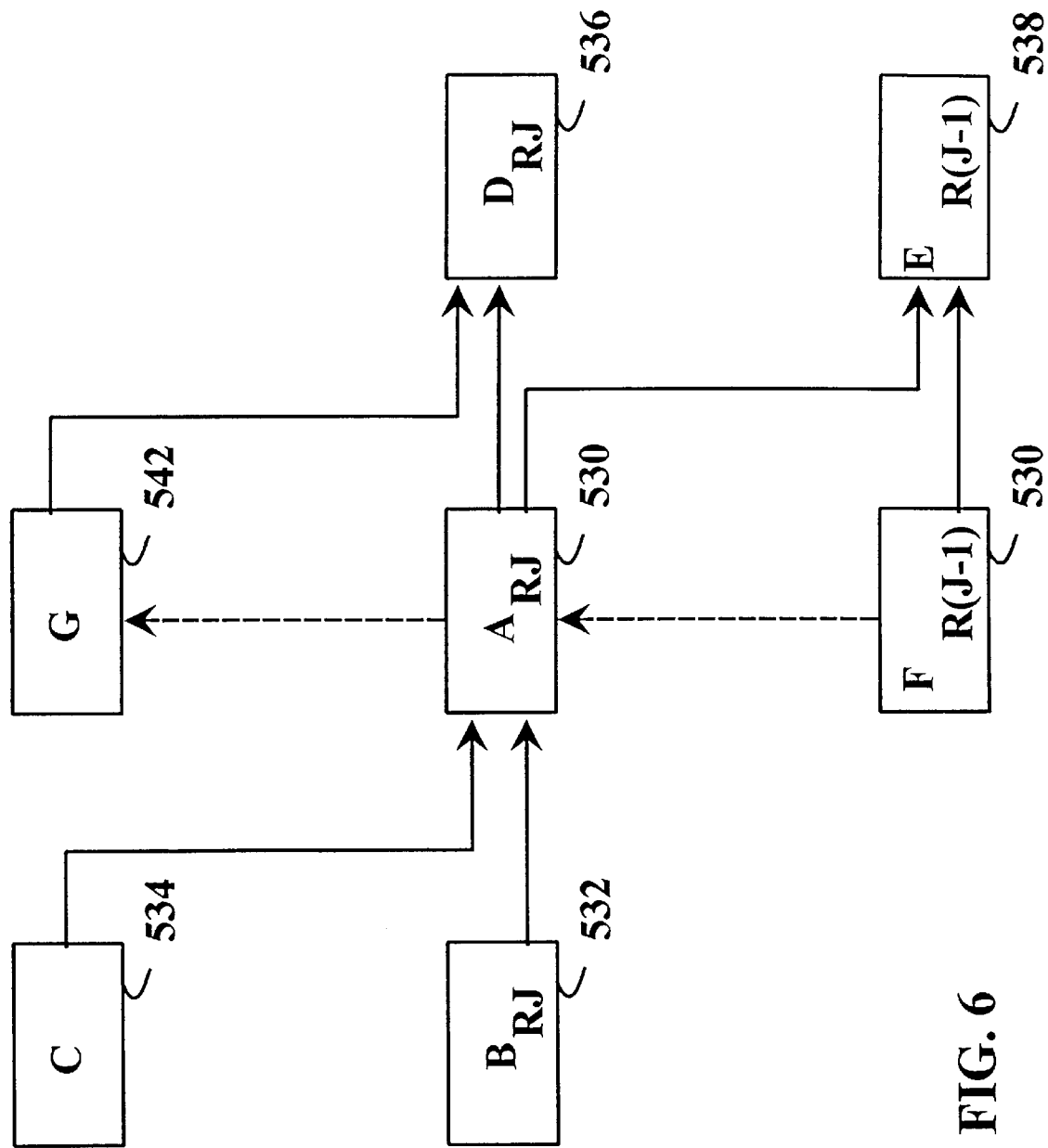
FIG. 6 is an abstract schematic pictorial diagram which illustrates the manner in which nodes of the rings on a particular cylindrical level are interconnected.

Referring to FIG. 6, the interconnect structure is fully defined by designating the interconnections for each node A 530 of each level T to devices or nodes B 532, C 534, D 536, E 538, F 540 and G 542.

Node A(r,θ,z) 530 is interconnected with an immediate predecessor node B(r, (θ−1)mod K,$H_r$(z)) 532 on level r. If node A(r,θ,z) 530 is on the outermost level r=J, node A(r,θ,z) 530 is interconnected with a device (e.g. a computational unit of a computer) outside of the interconnect structure. Otherwise, node A(r,θ,z) 530 is interconnected with a predecessor node C(r+1, (θ−1)mod K,z) 534 on level r+1.

Node A(r,θ,z) 530 is interconnected with an immediate successor node D(r, (θ+1)mod K,$h_r$(z)) 536 on level r. If node A(r,θ,z) 530 is on the innermost level r=0, node A(r,θ,z) 530 is interconnected with a device (e.g. a computational unit) outside of the interconnect structure. Otherwise, node A(r,θ,z) 530 is interconnected with a successor node E(r−1, (θ+1)mod K,z) 538 on level r−1 to send message data.

If node A(r,θ,z) 530 is on the innermost level r=0, node A(r,θ,z) 530 is interconnected with a device (e.g. a computational unit) outside of the interconnect structure. Otherwise, node A(r,θ,z) 530 is interconnected with a node F(r−1,θ,$H_{r-1}$(z)) 540 on level r−1 which supplies a control input signal to node A(r,θ,z) 530.

If node A(r,θ,z) 530 is on the outermost level r=J, node A(r,θ,z) 530 is interconnected with a device (e.g. a computational unit) outside of the interconnect structure. Otherwise, node A(r,θ,z) 530 is interconnected with a node G(r+1,θ,$h_r$(z)) 542 on level r+1 which receives a control input signal from node A(r,θ,z) 530 - - - .

Specifically, the interconnections of a node A for the example of an interconnect structure with interconnect design parameters J=3 and K=5 are defined for all nodes on a ring. Every ring is unidirectional and forms a closed curve so that the entire structure is defined by designating for each node A, a node D that receives data from node A.

Figure 7:
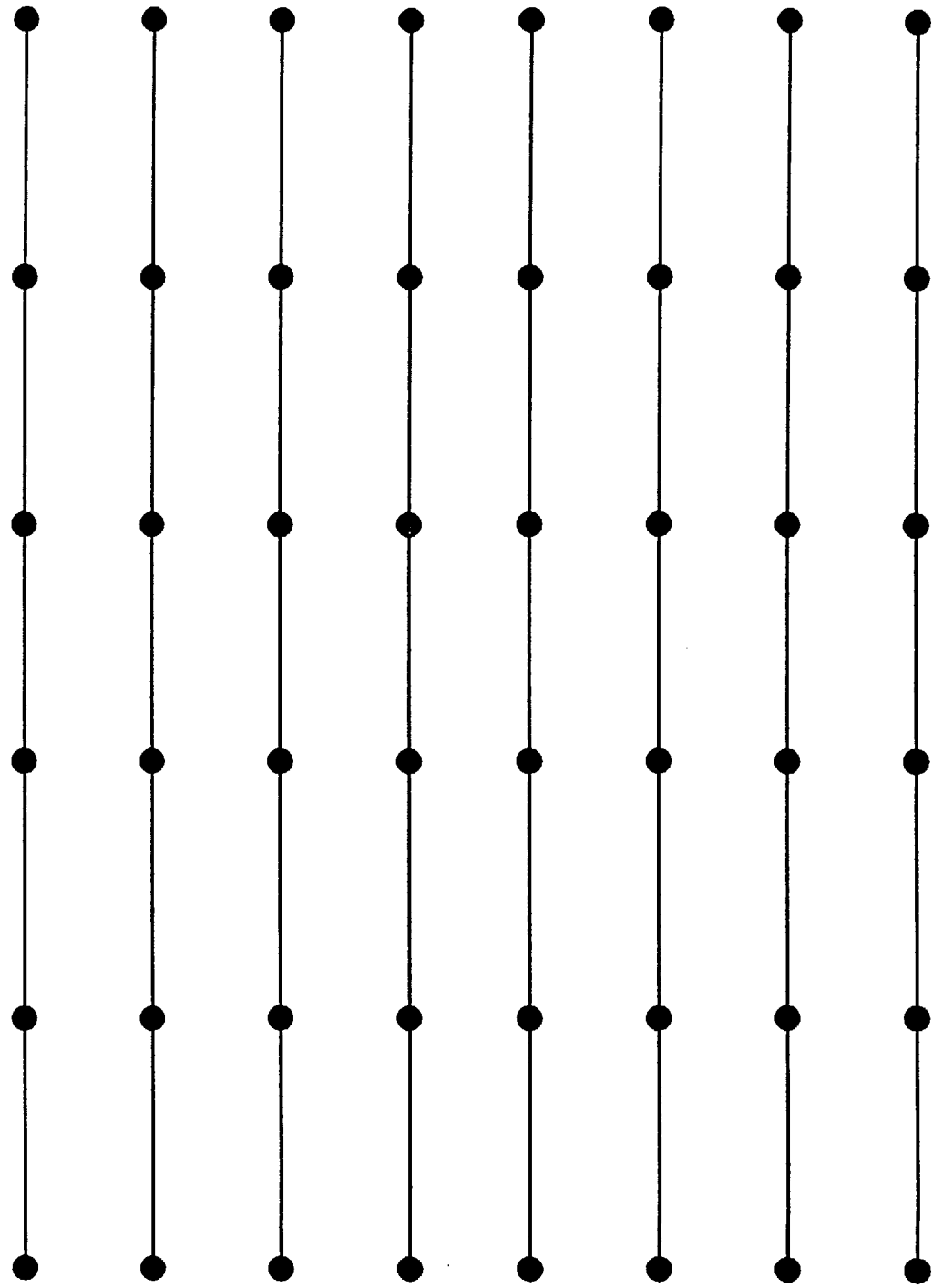
FIG. 7 illustrates interconnections of a node on level zero.

Referring to FIG. 7 in conjunction with FIG. 3C, interconnections of a node A on level zero are shown. Node A(b 0,θ,z) 360 is interconnected to receive message data from immediate predecessor node B(0, (θ−1)mod 5,z) 362 on level 0 and to send message data to immediate successor node D(0, (θ+1)mod 5,z) 366 on level 0. Although the interconnection term in the second dimension for nodes B and D is previously defined as $H_r(z)$ and $h_r(z)$, respectively, on level zero, $H_r(z)=H_0(z)=z$ and $h_r(z)=h_0(z)=z$. Node A(0, θ,z) 360 is also interconnected to receive message data from predecessor node C(1, (θ−1)mod 5,z) 364 on level 1 and to send message data to a device E(θ,z) 368. Node A(0,θ,z) 360 is interconnected to receive control information from the device E(θ,z) 368 outside the network and to send a control output signal to node G(1,θ,$h_0(z)$) 372 on level 1.

Figure 8:
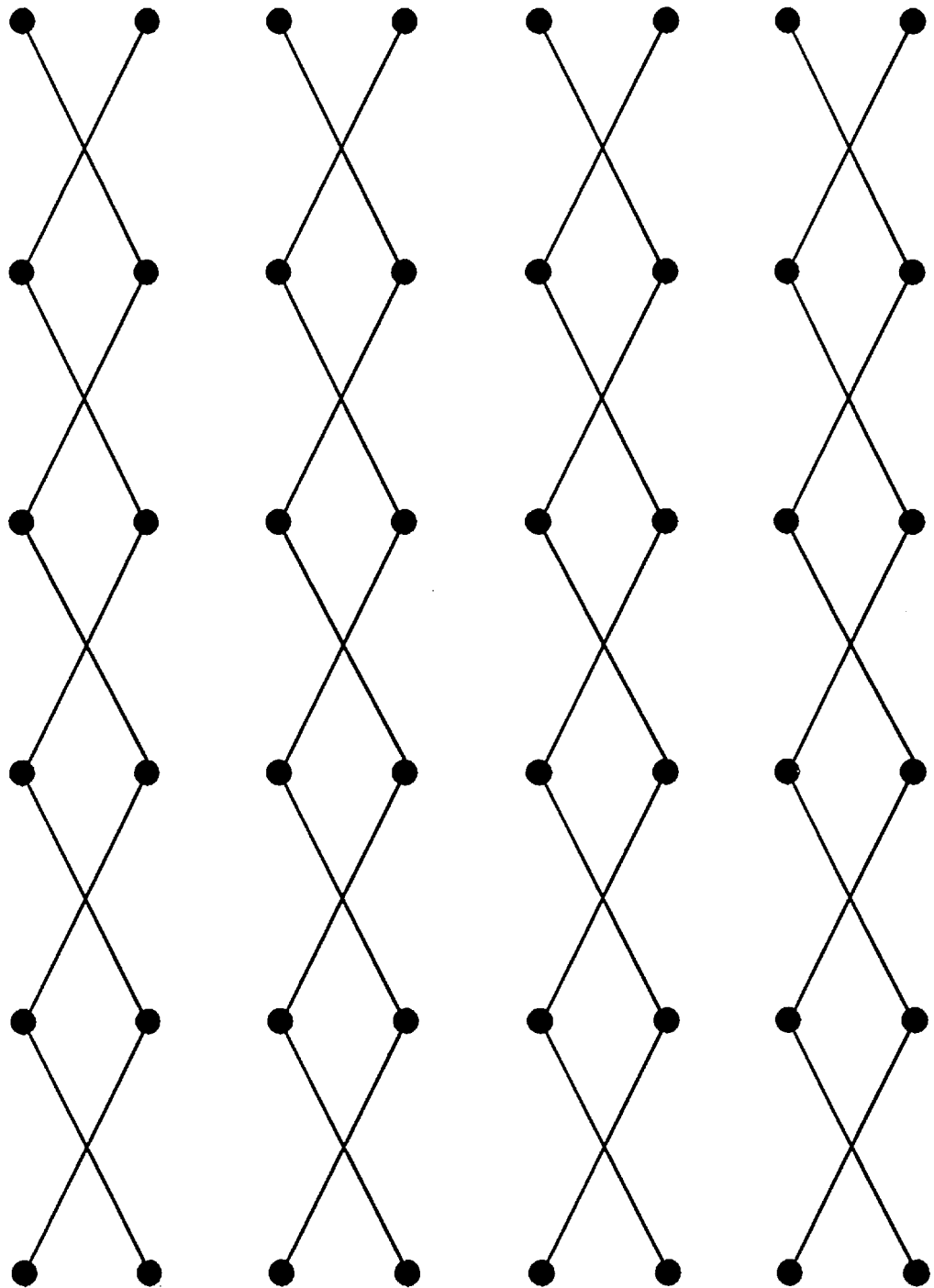
FIG. 8 depicts interconnections of a node on level one.

Referring to FIG. 8 in conjunction with FIG. 6, interconnections of a node A on level one are shown. Node A(1,θ,z) 530 is interconnected to receive message data from immediate predecessor node B(1, (θ−1)mod 5,$H_1(z)$) 532 on level 1 and to send message data to immediate successor node D(1, (θ+1)mod 5,$h_1(z)$) 536 on level 1. Height z is expressed as a binary number (base 2) having the form $[z_2,z_1,z_0]$. For level one, when z is $[z_2,z_1,0]$ then $h_1(z)$ and $H_1(z)$ are both $[z_2,z_1,1]$. When z is $[z_2,z_1,1]$ then $h_1(z)$ and $H_1(z)$ are both $[z_2,z_1,0]$. Node A(1,θ,z) 530 is also interconnected to receive message data from predecessor node C(2, (θ−1)mod 5,z) 534 on level 2 and to send message data to successor node E(0, (θ−1)mod 5,z) 538 on level 0. Node A(1,θ,z) 530 is interconnected to receive a control input signal from a node F(0,θ,$H_0(z)$) 540 on level zero and to send a control output signal to node G(2,θ,$h_1(z)$) 542 on level 2.

Figure 9:
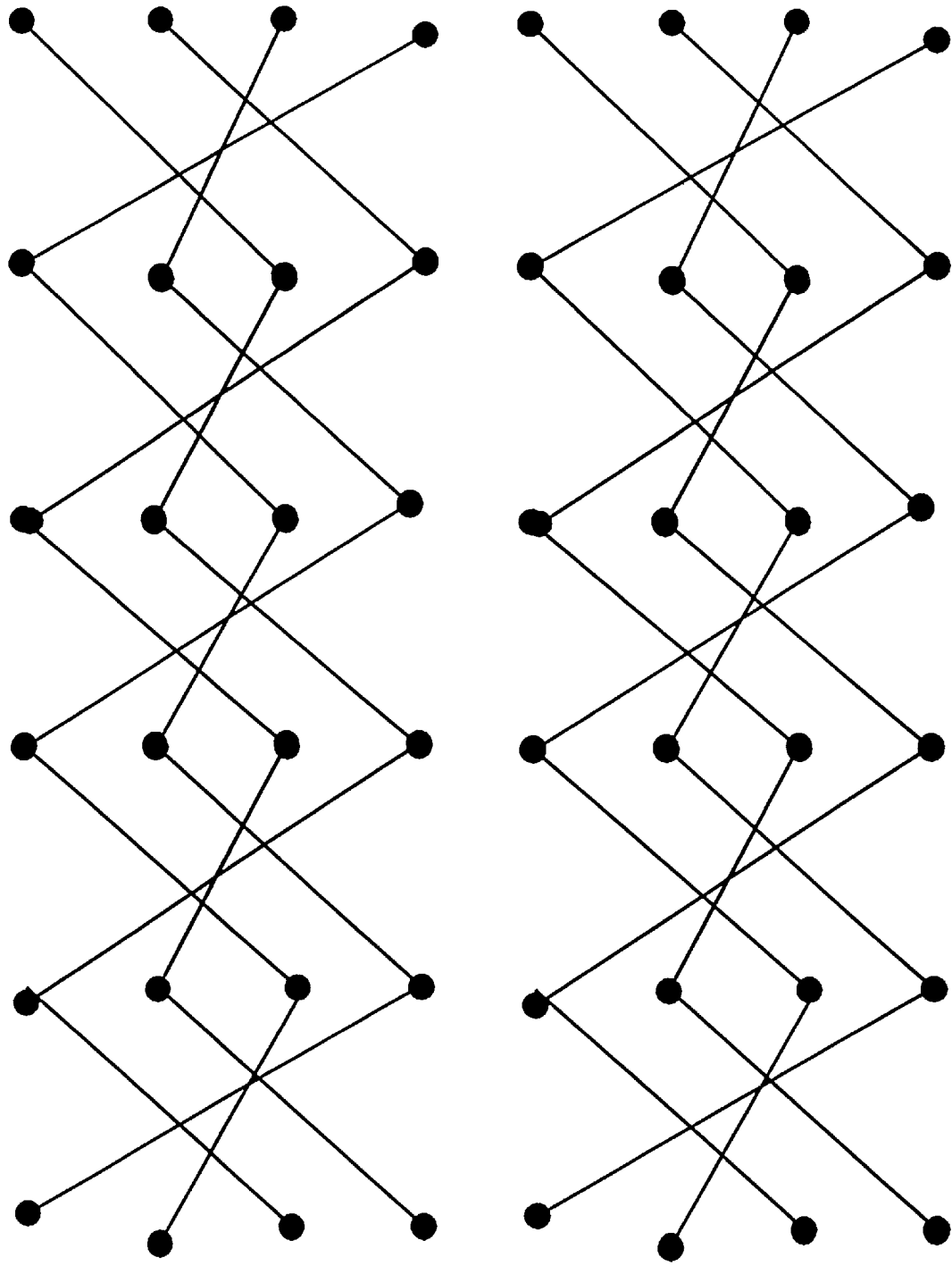
FIG. 9 depicts interconnections of a node on level two.

Referring to FIG. 9 in conjunction with FIG. 6, interconnections of a node A on level two are shown. Node A(2,θ,z) 530 is interconnected to receive message data from immediate predecessor node B(2, (θ−1)mod 5,$H_2(z)$) 532 on level 2 and to send message data to immediate successor node D(2, (θ+1)mod 5,$h_2(z)$) 536 on level 2. Height z is expressed as a binary number (base 2) having the form $[z_2,z_1,z_0]$. For level two, when z is $[z_2,0,0]$then $h_2(z)$ is $[z_2,1,0]$ and $H_2(z)$ is $[z_2,1,1]$. When z is $[z_2,0,1]$ then $h_2(z)$ is $[z_2,1,1]$ and $H_2(z)$ is $[z_2,1,0]$. When z is $[z_2,1,0]$ then $h_2(z)$ is $[z_2,0,1]$ and $H_2(z)$ is $[z_2,0,0]$. When z is $[z_2,1,1]$ then $h_2(z)$ is $[z_2,0,0]$ and $H_2(z)$ is $[z_2,0,1]$. Node A(2,θ,z) 530 is also interconnected to receive message data from predecessor node C(3, (θ−1)mod 5,z) 534 on level 3 and to send message data to successor node E(1, (θ+1)mod 5,z) 538 on level 1. Node A(2,θ,z) 530 is interconnected to receive a control input signal from a node F(1,θ,$H_1(z)$) 540 on level 1 and to send a control output signal to node G(3,θ,$h_2(z)$) 542 on level 3.

Figure 10:
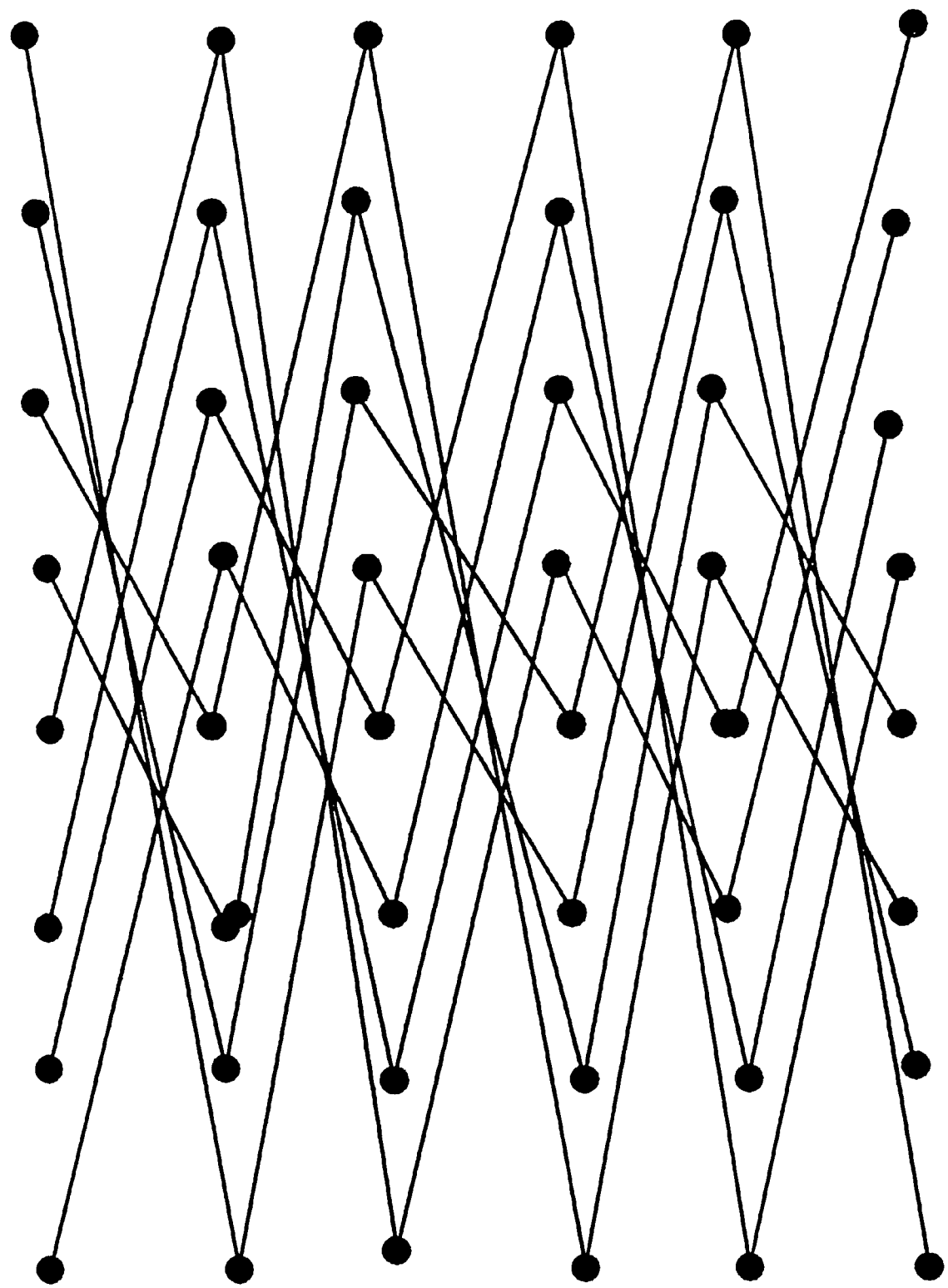
FIG. 10 depicts interconnections of a node on level three.

Referring to FIG. 10 in conjunction with FIG. 6, interconnections of a node A on level three of an interconnect structure with J>3 and K=5 are shown. Node A(3,θ,z) 530 is interconnected to receive message data from immediate predecessor node B(3, (θ−1)mod 5,$H_3(z)$) 532 on level 3 and to send message data to immediate successor node D(3, (θ+1)mod 5,$h_3(z)$) 536 on level 3. For level three, when z is [0,0,0] then $h_3(z)$ is [1,0,0] and $H_3(z)$ is [1,1,1]. When z is [0,0,1] then $h_3(z)$ is [1,0,1] and $H_3(z)$ is [1,1,0]. When z is [0,1,0] then $h_3(z)$ is [1,1,0] and $H_3(z)$ is [1,0,0]. When z is [0,1,1] then $h_3(z)$ is [1,1,1] and $H_3(z)$ is [1,0,1]. When z is [1,0,0] then $h_3(z)$ is [0,1,0] and $H_3(z)$ is [0,0,0]. When z is [1,0,1] then $h_3(z)$ is [0,1,1] and $H_3(z)$ is [0,0,1]. When z is [1,1,0] then $h_3(z)$ is [0,0,1] and $H_3(z)$ is [0,1,0]. When z is [1,1,1] then $h_3(z)$ is [0,0,0] and $H_3(z)$ is [0,1,1]. Node A(3,θ,z) 530 is also interconnected to receive message data from predecessor node C(4, (θ−1)mod 5,z) 534 on level 4 and to send message data to successor node E(2, (θ+1)mod 5,z) 538 on level 2. Node A(3,θ,z) 530 is interconnected to receive a control input signal from a node F(2,θ,$H_2(z)$) 540 on level 2 and to send a control output signal to node G(4,θ,$h_3(z)$) 542 on level 4.

Figure 11:
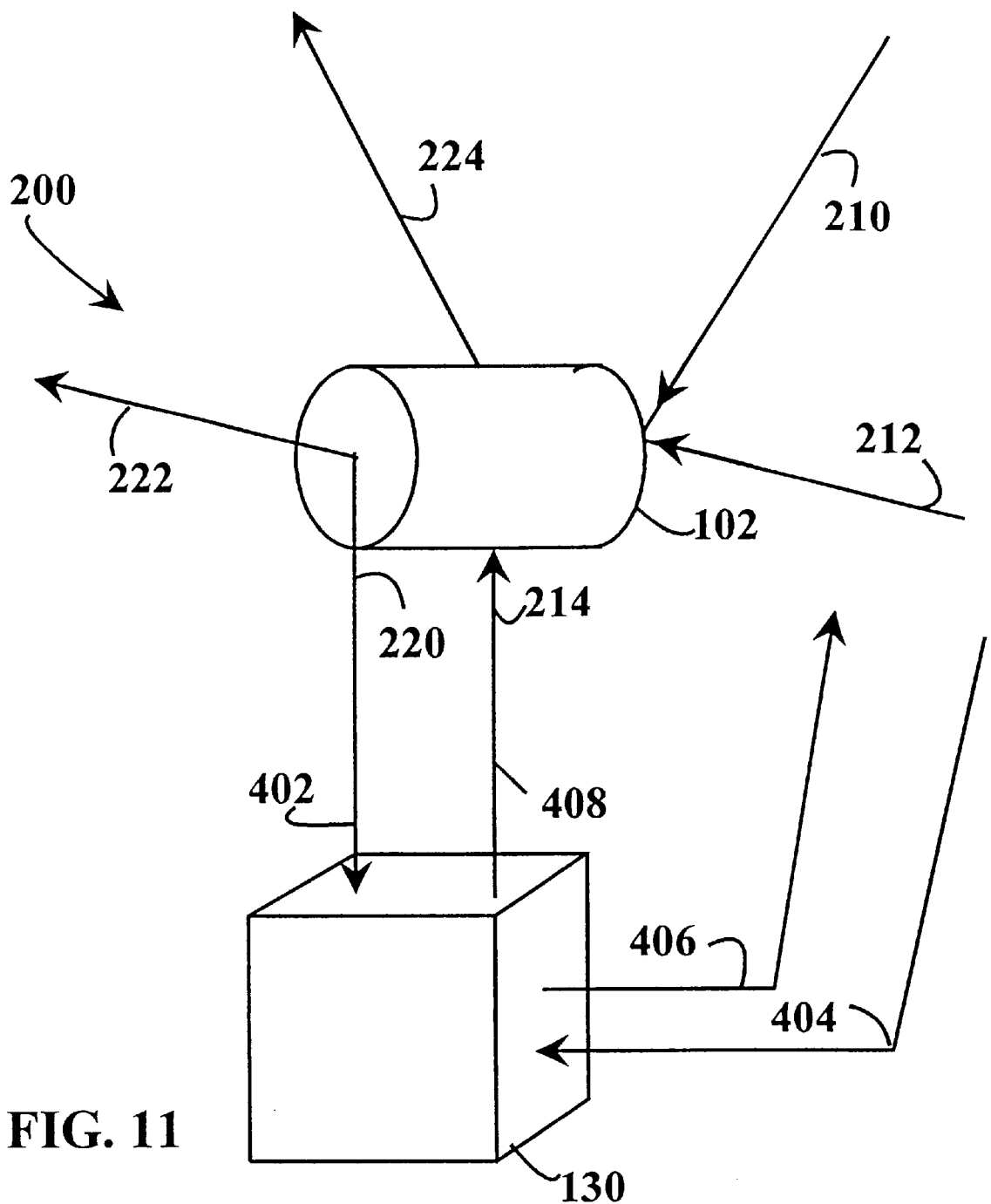
FIG. 11 is an abstract schematic pictorial diagram which illustrates interconnections between devices and nodes of a ring on the low level cylinder.

FIG. 11 illustrates interconnections between devices 130 and nodes 102 of a ring 120 on the cylindrical level zero 110.

In accordance with the description of the interconnect structure 200 of a node 102 discussed with respect to FIG. 2, a node 102 has three input terminals and three output terminals, including two data input terminals and one control input terminal and two data output terminals and one control output terminal. In a simple embodiment, a device 130 has one data input terminal 402, one control bit input terminal 404, one data output terminal 406 and one control bit output terminal 408.

Referring to FIG. 11, nodes 102 at the lowest cylindrical level 110, specifically nodes N(0,θ,z), are connected to devices CU(θ,z). In particular, the data input terminal 402 of devices CU(θ,z) are connected to the second data output terminal 222 of nodes N(0,θ,z). The control bit output terminal 408 of devices CU(θ,z) are connected to the control input terminal 214 of nodes N(0,θ,z).

The devices CU(θ,z) are also connected to nodes N(J,θ,z) at the outermost cylinder level. In particular, the data output terminal 406 of devices CU(θ,z) are connected to the second data input terminal 212 of nodes N(J,θ,z). The control bit input terminal 404 of devices CU(θ,z) are connected to the control output terminal 224 of nodes N(J,θ−1,$H_J(z)$). Messages are communicated from devices CU(θ,z) to nodes N(J,θ,z) at the outermost cylindrical level J. Then messages move sequentially inward from the outermost cylindrical level J to level J−1, level J−2 and so forth until the messages reach level 0 and then enter a device. Messages on the outermost cylinder J can reach any of the $2^J$ rings at level zero. Generally, messages on any cylindrical level T can reach a node on $2^T$ rings on level zero.

Figure 12:
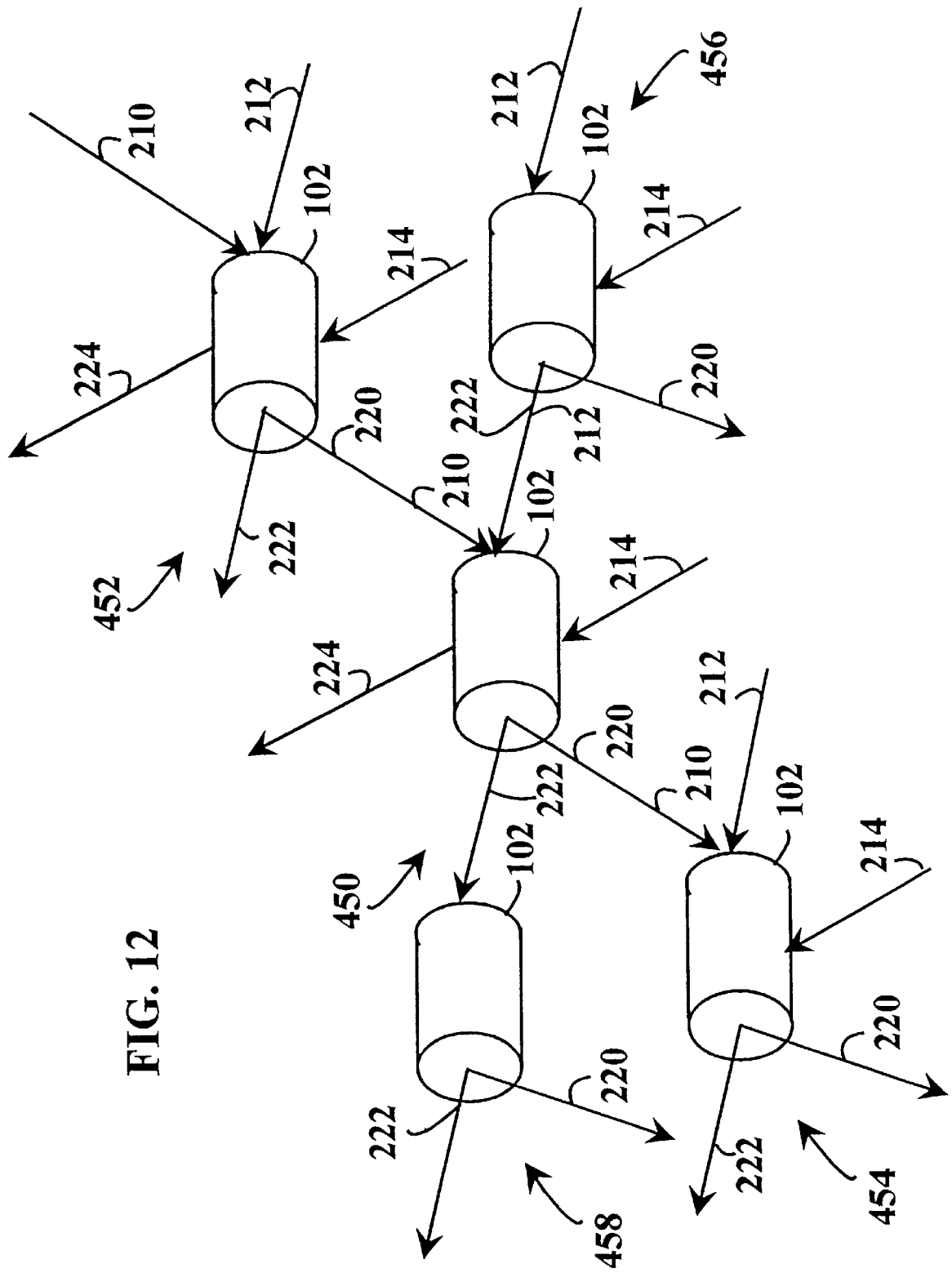
FIG. 12 is an abstract schematic pictorial diagram which illustrates interconnections among nodes of two adjacent cylindrical levels.

FIG. 12 illustrates interconnections among nodes 102 of two adjacent cylindrical levels 110. Referring to FIG. 12 in conjunction with FIG. 2, nodes 102 at the T cylindrical level 110, specifically N(T,θ,z) 450, have terminals connected to nodes on the T level, the T+1 level and the T−1 level. These connections are such that the nodes N(T,θ,z) 450 have one data input terminal connected to a node on the same level T and one data input terminal connected to another source, usually a node on the next outer level T+1 but for nodes on the outermost level J, a device is a source. In particular, nodes N(T,θ,z) 450 have a first data input terminal 210 which is connected to a first data output terminal 220 of nodes N(T+1,θ−1,z) 452. Also, nodes N(T, θ,z) 450 have a first data output terminal 220 which is connected to a first data input terminal 210 of nodes N(T−1,θ+1,z) 454.

The nodes N(T,θ,z) 450 also have a second data input terminal 212 and a second data output terminal 222 which are connected to nodes 102 on the same level T. The second data input terminal 212 of nodes N(T,θ,z) 450 are connected to the second data output terminal 222 of nodes N(T,θ−1, $H_T(z)$) 456. The second data output terminal 222 of nodes N(T,θ,z) 450 are connected to the second data input terminal 212 of nodes N(T,θ+1,$h_T(z)$) 458. The cylinder height designation $H_T(z)$ is determined using an inverse operation of the technique for determining height designation $h_T(z)$. The interconnection of nodes from cylindrical height to height (height z to height $H_T(z)$ and height $h_T(z)$ to height z) on the same level T is precisely defined according to a height transformation technique and depends on the particular level T within which messages are communicated. Specifically in accordance with the height transformation technique, the height position z is put into binary form where $z=z_{J-1}2^{J-1}+z_{J-2}2^{J-2}+ \ldots +z_T2^T+z_{T-1}2^{T-1}+ \ldots +z_1 2^1+z_0 2^0$. A next height position $h_T(z)$ is determined using a process including three steps. First, binary coefficients starting with coefficient $z_0$, up to and but not including coefficient $z_T$ are reversed in order while coefficients $z_T$ and above are kept the same. Thus, after the first step the height position becomes $z_{J-1}2^{J-1}+z_{J-2}2^{J-2}+\ldots+z_T2^T+z_02^0+z_12^1+\ldots+z_{T-2}2^{T-2}+z_{T-1}2^{T-1}$. Second, an odd number modulus $2^T$, for example one, is added to the height position after inversion. Third, circularity of the height position is enforced by limiting the inverted and incremented height position by modulus $2^T$. Fourth, the first step is repeated, again inverting the binary coefficients below the $z^J$ coefficient of the previously inverted, incremented and limited height position. The inverse operation for deriving height descriptor $H_T(z)$ is determined in the same manner except that, rather than adding the odd number modulus $2^T$ to the order-inverted bit string, the same odd number modulus $2^T$ is subtracted to the order-inverted bit string.

The interconnection between nodes 102 on the same level is notable and highly advantageous for many reasons. For example, the interconnection structure resolves contention among messages directed toward the same node. Also, the interconnection structure ensures that a message on a particular level that is blocked by messages on the next level makes a complete tour of the messages on that level before any message is in position to block again. Thus a message inherently moves to cover all possible paths to the next level. Furthermore, a blocking message must cycle through all rings of a level to block a message twice. Consequently, every message is diverted to avoid continuously blocking other messages. In addition, blocking messages typically proceed to subsequent levels so that overlying messages are not blocked for long.

When messages are sent from second data output terminal 222 of a node $N(T,\theta,z)$ 450 to a second data input terminal 212 of a node $N(T,\theta+1,h_T(z))$, a control code is also sent from a control output terminal 224 of the node $N(T,\theta,z)$ 450 to a control input terminal 214 of a node $N(T+1,\theta,h_T(z))$, the node on level T+1 that has a data output terminal connected to a data input terminal of node $N(T,\theta+1,h_T(z))$. This control code prohibits node $N(T+1,\theta,h_T(z))$ from sending a message to node $N(T,\theta+1,h_T(z))$ at the time node $N(T,\theta,z)$ 450 is sending a message to node $N(T,\theta+1,h_T(z))$. When node $N(T+1,\theta,h_T(z))$ is blocked from sending a message to node $N(T,\theta+1,h_T(z))$, the message is deflected to a node on level T+1. Thus, messages communicated on the same level have priority over messages communicated from another level.

The second data output terminal 222 of nodes $N(T,\theta-1,H_T(z))$ are connected to a second data input terminal 212 of nodes $N(T,\theta,z)$ 450 so that nodes $N(T,\theta,z)$ 450 receive messages from nodes $N(T,\theta-1,H_T(z))$ that are blocked from transmission to nodes $N(T-1,\theta H_T(z))$. Also, the control output terminal 224 of nodes $N(T-1,\theta,H_{T-1}(z))$ are connected to the control input terminal 214 of nodes $N(T,\theta,z)$ 450 to warn of a blocked node and to inform nodes $N(T,\theta,z)$ 450 not to send data to node $N(T-1,\theta+1,z)$ at this time since no node receives data from two sources at the same time.

Figure 13:
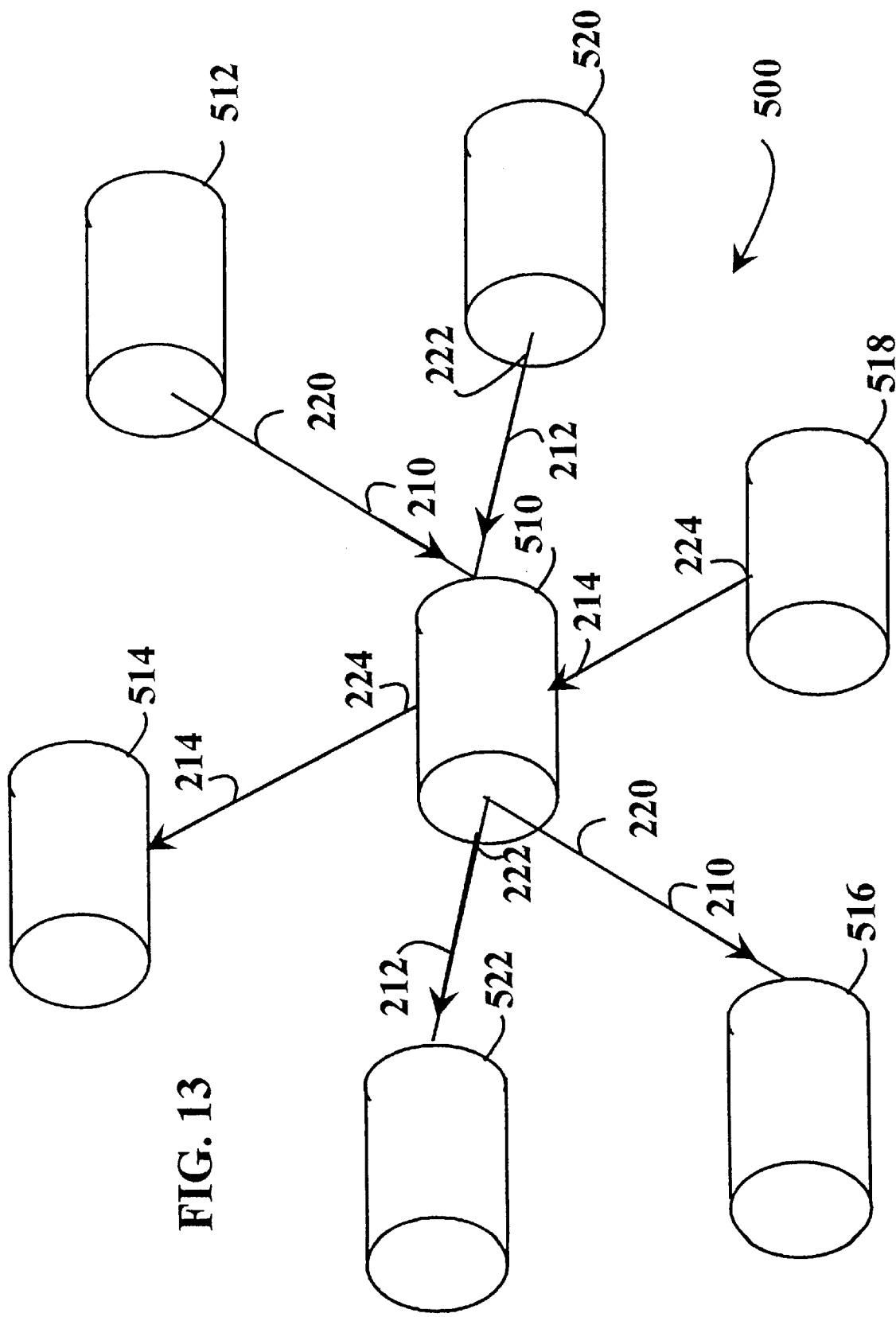
FIG. 13 is an abstract schematic pictorial diagram showing interconnections of nodes on cylindrical level one.

Referring to FIG. 13, interconnections of nodes 102 on cylindrical level one exemplify the described interconnections and demonstrate characteristics and advantages that arise from the general interconnection technique. In this example, the number of nodes K at a cylindrical height is five and the number of heights $2^J$ is $2^2$, or 4, for a three level (J+1) interconnect structure 500. Nodes $N(1,\theta,z)$ 510 have: (1) a first data input terminal 210 connected to a first data output terminal 220 of nodes $N(2,\theta-1,z)$ 512, (2) a control output terminal 224 connected to control input terminal 214 of nodes $N(2,\theta,h_1(z))$ 514, (3) a first data output terminal 220 connected to a first data input terminal 210 of nodes $N(0,\theta+1,z)$ 516, (4) a control input terminal 214 connected to a control output terminal 224 of nodes $N(0,\theta,z)$ 518, (5) a second data input terminal 212 connected to the second data output terminal 222 of nodes $N(1,\theta-1,H_1(z))$ 520, and (6) a second data output terminal 222 connected to the second data input terminal 212 of nodes $N(1,\theta+1,h_1(z))$ 522. For nodes $N(1,\theta,z)$ 510 on level one, height z differs from height $h_1(z)$ and height $H_1(z)$ only in the final bit position.

Messages are communicated through the interconnect structure 500 in discrete time steps. A global clock (not shown) generates timing signals in discrete time steps modulus the number of nodes K at a cylindrical height z of a cylindrical level r. When messages traverse the interconnect structure 500 on the same level (for example, level one) because nodes on an inner level are blocked, messages are communicated from node to node in the discrete time steps. For the interconnect structure 500 with an odd number (K=5) of nodes at a cylindrical level, if data traverses level one for 2K time steps, then the message packet visits 2K different nodes. On time step 2K+1, message packets will begin repeating nodes following the sequential order of the first node traversal. Because the global clock generates the discrete time steps integral time modulus K, if a message packet on level one is over the target ring of that packet at a time T and is deflected by a message on level zero, the message will be over the target ring also at a time T+2 (modulus K) to make another attempt to enter the target ring. In various embodiments, this timing characteristic is consistent throughout the interconnect structure so that, if a message packet is in a position to descend to the next level at a time T=0 (modulus K), the packet will once again be in a position to descend at a subsequent time T=0 (modulus K).

Figure 14:
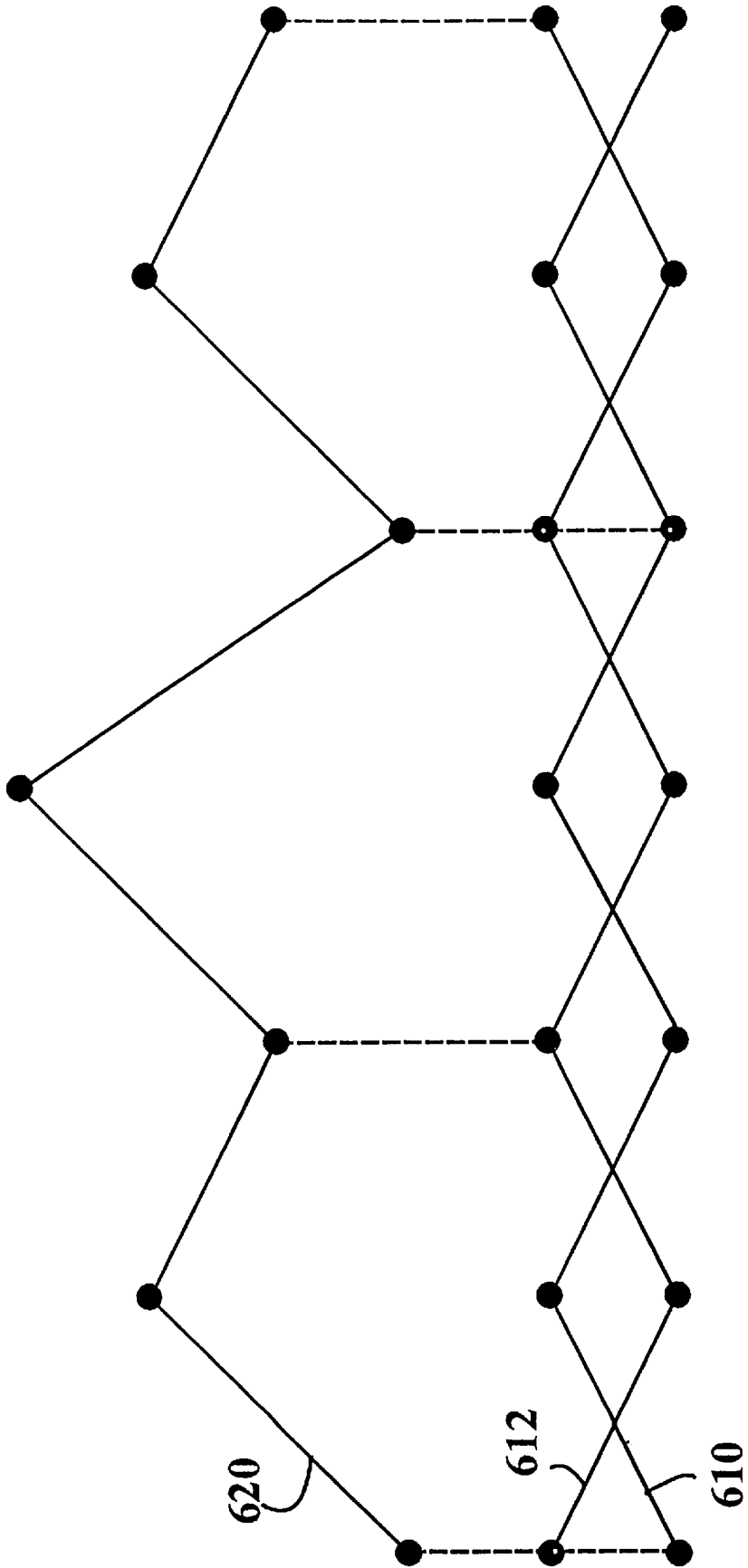
FIG. 14 is an abstract schematic pictorial diagram showing interconnections of nodes on cylindrical level two.

Referring to FIG. 14 in conjunction with FIG. 13, interconnections of nodes 102 on cylindrical level two further exemplify described interconnections. In FIG. 14, a level two message path 620 is shown overlying the paths 610 and 612 of messages moving on level one. The number of angles K at a cylindrical level is five and the number of heights $2^J$ is $2^2$, or 4, for a three level (J+1) interconnect structure 500. Same-level interconnections of nodes $N(2,\theta,z)$ include: (1) a second data input terminal 212 connected to the second data output terminal 222 of nodes $N(2,\theta-1,H_2(z))$ and (2) a second data output terminal 222 connected to the second data input terminal 212 of nodes $N(2,\theta+1,h_2(z))$. For nodes $N(2,\theta,z)$ on level two, height z differs from height $h_2(z)$ and height $H_2(z)$ only in the final two bit positions. Generally stated in binary form for any suitable number of nodes K at a height and number of heights $2^J$ in a level, z and $z'=h_2(z)$ on cylindrical level two are related as follows:

$$[z_{J-1}, z_{J-2}, \ldots, z_2, 0, 0]' = [z_{J-1}, z_{J-2}, \ldots, z_2, 1, 0];$$

$$[z_{J-1}, z_{J-2}, \ldots, z_2, 1, 0]' = [z_{J-1}, z_{J-2}, \ldots, z_2, 0, 1];$$

$$[z_{J-1}, z_{J-2}, \ldots, z_2, 0, 1]' = [z_{J-1}, z_{J-2}, \ldots, z_2, 1, 1];$$

and $$[z_{J-1}, z_{J-2}, \ldots, z_2, 1, 1]' = [z_{J-1}, z_{J-2}, \ldots, z_2, 0, 0].$$

A second advantage of this interconnection technique for nodes on the same level is that blocked messages are directed to avoid subsequent blocking. FIG. 14 illustrates a message blocking condition and its resolution. On level one, a message $m_0$ 610 is shown at node $N_{r\theta z}=N_{100}$ and a message $m_1$ 612 at node $N_{101}$. A message M 620 on level two at node $N_{200}$ is targeted for ring zero. At a time zero, message M 620 is blocked and deflected by message $m_1$ 612 to node $N_{212}$ at time one. Assuming that messages $m_0$ and $m_1$ are also deflected and traversing level one, at a time one message $m_0$ 610 is at node $N_{111}$ and message $m_1$ 612 at node $N_{110}$. At a time two, message M 620 moves to node $N_{221}$, message $m_0$ 610 to node $N_{120}$ and message $m_1$ 612 to node $N_{121}$. Thus, at time two, message M 620 is deflected by message $m_0$ 610. At time four, message M 620 is again blocked by message $m_1$ 612. This alternating blocking of message M 620 by messages $m_0$ 610 and $m_1$ 612 continues indefinitely as long as messages $m_0$ 610 and $m_1$ 612 are also blocked. This characteristic is pervasive throughout the interconnect structure so that a single message on an inner level cannot continue to block a message on an outer level. Because a single message packet cannot block another packet and blocking packets continually proceed through the levels, blocking does not persist.

Figure 15:
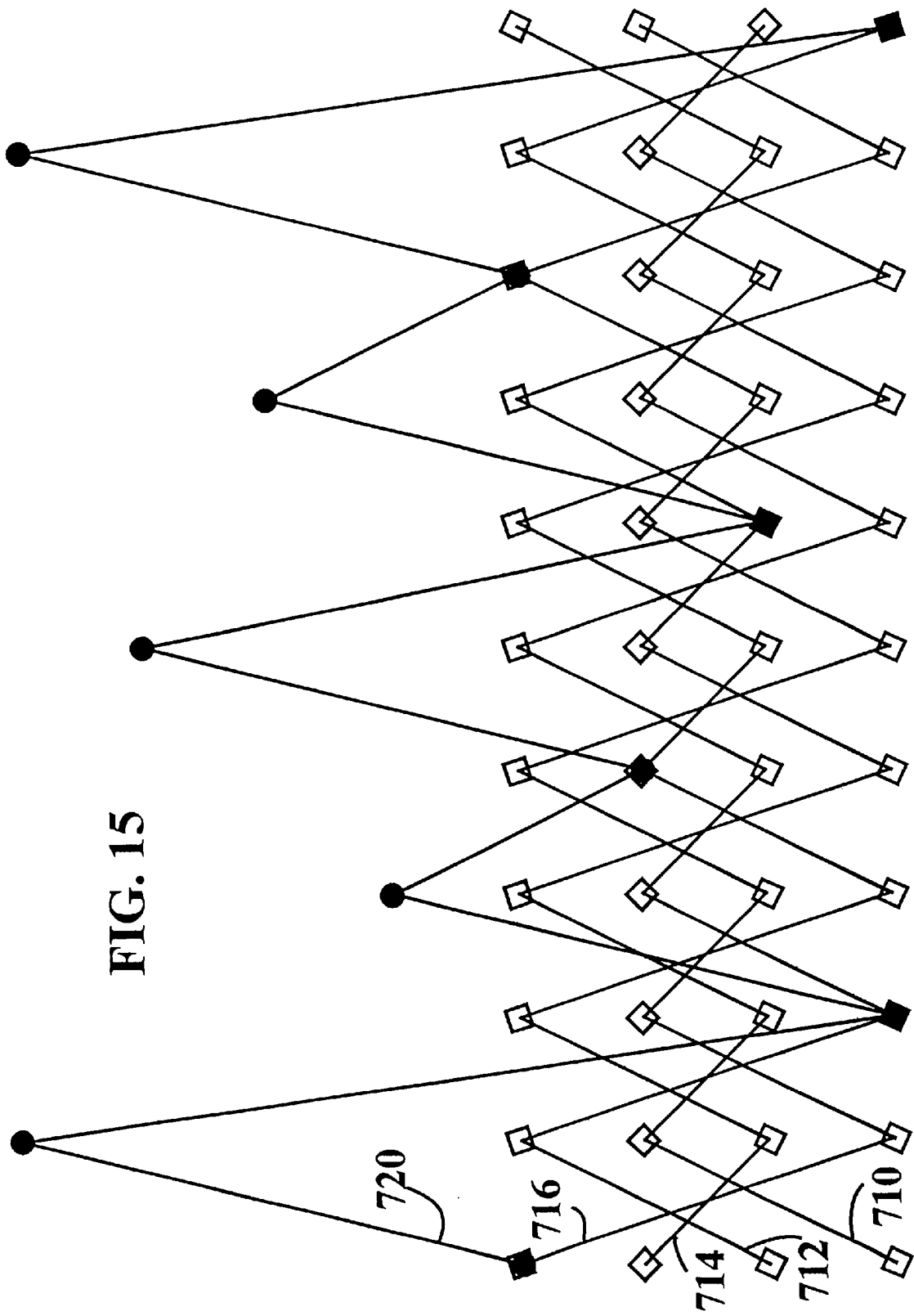
FIG. 15 is an abstract schematic pictorial diagram showing interconnections of nodes on cylindrical level three.

Referring to FIG. 15, interconnections of nodes 102 on cylindrical level three show additional examples of previously described interconnections. A level three message path 720 is shown overlying the paths 710, 712, 714, and 716 of messages moving on level two. The number of nodes K at a cylindrical height is seven and the number of heights $2^J$ is $2^3$ (8), for a four level (J+1) interconnect structure. Same-level interconnections of nodes $N(3,\theta,z)$ include: (1) a second data input terminal 212 connected to the second data output terminal 222 of nodes $N(3,\theta-1,H_3(z))$ and (2) a second data output terminal 222 connected to the second data input terminal 212 of nodes $N(3,\theta+1,h_3(z))$. For nodes $N(3,\theta,z)$ on level three, height z differs from height $h_3(z)$ and height $H_3(z)$ only in the final three bit positions. Generally stated in binary form for any suitable number of nodes K at a cylindrical height and number of heights $2^J$ in a level, bits z and $z'=h_3(z)$ on cylindrical level three are related as follows:

$$[z_{J-1}, z_{J-2}, \ldots, z_3, 0, 0, 0]' = [z_{J-1}, z_{J-2}, \ldots, z_3, 1, 0, 0];$$

$$[z_{J-1}, z_{J-2}, \ldots, z_3, 1, 0, 0]' = [z_{J-1}, z_{J-2}, \ldots, z_3, 0, 1, 0];$$

$$[z_{J-1}, z_{J-2}, \ldots, z_3, 0, 1, 0]' = [z_{J-1}, z_{J-2}, \ldots, z_3, 1, 1, 0];$$

$$[z_{J-1}, z_{J-2}, \ldots, z_3, 1, 1, 0]' = [z_{J-1}, z_{J-2}, \ldots, z_3, 0, 0, 1];$$

$$[z_{J-1}, z_{J-2}, \ldots, z_3, 0, 0, 1]' = [z_{J-1}, z_{J-2}, \ldots, z_3, 1, 0, 1];$$

$$[z_{J-1}, z_{J-2}, \ldots, z_3, 1, 0, 1]' = [z_{J-1}, z_{J-2}, \ldots, z_3, 0, 1, 1];$$

$$[z_{J-1}, z_{J-2}, \ldots, z_3, 0, 1, 1]' = [z_{J-1}, z_{J-2}, \ldots, z_3, 1, 1, 1];$$

and $$[z_{J-1}, z_{J-2}, \ldots, z_3, 1, 1, 1]' = [z_{J-1}, z_{J-2}, \ldots, z_3, 0, 0, 0].$$

FIG. 15 illustrates another example of a message blocking condition and its resolution. On level two, a message $m_0$ 710 is shown at node $N_{200}$, a message $m_1$ 712 at node $N_{201}$, a message $m_2$ 714 at node $N_{202}$ and a message $m_3$ 716 at node $N_{203}$. A message M 720 on level three at node $N_{300}$ is targeted for ring zero. At a time zero, message M 720 is blocked and deflected by message $m_1$ 712 to node $N_{317}$ at time one. Assuming that messages $m_0$, $m_1$, $m_2$ and $m_3$ are also deflected and traversing level two, at a time one message $m_0$ 710 is at node $N_{212}$, message $m_1$ 712 at node $N_{213}$, message $m_2$ 714 at node $N_{211}$ and message $m_3$ 716 at node $N_{210}$. At a time two, message M 720 moves to node $N_{320}$, message $m_0$ 710 to node $N_{221}$, message $m_1$ 712 to node $N_{220}$, message $m_2$ 714 to node $N_{223}$ and message $m_3$ 716 to node $N_{222}$. Thus, at time two, message M 720 is deflected by message $m_2$ 714. At time four, message M 720 is blocked by message $m_0$ 710. At time six, message M 720 is blocked by message $m_3$ 716. At time eight, message M 720 is again blocked by message $m_1$ 712. This alternating blocking of message M 720 by messages $m_0$ 710, $m_1$ 712, $m_2$ 714 and $m_3$ 716 continues indefinitely as long as messages $m_0$ 710, $m_1$ 712, $m_2$ 714 and $m_3$ 716 are also blocked.

This analysis illustrates the facility by which the described interconnect structure avoids blocking at any level. Thus, "hot spots" of congestion in the structure are minimized. This characteristic is maintained at all levels in the structure.

The described interconnect structure provides that every node $N(0,\theta,z)$ on level zero is accessible by any node $N(J,\theta,z)$ on outermost level J. However, only half of the nodes $N(0,\theta,z)$ on level zero are accessible by a node $N(J-1,\theta,z)$ on the level once removed from the outermost level. Data at a node $N(1,\theta,z)$ on level one can access any node $N(0,\theta,z)$ on level zero so long as the binary representation of height z of level one and the binary representation of ring r of level zero differ only in the last bit. Similarly, data at a node $N(2,\theta,z)$ on level two can access any node $N(0,\theta,z)$ on level zero so long as the binary representation of height z of level two and the binary representation of ring r of level zero differ only in the last two bits. A general rule is that, data at a node $N(T,\theta,z)$ on level T can access any node $N(0,\theta,z)$ on level zero so long as the binary representation of height z of level T and the binary representation of ring r of level zero differ only in the last T bits. Accordingly, moving from the outermost level J to level J−1 fixes the most significant bit of the address of the target ring. Moving from level J−1 to level J−2 fixes the next most significant bit of the address of the target ring and so forth. At level zero, no bits are left to be fixed so that no header bit is tested and a message is always passed to a device. In some embodiments, an additional header bit is included and tested at a level zero node. This final bit may be used for various purposes, such as for directing message data to a particular buffer of a device when the device accepts the message data. An advantage of including an additional bit in the header and performing a bit test at the final node is that all the nodes at all levels of the interconnect structure operate consistently.

In some embodiments of an interconnect structure, an additional header bit is included in a message packet. This bit indicates that a message packet is being transmitted. Another purpose for such an additional bit in the header is to identify which bit in the header is the control bit.

A message packet moves from a level T to the next inner level T−1 so long as two conditions are met, as follows: (1) the target ring of the message packet is accessible from level T−1, and (2) the message packet is not blocked by a message on the level T−1.

One significant aspect of this structure is that any message packet at a node $N(T,\theta,z)$ on a level T that can access its target ring can also access the target ring from a node $N(T−1,\theta+1,z)$ only if the bit T−1 of the address ring is the same as bit T−1 of the target ring. Therefore, analysis of only a single bit yields all information for determining a correct routing decision.

Figure 16:
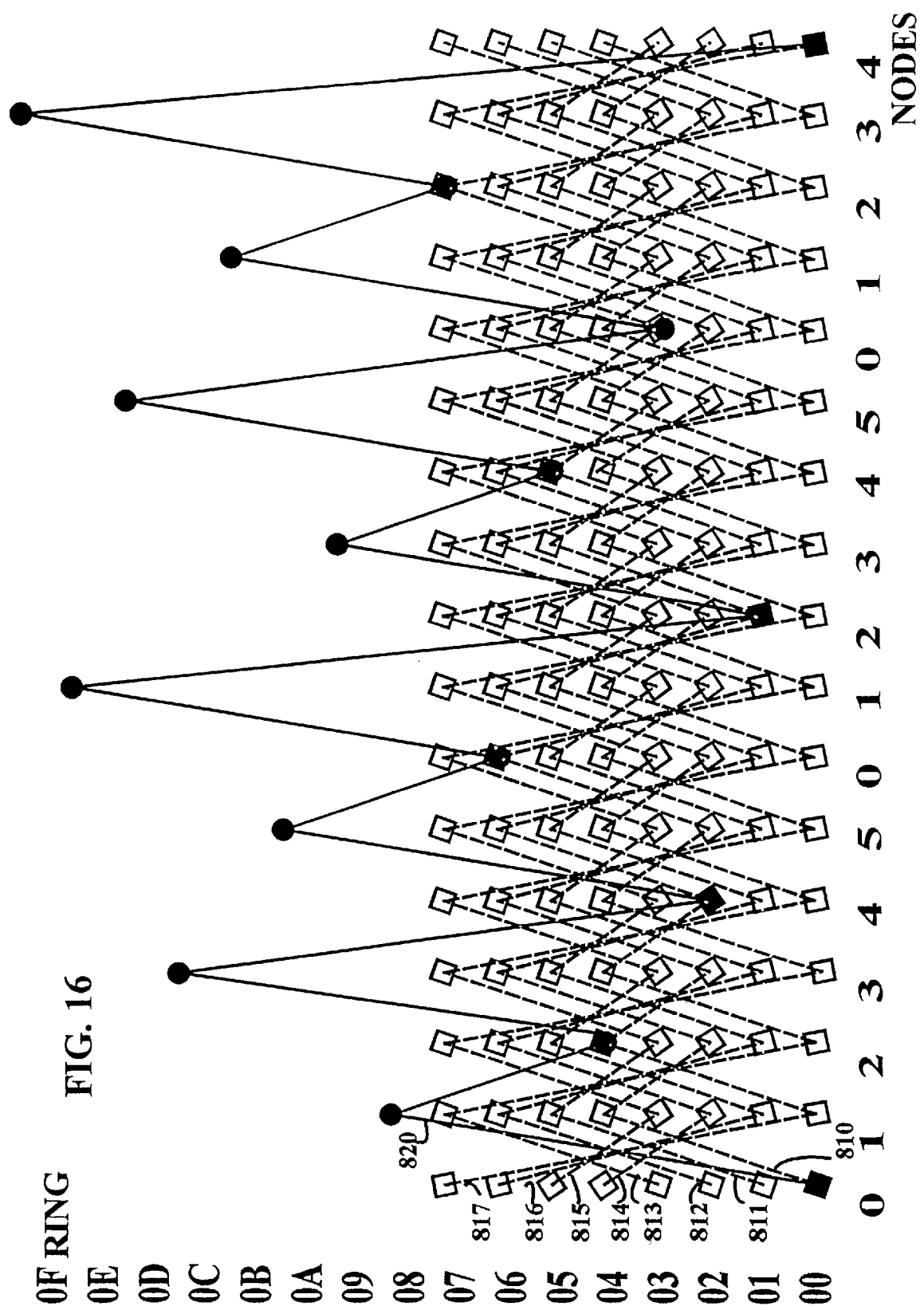
FIG. 16 is an abstract schematic pictorial diagram illustrating the interaction of messages on adjacent levels of an embodiment of the interconnection structure.

Referring to FIG. 16, a general relationship between message packets on two adjacent levels T and T+1 is described. In this example, a message packet M at a node $N_{400}$ on level four, which is targeted for ring two, is potentially blocked by eight message packets $m_0$ 810, $m_1$ 811, $m_2$ 812, $m_3$ 813, $m_4$ 814, $m_5$ 815, $m_6$ 816 and $m_7$ 817 at nodes $N_{30i}$ residing on each of the heights 0 to 7 on level three. Although the behavior of the interconnect structure is analyzed with respect to levels three and four for purposes of illustration, the analysis is applicable to any arbitrary adjacent levels. At an arbitrary time step, illustratively called time step zero, the message M moves from node $N_{400}$ on level four to node $N_{310}$ on level three unless a control code is send to node $N_{400}$ from a level three node having a data output terminal connected to node $N_{310}$. In this example, node $N_{307}$ has a data output terminal connected to node $N_{310}$ and, at time step zero, message $m_1$ resides at node $N_{307}$. Accordingly, node $N_{307}$ sends a control code, in this example a single bit code, to node $N_{400}$, causing deflection of message M to node $N_{418}$ on an interconnection line. At a time step one, message M moves from node $N_{418}$ to node $N_{424}$ on interconnection line regardless of whether a node $N_{428}$ is blocked because ring two is not accessible from node $N_{428}$. At a time step two, message M moves from node $N_{424}$ to node $N_{434}$ unless a control blocking code is sent from node $N_{320}$ to node $N_{424}$ where node $N_{320}$ is the node on level three that has a data output terminal connected to a data input terminal of node $N_{434}$. However, the message M is blocked from accessing node $N_{434}$ because message $m_3$ 813 currently resides at node $N_{320}$. A deflection control code is sent from node $N_{320}$ to node $N_{424}$. Furthermore, assuming that none of the message packets $m_j$ progresses to level two and beyond, at time step four, message M is blocked by message $m_5$ 815 via a control code sent on control bit line. At time six, message M is blocked by message $m_1$ 811 though a blocking control code on control bit line.

This example, illustrates various advantages of the disclosed interconnection structure. First, deflections of the message M completely tour all of the heights on a level T if messages $m_j$ on level T–1 continue to block progression to the level T–1 for all levels T. Accordingly, a message M on a level T is blocked for a complete tour of the heights only if $2^{T-1}$ messages are in position on level T–1 to block message M. In general, a message $m_j$ on a level T–1 must remain on the level T–1 for $2^{T+1}$ time steps to block the same message M on level T twice.

The description exemplifies an interconnect structure in which messages descend from an outer level to devices at a core inner layer by advancing one level when the height dimension matches the destination ring location and traversing the rings when the ring location does not match the height designation. In other embodiments, the messages may move from an inner level to an outer level. In some embodiments, the heights may be traversed as the level changes and the height held constant as the level remains stationary. In these embodiments, the progression of messages through nodes is substantially equivalent to the disclosed interconnect structure. However, the advantage of the disclosed network that avoids blocking of messages is negated.

Figure 17:
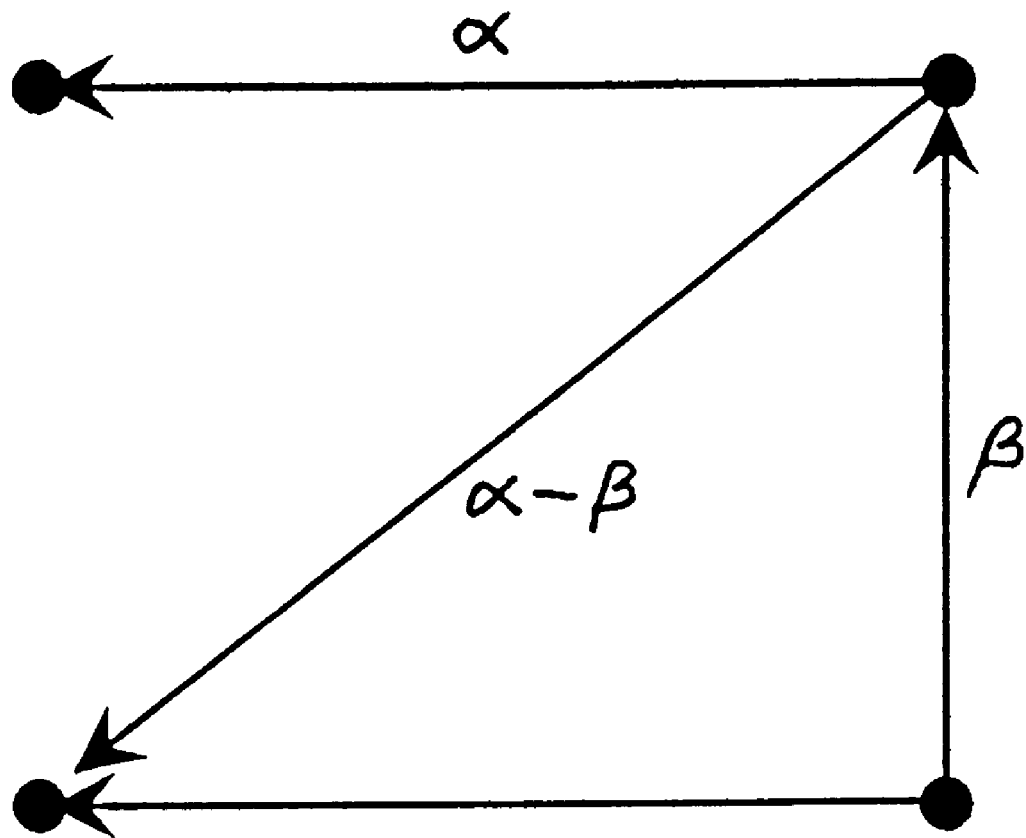
FIG. 17 is a timing diagram which illustrates timing of message communication in the described interconnect structure.
Figure 18:
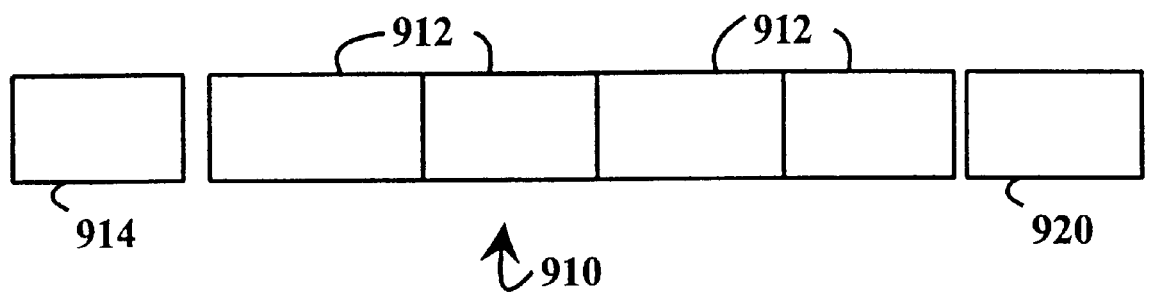
FIG. 18 is a pictorial representation illustrating the format of a message packet including a header and payload.

Referring to FIG. 17, a timing diagram illustrates timing of message communication in the described interconnect structure. In various embodiments of the interconnect structure, control of message communication is determined by timing of message arrival at a node. A message packet, such as a packet 900 shown in FIG. 18, includes a header 910 and a payload 920. The header 910 includes a series of bits 912 designating the target ring in a binary form. When a source device $CU(\theta_1,z_1)$ at an angle $\theta_1$ and height $z_1$ sends a message packet M to a destination device $CU(\theta_2,z_2)$ at an angle $\theta_2$ and height $z_2$, the bits 912 of header 910 are set to the binary representation of height $z_2$.

A global clock servicing an entire interconnect structure keeps integral time modulus K where, again, K designates the number of nodes n at a cylinder height z. There are two constants $\alpha$ and $\beta$ such that the duration of $\alpha$ exceeds the duration of $\beta$ and the following five conditions are met. First, the amount of time for a message M to exit a node $N(T,\theta+1,h_T(z))$ on level T after exiting a node $N(T,\theta,z)$ also on level T is $\alpha$. Second, the amount of time for a message M to exit a node $N(T-1,\theta+1,z)$ on level T–1 after exiting a node $N(T,\theta,z)$ on level T is $\alpha-\beta$. Third, the amount of time for a message to travel from a device CU to a node $N(r,\theta,z)$ is $\alpha-\beta$. Fourth, when a message M moves from a node $N(r,\theta,z)$ to a node $N(r,\theta+1,h_r(z))$ in time duration $\alpha$, the message M also causes a control code to be sent from node $N(r,\theta,z)$ to a node $N(r+1,\theta,h_r(z))$ to deflect messages on the outer level r+1. The time that elapses from the time that message M enters node $N(r,\theta,z)$ until the control bit arrives at node $N(r+1,\theta,h_{r+1}(z))$ is time duration $\beta$. The aforementioned fourth condition also is applicable when a message M moves from a node $N(J,\theta,z)$ to a node $N(J,\theta+1,h_J(z))$ at the outermost level J so that the message M also causes a control code to be sent from node $N(J,\theta,z)$ to the device D outside of the network such that D sends data to $N(J,\theta+1,h_J(z))$. In one embodiment, $D=CU(\theta+1,h_J(z))$. The time that elapses from the time that message M enters node $N(r,\theta,z)$ until the control bit arrives at device $CU(\theta,z)$ is time duration $\beta$. Fifth, the global clock generates timing pulses at a rate of $\alpha$.

When the source device $CU(\theta_1,z_1)$ sends a message packet M to the destination device $CU(\theta_2,z_2)$, the message packet M is sent from a data output terminal of device $CU(\theta_1,z_1)$ to a data input terminal of node $N(J,\theta_1,z_1)$ at the outermost level J. Message packets and control bits enter nodes $N(T,\theta,z)$ on a level T at times having the form $n\alpha+L\beta$ where n is a positive integer. The message M from device $CU(\theta_1,z_1)$ is sent to the data input terminal of node $N(J,\theta_1,z_1)$ at a time $t_0-\beta$ and is inserted into the data input terminal of node $N(J,\theta_1,z_1)$ at time $t_0$ so long as the node $N(J,\theta_1,z_1)$ is not blocked by a control bit resulting from a message traversing on the level J. Time $t_0$ has the form $(\theta_2-\theta_1)\alpha+J\beta$. Similarly, there is a time of the form $(\theta_2-\theta_1)\alpha+J\beta$ at which a data input terminal of node $N(J,\theta_1,z_1)$ is receptive to a message packet from device $CU(\theta_1,z_1)$.

Nodes $N(T,\theta,z)$ include logic that controls routing of messages based on the target address of a message packet M and timing signals from other nodes. A first logic switch (not shown) of node $N(T,\theta,z)$ determines whether the message packet M is to proceed to a node $N(T-1,\theta+1,z)$ on the next level T–1 or whether the node $N(T-1,\theta+1,z)$ is blocked. The first logic switch of node $N(T,\theta,z)$ is set according to whether a single-bit blocking control code sent from node $N(T-1,\theta,H_{T-1}(z))$ arrives at node $N(T,\theta,z)$ at a time $t_0$. For example, in some embodiments the first logic switch takes a logic 1 value when a node $N(T-1,\theta+1,z)$ is blocked and a logic 0 value otherwise. A second logic switch (not shown) of node $N(T,\theta,z)$ determines whether the message packet M is to proceed to a node $N(T-1,\theta+1,z)$ on the next level T–1 or whether the node $N(T-1,\theta+1,z)$ is not in a suitable path for accessing the destination device $CU(\theta_2,z_2)$ of the header of the message packet M. The header of the message packet M includes the binary representation of destination height $z_2$ ($z_{2(J)}, z_{2(J-1)}, \ldots, z_{2(T)}, \ldots, z_{2(1)}, z_{2(0)}$. The node $N(T,\theta,z)$ on level T includes a single-bit designation $z_T$ of the height designation z ($z_J, z_{J-1}, \ldots, z_T, \ldots, z_1, z_0$). In this embodiment, when the first logic switch has a logic 0 value and the bit designation $z_{2(T)}$ of the designation height is equal to the height designation $z_T$, then the message packet M proceeds to the next level at node $N(T-1,\theta+1,z)$ and the destination height bit $z_{2(T)}$ is stripped from the header of message packet M. Otherwise, the message packet M traverses on the same level T to node $N(T,\theta+1,h_T(z))$. If message packet M proceeds to node $N(T-1,\theta+1,z)$, then message packet M arrives at a time $t_0+(\alpha-\beta)$ which is equal to a time $(z_2-z_1+1)\alpha+(J-1)\beta$. If message packet M traverses to node $N(T,\theta+1,h_T(z))$, then message packet M arrives at a time $t_0+\alpha$, which is equal to a time $(z_2-z_1+1)\alpha+J\beta$. As message packet M is sent from node $N(r,\theta,z)$ to node $N(T,\theta+1,h_T(z))$, a single-bit control code is sent to node $N(T+1,\theta,h_T(z))$ (or device $CU(\theta,z)$) which arrives at time $t_0+\beta$. This timing scheme is continued throughout the interconnect structure, maintaining synchrony as message packets are advanced and deflected.

The message packet M reaches level zero at the designated destination height $z_2$. Furthermore, the message packet M reaches the targeted destination device $CU(\theta_2,z_2)$ at a time zero modulus K (the number of nodes at a height z). If the targeted destination device $CU(\theta_2,z_2)$ is ready to accept the message packet M, an input port is activated at time zero modulus K to accept the packet. Advantageously, all routing control operations are achieved by comparing two bits, without ever comparing two multiple-bit values. Further advantageously, at the exit point of the interconnect structure as message packets proceed from the nodes to the devices, there is not comparison logic. If a device is prepared to accept a message, the message enters the device via a clock-controlled gate.

Many advantages arise as a consequence of the disclosed timing and interconnect scheme. In an optical implementation, rather than an electronic implementation, of the interconnect structure, signals that encode bits of the header typical have a longer duration than bits that encode the payload. Header bits are extended in duration because, as message communicate through the interconnect structure, timing becomes slightly skewed. Longer duration header bits allow for accurate reading of the bits even when the message is skewed. In contrast, payload bits encode data that is not read during communication through the interconnect structure. The disclosed timing scheme is advantageous because the number of header bits in a message is greatly reduced. Furthermore, in some embodiments the number of header bits is decremented as bits are used for control purposes at each level then discarded while messages pass from level to level in the interconnect structure. In embodiments that discard a control bit for each level of the interconnect structure, logic at each node is simplified since the control bit at each level is located at the same position throughout the interconnect structure.

That messages communicated on the same level have priority over messages communicated from another level is similarly advantageous because message contention is resolved without carrying priority information in the message header. Message contention is otherwise typically resolved by giving priority to messages that have been in an interconnect structure the longest or to predetermined prioritization. These techniques use information stored in the header to resolve contention.

Although it is advantageous that the interconnect structure and message communication method determines message transmission routing using self-routing decision-making which is local to the nodes and depends on message timing, in some embodiments of the control structure, both local and global communication control is employed. For example, one embodiment of an interconnect structure uses local control which is based on timing to control transmission of message packets in a first transmission mode and alternatively uses global control via a scheduler to administer communication of lengthy strings of message data in a second mode. In the global mode, the usage of a scheduler makes the usage of control bit input and output terminals unnecessary.

One consequence of self-routing of message packets is that the ordering of message packet receipt at a target device may be variable. In some embodiments, the correct order of message segments is ordered by sending ordering information in the message header. Other embodiments employ an optical sorter to order message packets.

Although many advantages are realized through a control structure and communication method which utilizes timing characteristics, rather than control bits in the header, to control message routing, some interconnect node technologies more suitably operate in a routing system utilizing no timing component. Thus in these technologies, instead of introducing a message at predetermined time so that the message arrives at a preset destination at a designated, routing information is contained in additional header bits. Accordingly, a designated target device position is included in header bits, for example bits following the designated target ring position.

In one embodiment, the label of a target device is represented as a single logic one in a string of logic zeros. Thus, when a message arrives at a device N, the device samples the Nth bit of the device element of the header (as distinguished from the ring element) and accepts the message if the Nth bit is a logic one. This technique is highly suitable for optical node implementations.

Nodes

The nodes $N(r,\theta,z)$ have been described in generic terms to refer to various data communication switches for directing data to alternative data paths. Node structures which are presently available include electronic nodes, optical nodes and mixed optical/electronic nodes. What is claimed include, for example, interconnect and timing methods, an interconnect apparatus and an interconnect topology. These methods and apparati involve nodes in a generic sense. Thus, the scope of the claims is not limited by the particular type of node described herein and is to extend to any node known now or in the future, which performs the function of the nodes described herein.

Figure 19:
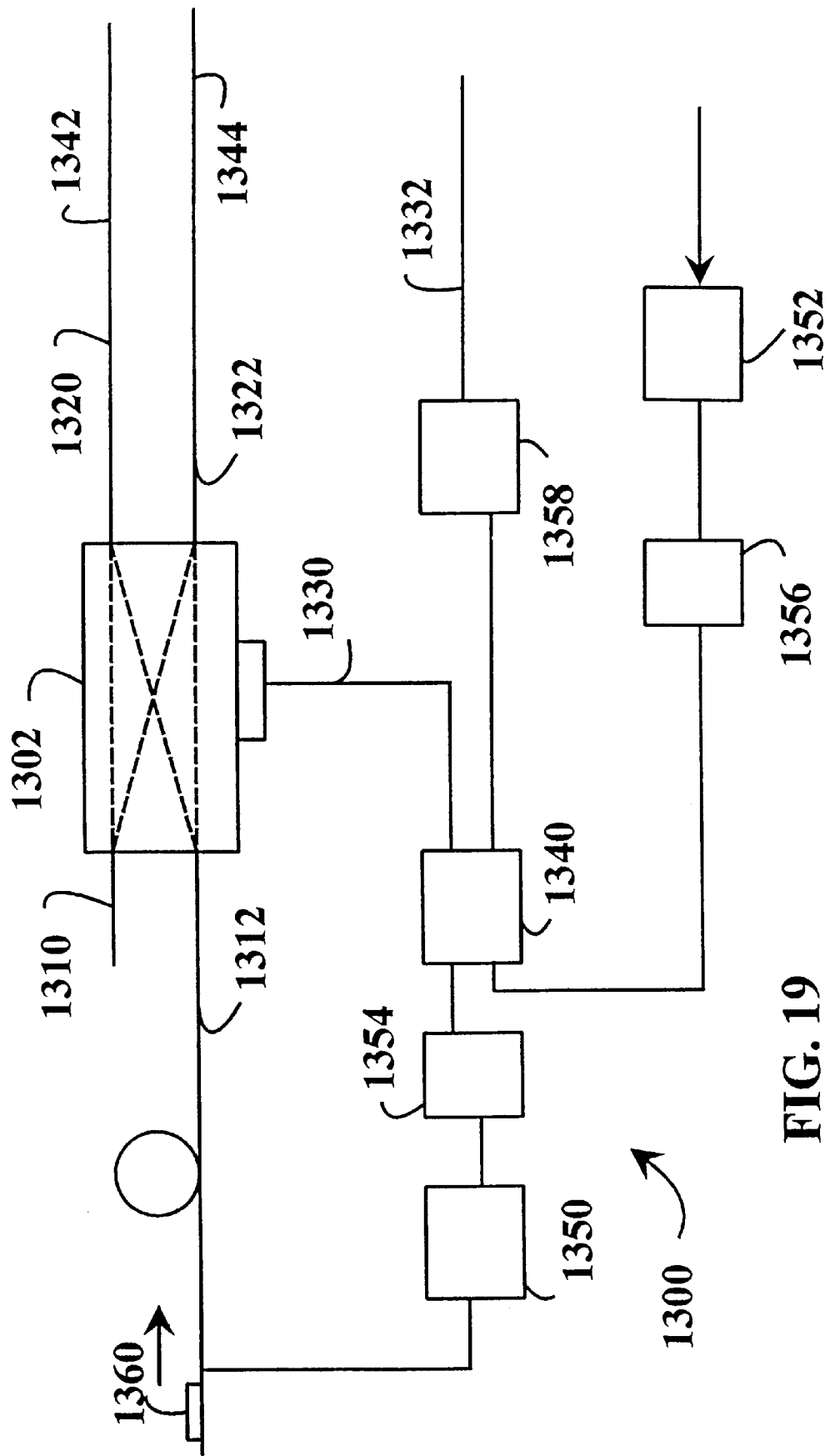
FIG. 19 is a pictorial diagram which illustrates the operation of a lithium niobate node, a first exemplary node structure.

One example of a node 1300 is shown, referring to FIG. 19, which includes a lithium niobate (LiNbO3) gate 1302. The lithium niobate gate 1302 has two data input terminals 1310 and 1312, two data output terminals 1320 and 1322 and one control input terminal 1330. Various control circuitry 1340 is added to the lithium niobate gate 1302 to form a control output terminal 1332 of the node 1300. Node 1300 also includes optical to electronic converters 1354, 1356 and 1358. The lithium niobate gate 1302 is forms a 2×2 crossbar. Data paths 1342 and 1344 are optical and the control of the node 1300 is electronic. The lithium niobate gate 1302 is combined with a photodetectors 1350 and 1352 and a few electronic logic components to form a node 1300 for various embodiments of an interconnect structure.

In operation, as a message packet 1360 approaches the node 1300, part of the message packet signal 1360 is split off and a sync bit 914 of the message packet header (shown in FIG. 18) designating a bit of the binary representation of destination ring in accordance with the discussion hereinbefore, is read by the photodetector 1350. This bit is converted from optical form to an electronic signal. This bit, a bit designating the cylinder height upon which the node 1300 lies and a bit designating whether a destination node on the next level is blocked are processed electronically and a result of the logical tests of these bits is directed to the control input terminal 1330 of the lithium niobate gate 1302. In a first type of lithium niobate gate technology, if the result signal is a logic zero, the gate switches in the cross state. In a second type of lithium niobate gate technology, a logic zero result signal switches the gate in a bar (straight through) state.

Figure 20:
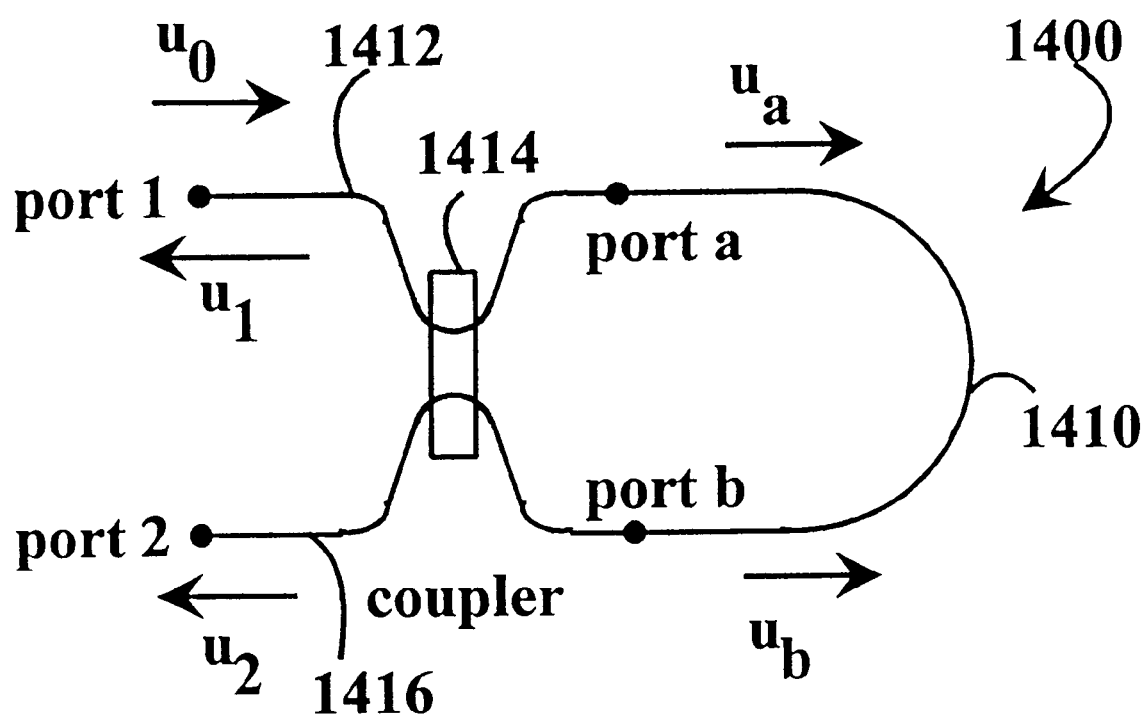
FIG. 20 is a pictorial diagram which illustrates the operation of a nonlinear optical loop mirror (NOLM), a second exemplary node structure.

Referring to FIG. 20, an additional example of a node 1400 is shown. Node 1400 uses a nonlinear optical loop mirror (NOLM) 1410 to perform a switching function. A nonlinear optical loop mirror is a device that makes use of the refractive index of a material to form a completely optical switch that is extremely fast. One example of a NOLM switch includes a data input terminal 1412 and a control input terminal 1414. Depending upon the signal at the control input terminal 1414, data either leaves the NOLM 1410 through the same data input terminal 1412 from which the data entered (hence the term mirror) or the data exits through a data output terminal 1416. Data is polarized and split into two signal "halves" of equal intensity. In the absence of a control pulse, the two halves of the signal recombine and leave the NOLM 1410 through the data input terminal 1414. When a control pulse is applied to the control input terminal 1414, the control pulse is polarized at right angles to the data pulse and inserted into the NOLM 1410 so that the control pulse travels with one half of the data pulse. The control pulse is more intense than the data pulse and the combined first half of the data pulse and the control pulse quickly pass the second half of the data pulse so that the second half of the data pulse is only minimally accelerated. Thus, the two halves of the data pulse travel with slightly different velocities and are 180° out of phase when the two halves are recombined. This phase difference causes the combined data pulse signal to pass through the data output terminal 1416. One disadvantage of the NOLM 1410 is that switching is operational only when a long optical transmission loop is employed, thus latency is a problem.

Figure 21:
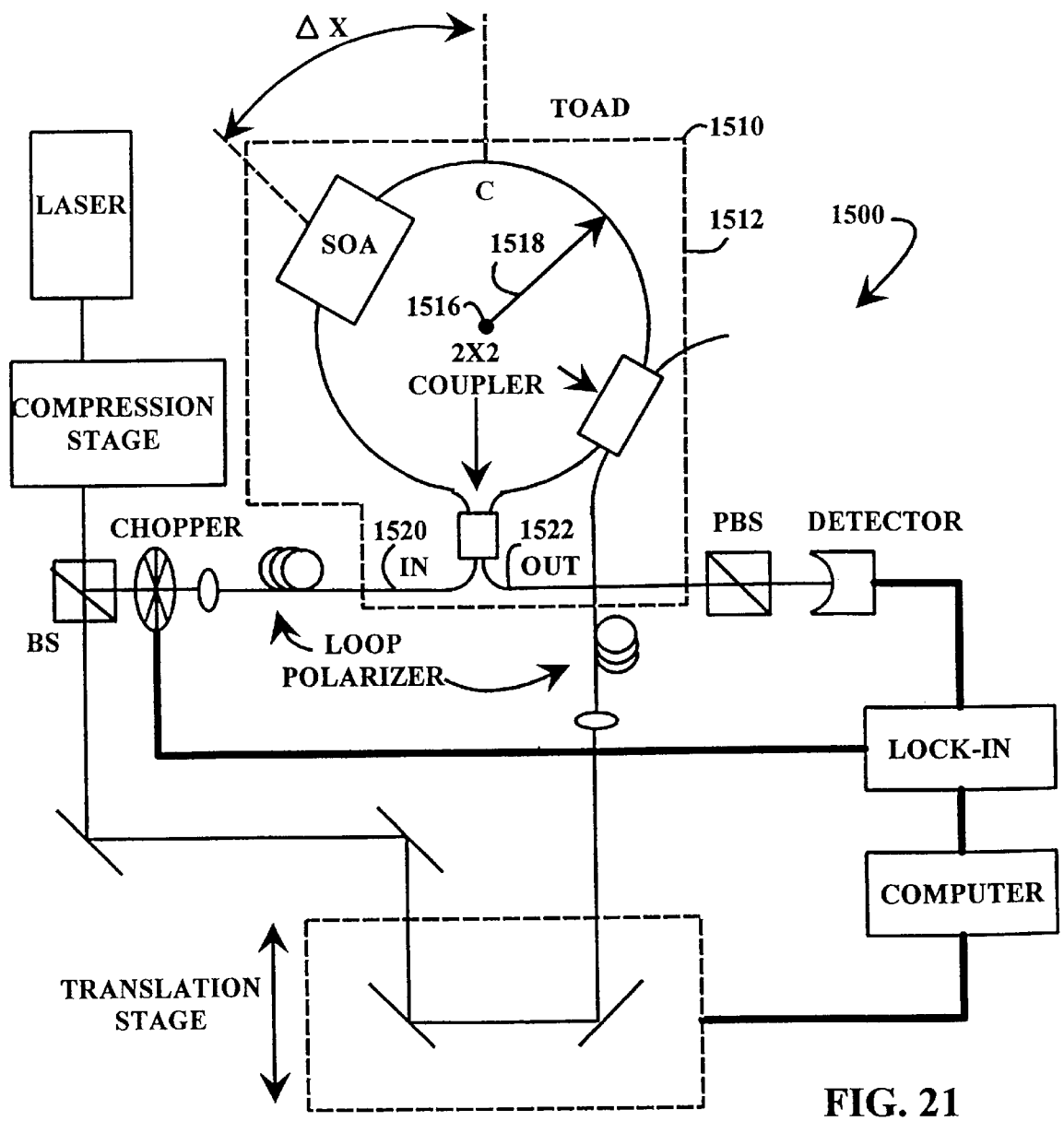
FIG. 21 is a pictorial diagram which illustrates the operation of a terahertz optical asymmetrical demultiplexer (TOAD) switch, a third exemplary node structure.

Referring to FIG. 21, another example of a node 1500 is shown which uses a terahertz optical asymmetrical demultiplexer (TOAD) switch 1510. The TOAD switch 1510 is a variation of the NOLM switch 1410. The TOAD 1510 includes an optical fiber loop 1512 and a semiconductor element 1514, a nonlinear element (NLE) or a semiconductor optical amplifier for example. The TOAD switch 1510 has an input data terminal 1520 which also serves as an output data port under some conditions. The TOAD switch 1510 also has a separate second output data terminal 1522. The semiconductor element 1514 is placed asymmetrically with respect to the center 1516 of the fiber optic loop 1512. A distance 1518 from the semiconductor element 1514 to the center 1516 of the fiber optic loop 1512 is the distance to transmit one bit of data. The TOAD 1510 functions by removing a single bit from a signal having a high data rate. The TOAD 1510 is switched by passing a constant electrical current through the semiconductor element 1514. An optical signal entering the semiconductor material causes the index of refraction of the material to immediately change. After the optical signal terminates, the index of refraction slowly (a time span of several bits) drifts back to the level previous to application of the optical signal. A control pulse is an optical signal having an intensity higher than that of an optical data signal and polarization at right angles to the optical data signal. An optical data input signal is polarized and split into two signal "halves" of equal intensity. The control pulse is injected in a manner to move through the fiber optic loop 1512 directly over the bit that is to be removed. Because the distance 1518 is exactly one bit long, one half of the split optical data signal corresponding to a bit leaves the semiconductor element 1514 just as the other half of the bit enters the semiconductor element 1514. The control pulse only combines with one half of the optical data signal bit so that the velocity of the two halves differs. The combined data and control signal bit exists the TOAD 1510 at the input data terminal 1520. Thus, this first bit is removed from the data path. A next optical signal bit is split and a first half and second half, moving in opposite directions, are delayed approximately the same amount as the index of refraction of the semiconductor element 1514 gradually changes so that this bit is not removed. After a few bits have passes through the semiconductor element 1514, the semiconductor material relaxes and another bit is ready to be multiplexed from the optical data signal. Advantageously, the TOAD 1510 has a very short optical transmission loop 1512.

Regenerators

It is a characteristic of certain nodes that messages lose strength and pick up noise as they propagate through the nodes. Using various other nodes, message signals do not lose strength but noise accumulates during message transmission. Accordingly, in various embodiment of the interconnect structure, signal regenerators or amplifiers are used to improve message signal fidelity after messages have passed through a number of nodes.

Figure 22:
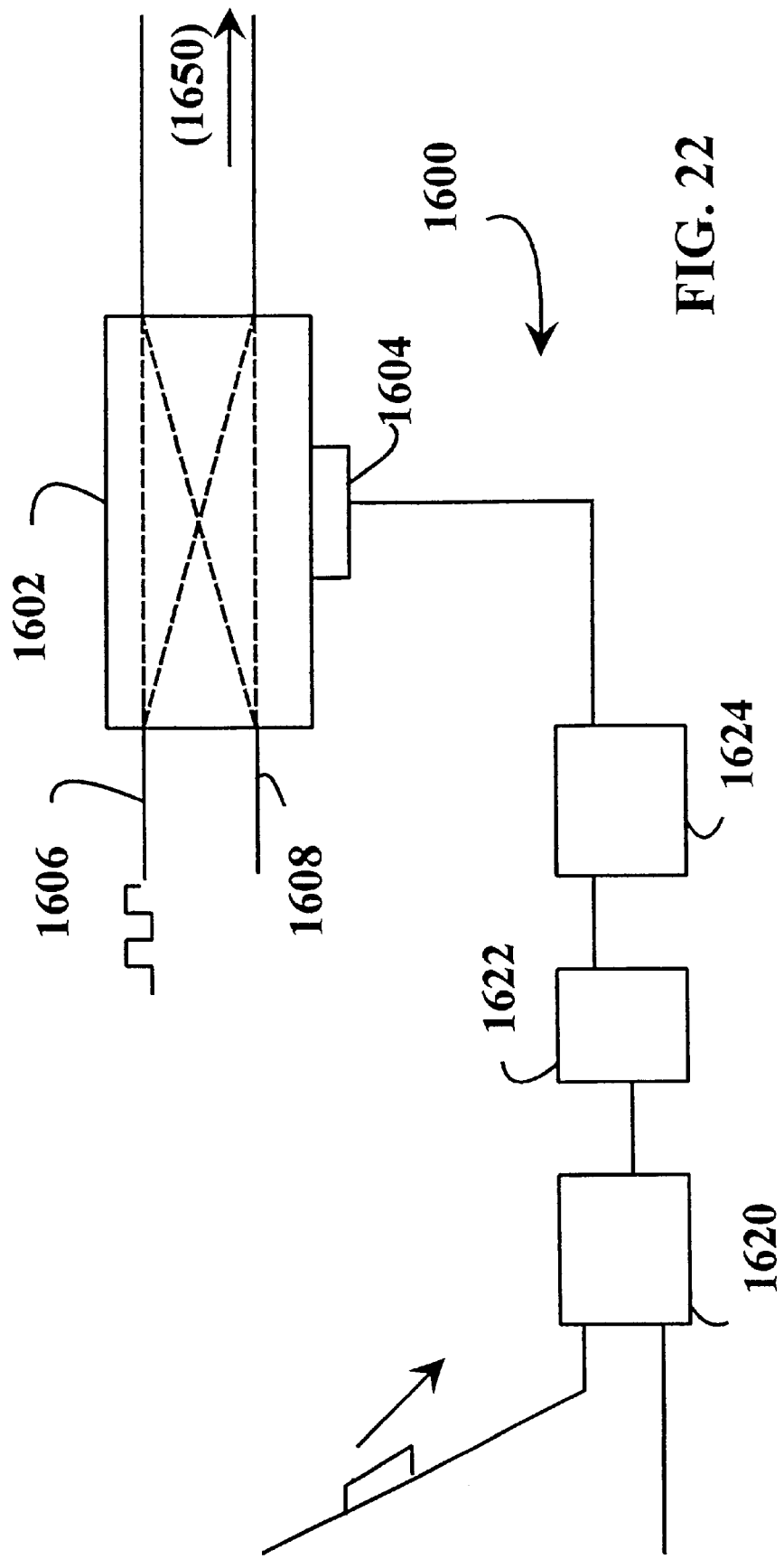
FIG. 22 is a pictorial diagram showing the operation of a regenerator utilizing a lithium niobate gate.

Referring to FIG. 22, one embodiment of a regenerator 1600 is shown which is constructed using a lithium niobate gate 1602. A lithium niobate gate 1602 regenerates message data having a transmission speed of the order of 2.5 gigabits. The lithium niobate gate 1602 detects and converts an optical message signal to an electronic signal which drives an electronic input port 1604 of the lithium niobate gate 1602. The lithium niobate gate 1602 is clocked using a clock signal which is applied to one of two optical data ports 1606 and 1608 of the gate 1602. The clock signal is switched by the electronic control pulses and a high fidelity regenerated signal is emitted from the lithium niobate gate 1602.

Typically, an interconnect structure utilizing a lithium niobate gate 1602 in a regenerator 1600 also uses lithium niobate gates to construct nodes. One large power laser (not shown) supplies high fidelity timing pulses to all of the regenerators in an interconnect structure. The illustrative regenerator 1600 and node 1650 combination includes an optical coupler 1620 which has a first data input connection to a node on the same level C as the node 1650 and a second data input connection to a node on the overlying level C+1. The illustrative regenerator 1600 also includes a photodetector 1622 connected to an output terminal of the optical coupler 1620, optical to electronic converter 1624 which has an input terminal connected to the optical coupler 1620 through the photodetector 1622 and an output terminal which is connected to the lithium niobate gate 1602. An output terminal of the lithium niobate gate 1602 is connected to a second lithium niobate gate (not shown) of a node (not shown). Two signal lines of the lithium niobate gate (not shown) are combined, regenerated and switched.

When regenerators or amplifiers are incorporated to improve signal fidelity and if the time expended by a regenerator or amplifier to recondition a message signal exceeds the time $\alpha-\beta$, then the regenerator or amplifier is placed prior to the input terminal of the node and timing is modified to accommodate the delay.

Other Embodiments

The interconnect structure shown in FIGS. 1 through 16 is a simplified structure, meant to easily convey understanding of the principles of the invention. Numerous variations to the basic structure are possible. Various examples of alternative interconnect structures are discussed hereinafter, along with advantages achieved by these alternative structures.

Figure 23:
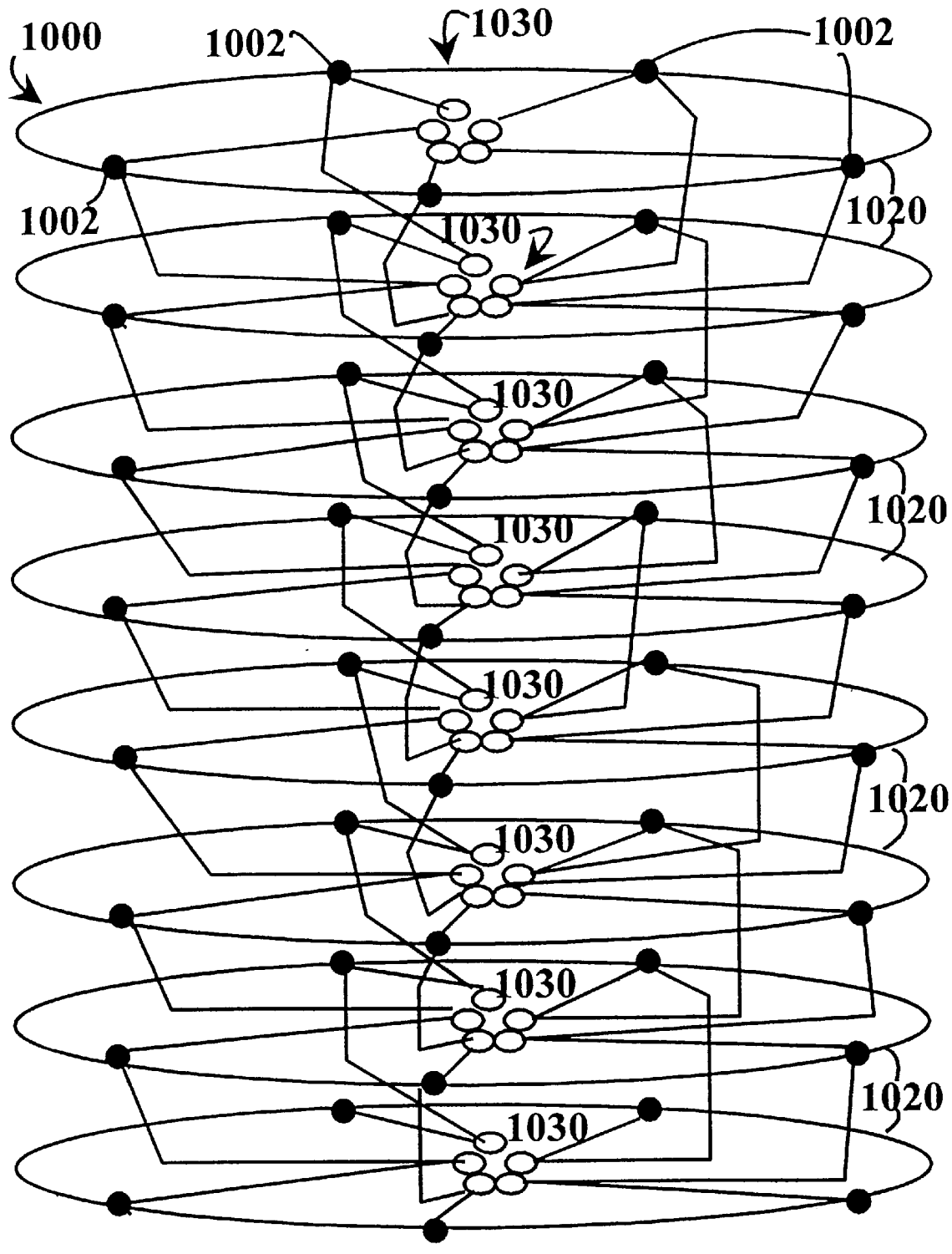
FIG. 23 is an abstract schematic pictorial diagram illustrating an alternative embodiment of an interconnect structure in which devices issue message packets to multiple nodes.

Referring to FIG. 23, an alternative embodiment of an interconnect structure 1000 includes devices 1030 which issue message packets to multiple nodes 1002 of the outermost level J. In the interconnect apparatus 100 shown in FIGS. 1 through 16, a device CU(θ,z) initiates a message transmission operation by sending a message packet to a node N(J,θ,z). In the alternative interconnect structure 1000, the device CU(θ,z) initiates a message transmission operation by sending a message packet to node N(J,θ,z) but, in addition, also includes interconnections to additional multiple nodes N(J',θ',z') where z designates cylinder heights selected from heights 0 to $2^J$ of the outermost level J and θ designates node angles selected from angles 0 to K of the heights z. In the case that a device sends messages to more than one node in the outermost level, the disclosed timing scheme maintains the characteristic that messages arrive at the target node at time zero modulus K.

Devices are connected to many nodes in the outermost level J to avoid congestion upon entry into the interconnect structure caused by multiple devices sending a series of messages at a high rate to nodes having converging data paths. In some embodiments, the nodes to which a device is connected are selected at random. In other embodiments, the multiple interconnection of a device to several nodes is selected in a predetermined manner. An additional advantage arising from the connection of a device to several nodes increases the input bandwidth of a communication network.

Figure 24:
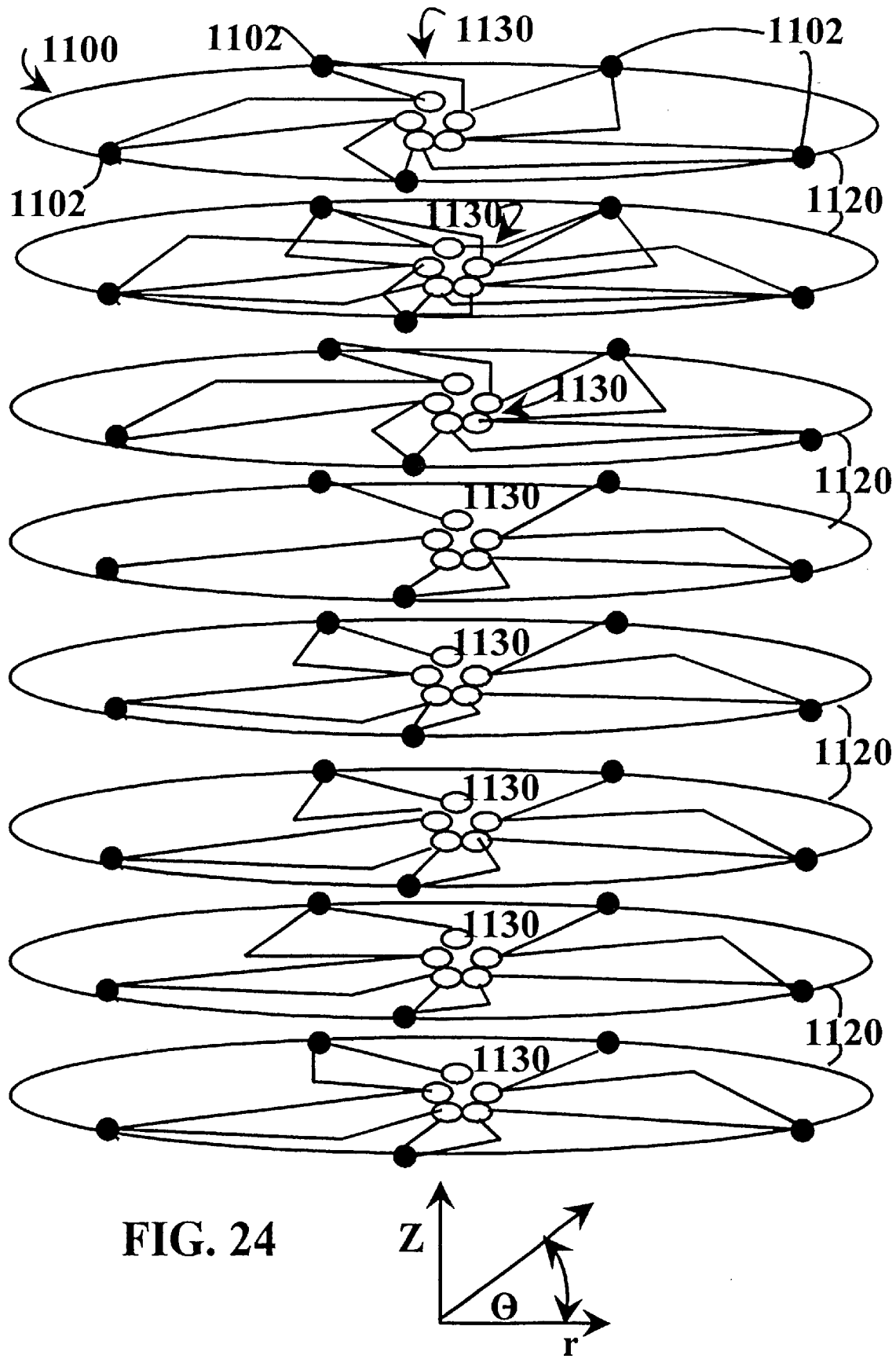
FIG. 24 is an abstract schematic pictorial diagram illustrating an alternative embodiment of an interconnect structure in which devices receive message packets from multiple nodes.

Referring to FIG. 24, an alternative embodiment of an interconnect structure 1100 includes devices 1130 which receive message packets from multiple nodes 1102 of the innermost level 0. In this example, the number of nodes K at a particular height z is nine and each device 1130 is connected to receive message from three nodes on level zero. The interconnect structure 1100 is advantageous for improving network exit bandwidth when the number of nodes K on at a particular height is large.

In the example in which the number of nodes K on a height z is nine and each device receives messages from three nodes on level zero, each node on ring zero is connected to a buffer that has three levels. At time 0 message data is injected into the level zero buffer. At time three, data is injected into the level one buffer. At time 6, data is injected into the level two buffer. A device CU(θ,0) reads from the level zero buffer at node N(0,θ,0), from the level one buffer at node N(0, (θ+3)mod 9,0), and from the level two buffer at node N(0, (θ+6)mod 9,0). This reading of message data is accomplished in a synchronous or nonsynchronous manner. If in the synchronous mode, a time t is expended to transfer data from the buffer to the device. In this case, the device CU(θ,0) reads from the level zero buffer at time t, reads from the level three buffer at time 3+t, and reads from the level six buffer at time 6+t. In an asynchronous mode, device CU(θ,0) interconnects to the three buffers as described hereinbefore and reads message data whenever a buffer signals that data is available.

Figure 25:
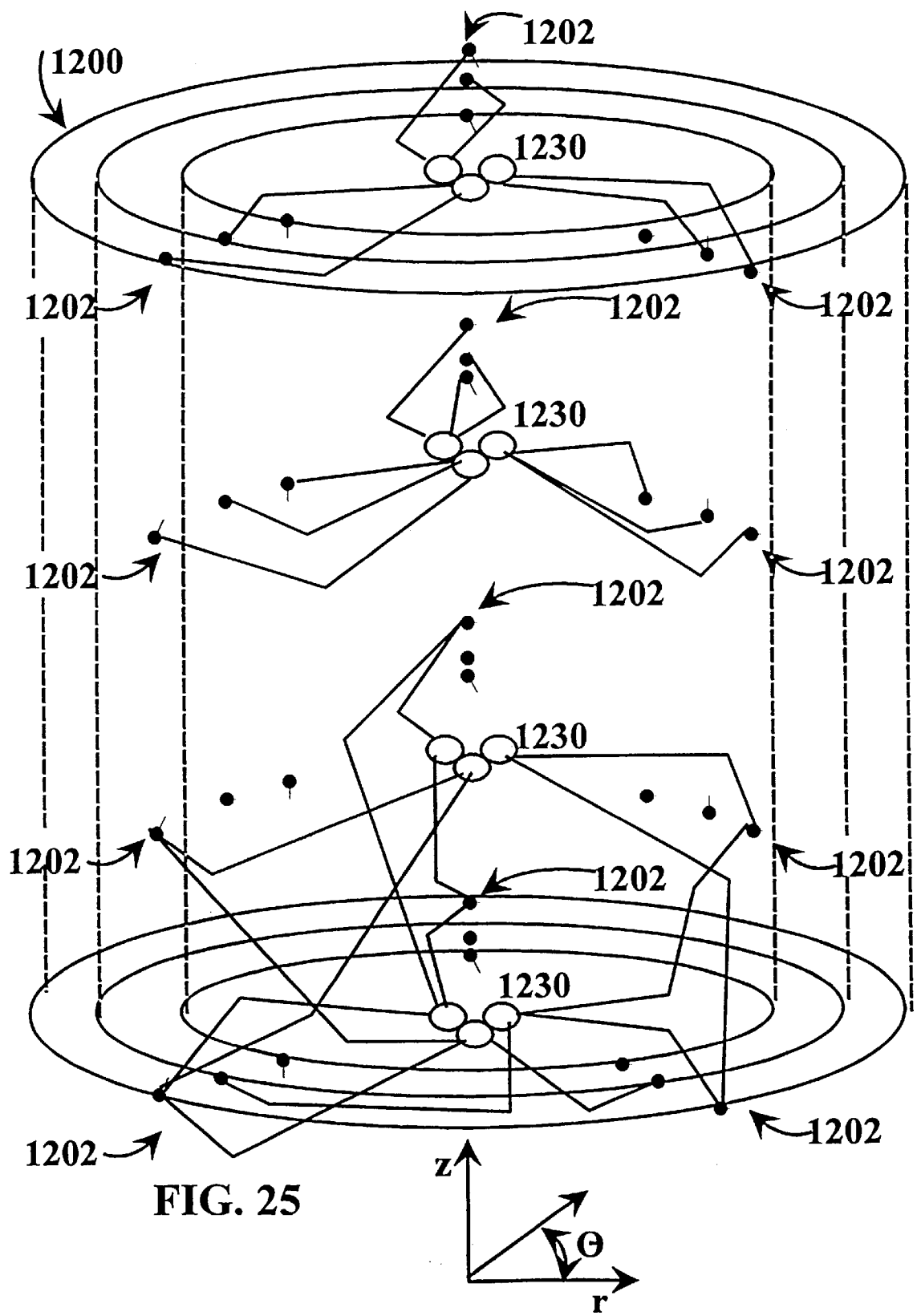
FIG. 25 is an abstract schematic pictorial diagram illustrating an alternative embodiment of an interconnect structure in which devices issue message packets to nodes at various interconnect levels.

Referring to FIG. 25, an alternative embodiment of an interconnect structure 1200 includes devices 1230 which issue message packets to multiple nodes 1202, not only in the outermost level J but also in other levels. In the alternative interconnect structure 1200, the device CU(θ,z) initiates a message transmission operation by sending a message packet to node N(J,θ,z) but, in addition, also includes interconnections to additional multiple nodes N(T,θ,z) where T designates levels of the interconnect structure 1200, z designates cylinder heights selected from heights 0 to $2^J$ of the outermost level J and θ designates node angles selected from angles 0 to K of the heights z. In the case that a device sends messages to nodes in more than level, message communication is controlled according to a priority, as follows. First, messages entering a node N(r,θ,z) from the same level T have a first priority. Second, messages entering a node N(r,θ,z) from a higher level T+1 have a second priority. Messages entering a node N(r,θ,z) from a device CU(θ,z) have last priority. The alternative embodiment of interconnect structure 1200 allows a device to send messages to neighboring devices more rapidly. The disclosed timing scheme maintains the characteristic that messages arrive at the node designated in the message header at time zero modulus K.

In these various embodiments, devices accept data from level zero nodes using one of various predetermined techniques. Some embodiments rely exclusively on timing to determine when the devices accept data so that devices accept data at time zero modulus K. Some embodiments include devices that accept message data at various predetermined times with respect to modulus K timing. Still other embodiments have devices that accept data whenever a buffer is ready to accept data.

Wave Division Multiplexing Embodiment

In another embodiment of an interconnect structure, message signal bandwidth is increased using wave division multiplexing. A plurality of K colors are defined and generated in a message signal that is transmitted using an interconnect structure having K devices at a cylinder height. Accordingly, each device is assigned a particular color. Message packets travel to a preselected target ring in the manner described hereinbefore for a single wavelength interconnect system. Message packets pass from level zero to the appropriate device depending on the color assigned to the message packet.

A message includes a header and a payload. The header and payload are distinguished by having different colors. Similarly, the payload is multiplexed using different colors, which are also different from the color of the header. Message bandwidth is also increased by combining different messages of different colors for simultaneous transmission of the messages. Furthermore, different messages of different colors are bound on a same target ring, combined an transmitted simultaneously. All messages are not demultiplexed at all of the nodes but, rather, are demultiplexed at input buffers to the devices.

Variable Base $i^J$ Height Structure Embodiment

In a further additional embodiment, an interconnect structure has $i^J$ cylindrical heights on a level for each of J+1 levels, where i is a suitable integer number such as 2 (the previously described embodiment), 3, 4 or more. As was described previously, each height contains K nodes, and each node has two data input terminals, two data output terminals, one control input terminal and one control output terminal.

For example, an interconnect structure may have $3^J$ heights per level. On level one, message data is communicated to one of three level zero heights. On level two, message data is communicated to one of nine level zero heights and so forth. This result is achieved as follows. First, the two output data terminals of a node N(r,θ,z) are connected to input data terminals of a node N(T−1,θ+1,z) and a node N(T,θ+1,$h_T(z)$), in the manner previously discussed. However in this further embodiment, a third height transformation $h_T(h_T(h_T(z)))$ rather than a second height transformation $h_T(h_T(z))$ is equal to the original height designation z. With the nodes interconnected in this manner, the target ring is accessible to message data on every third step on level one. In an interconnect structure having this form, although nodes having two output data terminals are suitable, advantages are gained by increasing the number of output data terminals to three. Thus, one data output terminal of a node on a given level is connected to two nodes on that level and to one node on a successive level. Accordingly, each level has $3^J$ heights and a message packet and a message can descend to a lower level every other step.

In this manner, many different interconnect structures are formed by utilizing $i^J$ heights per level for various numbers i. Where i is equal to 4, the fourth height transformation $h_T(h_T(h_T(h_T(z))))$ is equal to the original height designation z. If i is 5, the fifth height transformation $h_T(h_T(h_T(h_T(h_T(z)))))$ is the same as the original height z, and so forth.

In the variable base $i^J$ height structure embodiment, whether the target ring is accessible from a particular node is determined by testing a more than one bit of a code designated the target ring.

Variable Base Transformation Technique Embodiment

In a still further embodiment of an interconnect structure, the height transformation technique outlined hereinbefore is modified as follows. In this embodiment, a base three notation height transform technique is utilized rather than the binary height transformation technique discussed previously. In the base three transformation technique, a target ring is designated by a sequence of base three numbers. Thus, one a level n, the n low-order base three numbers of the height designation are reversed in order, the low-order-bit-reversed height designation is incremented by one, and the n low-order base three numbers are reversed back again. An exemplary interconnect structure has four levels (J=3 plus one), nine heights ($3^J=3^3$) per level and five nodes (K=5) per height. In accordance with the base three height transformation technique, node $N_{23(201)}$ on level 2 has a first data input terminal connected to a data output terminal of node $N_{32(201)}$ on level 3, a second data input terminal connected to a data output terminal of node $N_{22(220)}$ on level two. Node $N_{23(201)}$ also has a first data output terminal connected to a data input terminal of node $N_{14(201)}$ on level one and a second data output terminal connected to a data input terminal of node $N_{24(211)}$. Node $N_{23(201)}$ also has a control input bit connected to a control output bit of node $N_{13(200)}$ and a control output bit connected to a control input bit of node $N_{33(211)}$. In this embodiment, the header includes a synch bit followed by the address of a target ring in base three. For example, the base three numbers are symbolized in binary form at 00, 01 and 10 or using three bits in the form 001, 010 and 100.

Further additional height transformation techniques are possible using various numeric bases, such as base 5 or base 7 arithmetic, and employing the number reversal, increment and reversal back method discussed previously.

Multiple Level Step Embodiment

In another embodiment, an interconnect structure of the nodes have ten terminals, including five input terminals and five output terminals. The input terminals include three data input terminals and two control input terminals. The output terminals include three data output terminals and two control output terminals. In this interconnect structure, nodes are generally connected among five adjacent cylindrical levels. Specifically, nodes $N(T,\theta,z)$ at the T cylindrical level have terminals connected to nodes on the T, T+1, T+2, T−1 and T−2 levels. These connections are such that the nodes $N(T,\theta,z)$ have data input terminals connected to nodes on the same level T, the next outer level T+1 and the previous outer level T+2. In particular, nodes $N(T,\theta,z)$ have data input terminals connected to data output terminals of nodes $N(T,\theta−1,h_T(z))$, $N(T+1,\theta−1,z)$ and $N(T+2,\theta−1,z)$. Nodes $N(T,\theta,z)$ also have control output terminals, which correspond to data input terminals, connected to nodes on the next outer level T+1 and the previous outer level T+2. Nodes $N(T,\theta,z)$ have control output terminals connected to control input terminals of nodes $N(T+1,\theta−1,z)$ and $N(T+2,\theta−1,z)$. Nodes $N(T,\theta,z)$ also have data output terminals connected to nodes on the same level T, the next inner level T−1 and the subsequent inner level T−2. In particular, nodes $N(T,\theta,z)$ have data output terminals connected to data output terminals of nodes $N(T,\theta+1,H_T(z))$, $N(T−1,\theta+1,z)$ and $N(T−2,\theta+1,z)$. Nodes $N(T,\theta,z)$ also have control input terminals, which correspond to data output terminals, connected to nodes on the next inner level T−1 and the subsequent inner level T−2. Nodes $N(T,\theta,z)$ have control input terminals connected to control output terminals of nodes $N(T−1,\theta+1,z)$ and $N(T−2,\theta+1,z)$.

This ten-terminal structure applies only to nodes at the intermediate levels 2 to J−2 since nodes at the outer levels J and J−1 and at the inner levels 1 and 0 have the same connections as the standard six-terminal nodes.

This ten-terminal structure allows messages to skip past levels when possible and thereby pass through fewer nodes at the cost of increasing logic at the nodes. Only one message is allowed to enter a node at one time. The priority of message access to a node is that a message on the same level has top priority, a message from a node one level removed has second priority and a message from a node two levels away has last priority. Messages descend two levels whenever possible. The timing rules for an interconnect structure with ten terminals are the same as the timing rules using the six-terminal nodes. Advantages of the ten-terminal node interconnect structure are that messages pass more quickly through the levels.

Other interconnect structure embodiments include nodes having more than ten terminals so that data and control terminals are connected to additional nodes on additional levels. For example, various nodes $N(T,\theta,z)$ also have associated control input terminals and data output terminals, which are connected to nodes on inner levels T−3, T−4 and so on. In other examples, various nodes $N(T,\theta,z)$ also have associated control output terminals and data input terminals, which are connected to nodes on outer levels T+3, T+4 and so on. In various interconnect structure embodiments, nodes may be connected among all levels or selected levels.

Multiple Interconnections to the Same Level Embodiment

Additional interconnect structure embodiments utilize additional interconnections among nodes on the same level. Specifically, nodes $N(T,\theta,z)$ on the level T have interconnections in addition to the connections of (1) an output data terminal connected to an input data terminal of nodes $N(T,\theta+1,h_T(z))$ and (2) an input data terminal connected to an output data terminal of nodes $N(T,\theta−1,H_T(z))$. Thus nodes $N(T,\theta,z)$ on the level T have interconnections including a connection of (1) an output data terminal connected to an input data terminal of nodes $N(T,\theta+1,g_T(z))$ and (2) an input data terminal connected to an output data terminal of nodes $N(T,\theta−1,h_T(z))$. Like cylinder height $h_T(z)$, height $g_T(z)$ is on the half of the interconnect structure of level T that is opposite to the position of height z (meaning bit T of the binary code describing height $h_T(z)$ and $g_T(z)$ is complementary to bit T of height z).

Multiple Interconnections to a Next Level Embodiment

A multiple interconnections to a next level embodiment is similar to the multiple interconnections to the same level embodiment except that node N(T,θ,z) has one output data terminal connected to one node N(T,θ+1,$h_T(z)$) on level T and two output data terminal connected to two nodes N(T−1,θ+1,z) and N(T−1,θ+1,$g_{T-1}(z)$) on level T−1. Thus one data output interconnection traverses the same level, a second interconnection progresses one level and a third interconnection both progresses one level and traverses. Like height $h_T(z)$, height $g_T(z)$ is on the half of the interconnect structure of level T that is opposite to the position of height z. Conflicts between node access are resolved by applying a first priority to messages moving on the same level, a second priority to messages progressing one level and a third priority to messages both progressing one level and traversing.

The description of certain embodiments of this invention is intended to be illustrative and not limiting. Numerous other embodiments will be apparent to those skilled in the art, all of which are included within the broad scope of this invention. For example, many different types of devices may be connected using the interconnect structure including, but not limited to, workstations, computers, terminals, ATM machines, elements of a national flight control system and the like. Also, other interconnection transformations other than $h_T$ and $H_T$ may be implemented to describe the interconnections between nodes.

The description and claims occasionally make reference to an interconnect structure which is arranged in multiple dimensions. This reference to dimensions is useful for understanding the interconnect structure topology. However, these dimensions are not limited to spatial dimensions but generally refer to groups of nodes which are interconnected in a particular manner.

What is claimed is:

1. A method of transmitting a message from a node N to a target destination in a first, a second and a third dimension of three dimensions in an interconnect structure arranged as a plurality of nodes in a topology of the three dimensions, the method comprising:

determining whether a node en route to the target destination in the second and third dimensions and advancing one level toward the destination level of the first dimension is blocked by another message;

advancing the message one level toward the destination level of the first dimension when the en route node is not blocked;

moving the message in the second and third dimensions along a constant level in the first dimension otherwise;

specifying the first dimension to describe a plurality of levels, the second dimension to describe a plurality of nodes spanning a cross-section of a level, and the third dimension to describe a plurality of nodes in the cross-section of a level;

sending a control signal from a node on the level of the en route node to the node N in the first dimension, the control signal specifying whether the node en route is blocked;

timing transmission of a message using a global clock specifying timing intervals to keep integral time modulus the number of nodes in a cross-section of a level;

setting a first time interval α for moving the message in the second and third dimensions;

setting a second time interval α-β for advancing the message one level toward the destination level, the global clock specifying a global time interval equal to the second time interval, the first time interval being smaller than the global time interval; and setting a third time interval for sending the control signal from the node on the level of the en route node to the node N, the third time interval being equal to β.

2. A method according to claim 1, further comprising:

timing the message moving and advancing steps so that the messages enter node N on level q at times having the form nα+qβ; and timing the control signal sending step so that the control signals enter node N on level q at times having the form nα+qβ so long as the node en route is not blocked.

3. A method according to claim 1, further comprising:

timing transmission of a message using a global clock;

setting a first time interval for moving the message in the second and third dimensions; and setting a second time interval for advancing the message one level toward the destination level in the first dimension.

4. A method according to claim 3, further comprising:

specifying the first dimension to describe a plurality of levels, the second dimension to describe a plurality of nodes spanning a cross-section of a level, and the third dimension to describe a plurality of nodes in the cross-section of a level;

specifying timing interval of the global clock to keep integral time modulus the number of nodes in a cross-section of a level, the global clock time interval being equal to the second time interval and the first time interval being smaller than the global time interval.

5. A method according to claim 1 further comprising:

defining a header and a payload in the message;

encoding the destination in the second dimension in the header;

determining whether a potentially en route node is en route to the target destination including the steps of:
   comparing the encoded destination in the second dimension to an encoded position of the potentially en route node;

resolving that the potentially en route node is en route when the encoded destination is the same as the encoded position of the potentially en route node.

6. A method according to claim 5 wherein:

the destination in the third dimension in the header is encoded in a plurality of single-bit codes, the single-bit codes relating to a level of the third dimension;

the position of the potentially en route node is encoded in a single-bit code; and the comparing step is a single-bit comparison of the level-specific, single-bit destination code and the single-bit position code.

7. A method according to claim 6 further comprising:

discarding the level-specific, single-bit destination code in the header as the message advances one level.

8. A method according to claim 1 further comprising:

on a level T of the first dimension, spanning one ring in $2^T$ passes through the nodes in the second dimension so that $2^T$ nodes in the third dimension designate one ring; and interconnecting the three dimensional interconnect structure so that advancing of levels from a start level to the destination level of the first dimension furnishes access to all nodes in a ring.

9. A method according to claim 1 wherein a message injected into the interconnect structure at a node N(J, q1, z1) and target to exist the interconnect structure at a node N(0, q2, z2) and injected at a time (q2−q1)modK*a+J causes the message to arrive at node N(0, q2, z2) at time 0.

10. A communication interconnect structure for transmitting messages, comprising:
   a plurality of nodes arranged in a structure including:
      a hierarchy of levels from a source level to a destination level;
      a plurality of nodes spanning a cross-section of a level; and
      a plurality of nodes in a cross-section span, the level of a node being determined entirely by the position of the node in the structure;
   a plurality of interconnect lines coupling the nodes in the structure including for a node N on a level L:
      a message input interconnect line coupled to a node on a previous level L+1;
      a message input interconnect line coupled to a node on the level L;
      a message output interconnect line coupled to a node on the level L;
      a message output interconnect line coupled to a node X on a subsequent level L−1;
      a control input interconnect line coupled to the message output interconnect line of a node distinct from the node X on the level L−1; and
      a switch coupled to receive a message on the control input interconnect line and, in accordance with the message, to selectively transmit a message without buffering on the message output interconnect line coupled to the subsequent level L−1 node or on the message output interconnect line coupled to the level L.

11. An interconnect structure according to claim 10, further comprising:
   a control output interconnect line coupled to a control input terminal of the node on the previous level L+1;
   a switch for determining that a message is blocking the node N and communicating via the control input interconnect line informing whether the node N is blocked.

12. An interconnect structure according to claim 11, further comprising:
   a global clock generating timing signals, the timing signals in discrete time steps of an integral time modulus the number of nodes on a level timing a message transmission time of a message transmitted from a level to a subsequent level and for timing a control signal transmission time of a control signal from a subsequent level to a level so that the control signal arrives first at a node.

13. An interconnect structure according to claim 12, further comprising:
   a control output interconnect line coupled to a control input terminal of the node on the previous level L+1;
   a switch for determining that a message is blocking the node N and communicating via the control input interconnect line informing whether the node N is blocked.

14. A method of communicating messages in an interconnect structure comprising:
   arranging a plurality of nodes in a structure including a plurality of hierarchical levels from a source level to a destination level, the level of a node being determined entirely by the position of the node in the structure, a plurality of nodes spanning a cross-section of a level and a plurality of nodes in a cross-section span, the nodes having an input connection on the same level, an input connection on a previous level, an output connection on the same level and an output connection on a subsequent level;
   specifying a destination node in the destination level for receiving a message;
   originating the message at a node in the source level;
   communicating a message from node to node including:
      determining at a node whether a node X on a subsequent level is directed toward the destination node;
      determining at a node whether the node on the subsequent level is blocked by another message, the determination being based on a control signal from a node distinct from the node X;
      advancing the message to the node on the subsequent level when the node is directed toward the destination node and a node is unblocked; and
      otherwise traversing the message to a node on the same level.

15. A method according to claim 14 wherein determining whether a node on a subsequent level is directed toward the destination node further comprises:
   encoding the destination node in a message in the header field;
   encoding a designation of node position for the nodes at the levels; and
   determining that the node on the subsequent level is directed toward the destination node when the destination node encoding and the node position designation encoding correspond.

16. A communication interconnect structure comprising:
   a plurality of nodes; and
   a plurality of interconnect lines coupling the nodes, a node X of the plurality of nodes having:
      a message input interconnect line coupled to a node A distinct from the node X; and
      a message input interconnect line coupled to a node B distinct from the node A and the node X, the node X accepting a message input from the node A and a message input from the node B with a control interconnect line being coupled between the node A and the node B for communicating a control signal determining a priority relationship between conflicting messages, the control signal enforcing the priority relationship between the sending of a message from the node A to the node X and the sending of a message from the node B to the node X.

17. An interconnect apparatus, comprising:
   a plurality of nodes; and
   a plurality of interconnect lines in an interconnect structure selectively coupling the nodes in a hierarchical multiple level structure arranged to include:
      a plurality of J+1 levels in an hierarchy of levels arranged from a lowest destination level $L_0$ to a highest level $L_J$ which is farthest from the lowest destination level $L_0$, the level of a node being determined entirely by the position of the node in the structure, the interconnect structure transmitting a message M in a plurality of discrete time steps, the message M moving in a time step and the interconnect structure having interconnections to move the message M in one of three ways in the time step including:

the message M enters a node in the interconnect structure from a device external to the interconnect structure;

the message M exits the interconnect structure to a designated output buffer; and the message M either moves from a node U on a level $L_k$ to a different node V on the same level $L_k$ or moves from the node U to a node W on a level $L_i$ where k is greater than i so that the level $L_i$ is closer to the destination level $L_0$ than the level $L_k$, and the node U uses a control signal from a source distinct from the node V and the node W to determine where to send the message M.

18. An interconnect apparatus according to claim 17, wherein the interconnect structure is self-routing.

19. An interconnect apparatus according to claim 17, wherein a node $N_{Ak}$ on the level $L_k$ has a plurality of interconnections including:

a direct data input interconnection from a node $N_{Bk}$ on the level $L_k$;

a direct data output interconnection to a node $N_{Dk}$ on the level $L_k$;

a direct data input interconnection from a node $N_{Cm}$ on the level $L_m$ where m is greater than k so that the level $L_m$ is farther from the destination level $L_0$ than the level $L_k$; and a direct data output interconnection to a node $N_{Ei}$ on the level $L_i$ where k is greater than i so that the level $L_i$ is closer to the destination level $L_0$ than the level $L_k$.

20. An interconnect apparatus according to claim 17, wherein a node $N_{Ak}$ on the level $L_k$ has a plurality of interconnecting including:

a direct data input interconnection from a node $N_{Bk}$ on the level $L_k$;

a direct data output interconnection to a node $N_{Dk}$ on the level $L_k$;

a direct data input interconnection from a node $N_{Cm}$ on the level $L_m$ where m is greater than k so that the level $L_m$ is farther from the destination level $L_0$ than the level $L_k$; and a direct data output interconnection to a device $D_E$ external to the interconnect structure.

21. An interconnect apparatus according to claim 17, wherein a node $N_{Ak}$ on the level $L_k$ has a plurality of interconnections including:

a direct data input interconnection to a node $N_{Bk}$ on the level $L_k$;

a direct data output interconnection to a node $N_{Dk}$ on the level $L_k$;

a direct data input interconnection from a device $D_C$ external to the interconnect structure; and a direct data output interconnection to a node $N_{Ei}$ on the level $L_i$ where k is greater than i so that the level $L_i$ is closer to the destination level $L_0$ than the level $L_k$.

22. An interconnect apparatus according to claim 17, wherein a node $N_{Ak}$ on the level $L_k$ has a plurality of interconnections including:

a direct data input interconnection from a node $N_{Bk}$ on the level $L_k$;

a direct data output interconnection to a node $N_{Dk}$ on the level $L_k$;

a direct data input interconnection from a device $D_C$ external to the interconnect structure; and a direct data output interconnection to a device $D_E$ external to the interconnect structure.

23. An interconnect apparatus according to claim 17, wherein the plurality of nodes are arranged into a plurality of node groups in which all of the nodes of a given group $G_m$ are on the same level $L_k$ and each node of the plurality of nodes is included in only one group of the plurality of groups.

24. An interconnect apparatus according to claim 23, wherein:

a node $N_{Ak}$ in the group $G_m$ on the level $L_k$ has a plurality of interconnections including:

a direct data input interconnection from a node $N_{Bk}$ in the group $G_m$ on the level $L_k$; and a direct data output interconnection to a node $N_{Dk}$ in the group $G_m$ on the level $L_k$.

25. An interconnect apparatus according to claim 17, wherein:

the plurality of nodes are arranged into a plurality of mutually exclusive node groups including a group $G_U$ and a group $G_V$ in which all of the nodes of the group $G_U$ are on the same level $L_k$ and all of the nodes of the group $G_V$ are on the same level $L_i$; and if a node $N_p$ of the group $G_U$ has an interconnect path for sending a message to a node $N_q$ of the group $G_V$, then all nodes of the group $G_U$ have interconnect paths for sending a message to a node of the group $G_V$.

26. An interconnect apparatus according to claim 17, wherein:

the plurality of nodes are arranged into a plurality of mutually exclusive node groups including a group $G_U$ and a group $G_V$ in which all of the nodes of the group $G_U$ are on the same level $L_k$ and all of the nodes of the group $G_V$ are on the same level $L_i$; and if an interconnect path exists for sending a message from a node of the group $G_U$ to a node of the group $G_V$, and the group $G_U$ includes a node $N_p$ and the group $G_V$ includes a node $N_q$, then the interconnect structure includes an interconnect path for sending a message from the node $N_p$ to the node $N_q$.

27. An interconnect apparatus according to claim 17, wherein:

the plurality of nodes are arranged into a plurality of mutually exclusive node groups including a group $G_U$ and a group $G_V$ in which all of the nodes of the group $G_U$ are on the same level $L_k$ and all of the nodes of the group $G_V$ are on the same level $L_i$; and if one node in the group $G_U$ has an interconnect path for sending a message to a node in the group $G_V$, then all nodes in the group $G_U$ have interconnect paths for sending messages to a node in the group $G_V$.

28. An interconnect apparatus according to claim 17, wherein:

a node $N_D$ has a direct input interconnection from a node $N_A$ in the interconnect structure and a direct input interconnection from a device G external to the interconnect structure; and the direct input interconnection from the node $N_A$ has precedence over the direct input interconnection from the external device G so that every message $M_A$ directed from the node $N_A$ to the node $N_D$ successfully moves from the node $N_A$ to the node $N_D$.

29. An interconnect apparatus according to claim 17, wherein:

a node $N_D$ on the level $L_i$ has a direct input interconnection from a node $N_A$ also on the level $L_i$ and a direct input interconnection from a node $N_G$ on the level $L_k$; and direct input interconnection from the node $N_A$ has precedence over the direct input interconnection from the node $N_G$ so that every message $M_A$ directed from the node $N_A$ to the node $N_D$ successfully moves from the node $N_A$ to the node $N_D$.

30. An interconnect apparatus according to claim 17, wherein the interconnect structure:

carries messages and control signals; and includes a node $N_A$ including:
   - a direct message input interconnection for receiving a message $M_A$ having a header;
   - a direct control input interconnection for receiving a control signal $C_A$;
   - a plurality of direct message output interconnections to a respective plurality of subsequent nodes for directing the message $M_A$; and
   - a control logic responsive to the control signal $C_A$ and the header of the message $M_A$ for determining a node of the plurality of subsequent nodes to direct the message $M_A$.

31. An interconnect apparatus according to claim 17, wherein the interconnect structure:

carries messages and control signals;

includes a node $N_D$ including:
   - a direct message input interconnection for receiving a message $M_G$ from a device G external to the interconnect structure; and
   - a direct message input interconnection for receiving a message $M_A$ from a node $N_A$; and the node $N_A$ has a control logic setting a precedence of the direct message input interconnection from the node $N_A$ to the node $N_D$ over the direct message input interconnection from the device G to the node $N_D$ so that, in a discrete time step, if the device G holds the message $M_G$ for entry to the interconnect structure to the node $N_D$ and the node $N_A$ has the message $M_A$ directed to the node $N_D$, then, in the discrete time step, the message $M_A$ is successfully sent from the node $N_A$ to the node $N_D$ and the message $M_G$ is blocked from transmission to the node $N_D$.

32. An interconnect apparatus according to claim 17, wherein the interconnect structure:

carries messages and control signals;

includes a node $N_D$ including:
   - a direct message input interconnection for receiving a message $M_G$ from a device G external to the interconnect structure; and
   - a direct message input interconnection for receiving a message $M_A$ from a node $N_A$; and
   - the device G has a control logic and direct control input interconnection coupled to the control logic for receiving a control signal $C_G$ from the node $N_A$, the control signal $C_G$ enforcing a precedence of the direct message input interconnection from the node $N_A$ to the node $N_D$ over the direct message input interconnection from the device G to the node $N_D$ so that, in a discrete time step, if the device G holds the message $M_G$ for entry to the interconnect structure to the node $N_D$ and the node $N_A$ has the message $M_A$ directed to the node $N_D$, then, in the discrete time step, the message $M_A$ is successfully sent from node $N_A$ to node $N_D$ and the control logic receives the control signal $C_G$ designating a blocking condition and, responsive to the control signal $C_G$ blocking condition, the control logic blocks transmission of the message $M_G$ to the node $N_D$.

33. An interconnect apparatus according to claim 17, wherein the interconnect structure:

carries messages and control signals;

includes a node $N_D$ including:
   - a direct message input interconnection for receiving a message $M_G$ from a device G external to the interconnection structure; and
   - a direct message input interconnection for receiving a message $M_A$ from a node $N_A$; and the device G has a control logic and direct control input interconnection coupled to the control logic from receiving a control signal $C_G$ from the node $N_A$, the control signal $C_G$ enforcing a precedence of the direct message input interconnection from the node $N_A$ to the node $N_D$ over the direct message input interconnection from the device G to the node $N_D$ so that, in a discrete time step, if the device G holds the message $M_G$ for entry to the interconnect structure to the node $N_D$ and the node $N_A$ has no message directed to the node $N_D$, then, in the discrete time step, the control logic does not receive the control signal $C_G$ designating a blocking condition and, responsive to the absence of the control signal $C_G$ blocking condition, the control logic transmits the message $M_G$ to the node $N_D$.

34. An interconnect apparatus according to claim 33, wherein:

in the discrete time step the node $N_A$ is idle.

35. An interconnect apparatus according to claim 33, wherein:

in the discrete time step the node $N_A$ includes a control logic that:
   (1) directs the message $M_A$ to a node $N_E$ distinct from the node $N_D$; and
   (2) sends the control signal $C_G$ designating the absence of the blocking condition.

36. An interconnect apparatus according to claim 17, wherein the interconnect structure:

carries messages and control signals;

includes a node $N_E$ including:
   - a direct message input interconnection for receiving a message $M_A$ from a node $N_A$; and
   - a direct message input interconnection for receiving a message $M_F$ from a node $N_F$; and the node $N_A$ has a control logic and a direct control input interconnection for receiving a control signal $C_A$ from the node $N_F$, the control signal $C_A$ enforcing a precedence of the direct message input interconnection from the node $N_F$ to the node $N_E$ over the direct message input interconnection from the node $N_A$ to the node $N_E$ so that, in a discrete time step, if the message $M_A$ is present at the node $N_A$ and the node $N_F$ has the message $M_F$ directed to the node $N_E$, then, in the discrete time step, the message $M_F$ is successfully sent from node $N_F$ to node $N_E$ and the control logic receives the control signal $C_A$ designating a blocking condition and, responsive to the control signal $C_A$ blocking condition, the control logic blocks transmission of the message $M_A$ to the node $N_E$ and directs the message $M_A$ to a node $N_D$ distinct from the node $N_E$.

37. An interconnect apparatus according to claim 17, wherein the interconnect structure:

carries messages and control signals;

includes a node $N_E$ including:
   - a direct message input interconnection for receiving a message $M_A$ from a node $N_A$, the message $M_A$ having a header; and a direct message input interconnection for receiving a message $M_F$ from a node $N_F$; and the node $N_A$ has control logic and a direct control input interconnection for receiving a control signal $C_A$ from the node $N_F$, the control signal $C_A$ enforcing a precedence of the direct message input interconnection from the node $N_F$ to the node $N_E$ over the direct message input interconnection from the node $N_A$ to the node $N_E$ so that, in a discrete time step, if the message $M_A$ is present at the node $N_A$ and the node $N_F$ has no message $M_F$ directed to the node $N_E$, then, in the discrete time step, the control logic does not receive the control signal $C_A$ designating a blocking condition and, responsive to the absence of the control signal $C_A$ blocking condition, the control logic uses the header of the message $M_A$ to determine a preferred device for transmitting the message $M_A$ and if the preferred device is the node $N_E$, then the message $M_A$ is sent to the node $N_E$.

38. An interconnect apparatus according to claim 37, wherein:

in the discrete time step the node $N_F$ is idle.

39. An interconnect apparatus according to claim 37, wherein:

in the discrete time step the node $N_F$ includes a control logic that:
(1) directs the message $M_F$ to a device distinct from the node $N_E$; and
(2) sends the control signal $C_A$ designating the absence of the blocking condition.

40. An interconnect apparatus according to claim 37, wherein:

a message $M_E$ is present at the node $N_E$, the message $M_E$ having a header designating one or more target output buffers;

if the node $N_E$ has an interconnect path to a node of the plurality of nodes N connected to a target output buffer designated by the message $M_E$, then the control logic of the node $N_A$ directs the message $M_A$ to the node $N_E$; and otherwise the control logic of the node $N_A$ directs the message $M_A$ to a node $N_D$ on the level $L_k$.

41. An interconnect apparatus according to claim 37, further comprising:

a node $N_A$ on the level $L_k$ having a direct data output interconnection to a node $N_E$ on the level $L_i$, the node $N_E$ having an interconnect path to a node $N_H$ that is connected to an output buffer wherein:

if a message $M_A$ is present at the node $N_A$ and has a header designating the output buffer as a target output buffer, and the message $M_A$ is not blocked from transmission to the node $N_E$;

then a message $M_E$ that is directed to the node $N_E$ is sent directly to the node $N_E$; and otherwise the message $M_A$ is sent directly to a node $N_D$ on the level $L_k$.

42. An interconnect apparatus according to claim 37, further comprising:

a node $N_A$ on the level $L_k$, the node $N_A$ including a control logic that utilizes a header information of a message $M_A$ present at the node $N_A$ to ascertain:

whether a direct interconnect exists from the node $N_A$ to a node belonging to a group $G_V$ at the level $L_i$ such that an interconnect path exists from a node in the group $G_V$ to a node $N_H$ that is connected to an output buffer designated as a target output buffer by the message $M_A$; and whether an unblocked node exists in the group $G_V$;

the control logic sending the message $M_A$ to a node of the group $G_V$ if the direct interconnect and the unblocked node exist, and sending the message $M_A$ to a node on the level $L_k$ otherwise.

43. An interconnect apparatus according to claim 17, wherein:

the interconnect structure transmits messages through the interconnect structure in discrete time steps;

the interconnect structure is coupled to one or more output buffers $O_M$, the message M having a header that designates target output buffers $O_M$ of the one or more output buffers $O_M$ to receive the message M;

a selected output buffer $O_M$ of the plurality of output buffers $O_M$ being coupled to a plurality of output target devices and the selected output buffer $O_M$ including a plurality of buffer portions corresponding to and reserved for usage by respective devices of the plurality of output target devices, the message M being allocated to the buffer portions based on a position and a time of insertion into the interconnect structure of the message $M_A$ and the discrete time step timing of transmission of the message M.

44. An interconnect apparatus comprising:

a plurality of nodes; and a plurality of interconnect lines selectively coupling the nodes in an interconnect structure transmitting a message M in a plurality of discrete time steps, in which:

a node $N_D$ has a direct input interconnection from a node $N_A$ in the interconnect structure and a direct input interconnection from a device G external to the interconnect structure; and the direct input interconnection from the node $N_A$ has precedence over the direct input interconnection from the external device G so that a message $M_A$ directed from the node $N_A$ to the node $N_D$ in the same time step as a message $M_G$ directed from the external device G to the node $N_D$ successfully moves from the node $N_A$ to the node $N_D$ and the message $M_G$ is deflected, wherein:

the node $N_A$ distinct from the node $N_D$ has a direct control interconnection to the device G external to the interconnect structure, the control interconnection for sending a message blocking command.

45. An interconnect apparatus, comprising:

a plurality of nodes; and a plurality of interconnect lines selectively coupling the nodes in a hierarchical multiple level structure with the level of a node being determined entirely by the position of the node in the structure in which data moves only unilaterally from a source level to a destination level or laterally along a level of the multiple level structure, a data message being transmitted through the multiple level structure from a source node to a designed destination node, a level of the multiple levels including:

one or more groups of nodes, the data message being transmitted to a group of the one or more groups of nodes that is en routes to the destination node, a group of the one or more groups including:

a plurality of nodes, the data message being transmitted to a node N of the plurality of nodes of a group unilaterally toward the destination level if the node is not blocked and otherwise the data message being transmitted laterally if the node is blocked, a node that transmits unilaterally to the node N being advised of a possible blocking condition at the node N by a node distinct from the node N.

46. An interconnect apparatus according to claim 45, comprising:
a plurality of interconnect lines selectively coupling the nodes in a hierarchical multiple level structure in which control signals move unilaterally from nodes on a level of the multiple levels to nodes on an adjacent sourceward level, the control signals designating whether an en route node is blocked or not blocked.

47. An interconnect apparatus according to claim 45, wherein:
an en route node on a level receives a data message transmitted laterally along the same level with precedence over a data message transmitted unilaterally from a node on an adjacent sourceward level, the en route node enforcing the precedence by transmitting a control signal to a node on the adjacent sourceward level indicating that the en route node is blocked.

48. An interconnect apparatus according to claim 45, wherein:
an en route node on a level receives a data message transmitted laterally along the same level with precedence over a data message transmitted unilaterally from a node on an adjacent sourceward level.

49. A method of moving messages M through an interconnect structure including a plurality of nodes N and a plurality of interconnect lines L to a plurality of output buffers B, the method comprising:
selectively coupling the plurality of nodes N via the plurality of interconnect lines L so that an interconnect line L(p,q) carries data directly from a node p to a node q;
determining for a message M a set of nodes O(M) so that the output buffers B that are targets of the message M are connected to the set of nodes O(M);
if the message M is located at the node p at a time t then at the time t, moving the message M on an interconnect line L(p,w) so that at time t+1, the message M is located at a node w, where the node w and the node p are different nodes;
if the message M is located at the node p at the time t and the shortest path from the node p to a node of the set of nodes O(M) includes traversal of H interconnect lines L so that the node p is H hops from the nodes O(M), determining an interconnect line L(p,q) so that the shortest path from the node q to a node of the set of nodes O(M) includes traversal of H−1 interconnect lines L so that the node q is H−1 hops from the nodes O(M);
if at time t, the message M is not blocked from using the interconnect line L(p,q) by a control signal originating from a node other than the node q, than at time t, sending the message M on the interconnect line L(p,q) so that at time t+1, the message M is located at the node q; and
if at time t, the message M is blocked from using the interconnect line L(p,q) by a control signal originating from a node other that the node q, then at time t, sending the message M on an interconnect line L(p,r), where the node r and the node p are different nodes and the node r and the node q are different nodes, then at time t+1, sending the message M on the interconnect line L(r,s), where the node s and the node p are different nodes, the node s and the node q are different nodes, the node s and the node r are different nodes, and the shortest path from the node s to a node of the plurality of nodes O(M) includes traversal of no more than H interconnect lines L so that the node s is no more than H hops from the nodes O(M).

50. A network communicating messages in a sequence of discrete time steps, the network comprising:
a plurality of nodes, the nodes including communication devices that receive messages and send messages; and
a plurality of interconnect lines L interconnecting communication devices at the plurality of nodes, a node N of the plurality of nodes including:
a connection to an interconnect line $L_{UN}$ for transmitting a message from a device U to the node N;
a connection to an interconnect line $L_{VN}$ for transmitting a message from a device V to the node N;
the network having a precedence relationship $P_N(U,V)$ relating to the node N and the devices U and V such that the device U has precedence over the device V in sending a message to the node N so that for a message $M_U$ at the device U that is directed to the node N via the interconnect line $L_{UN}$ at a time step t and a message $M_V$ at the device V that is directed to the node N via the interconnect line $L_{VN}$ also at a time step t, the message $M_U$ is successfully sent to the node N and the node V uses a control signal from a node not capable of receiving a message directly from the node V to decide where to send the message $M_V$.

51. A network according to claim 50, wherein:
the message $M_V$ is blocked.

52. A network according to claim 50, further comprising:
a node W of the plurality of nodes including:
a connection to an interconnect line $L_{VW}$ for transmitting a message from a device V to the node W;
the message $M_V$ is deflected to the node W.

53. A method of moving messages M through an interconnect structure including a plurality of nodes N and a plurality of interconnect lines L to a plurality of output buffers B in a sequence of discrete time steps, the method comprising:
selectively coupling the plurality of nodes N via the plurality of interconnect lines L so that an interconnect line L(p,q) carries data directly from a node p to a node q;
determining for a message M a set of nodes O(M) so that the output buffers B that are selected to receive the message M are connected to the set of nodes O(M);
if the message M is located at the node p at a time t then at the time t, moving the message M on an interconnect line L(p,w) so that at time t+1, the message M is located at a node w, where the node w and the node p are different nodes;
if the message M is located at the node p at the time t and the shortest path from the node p to a node of the set of nodes O(M) includes traversal of H interconnect lines L so that the node p is H hops from the nodes O(M), determining an interconnect line L(p,q) so that the shortest path from the node q to a node of the set of nodes O(M) includes traversal of H−1 interconnect lines L so that the node q is H−1 hops from the nodes O(M);
if at time t, the message M is not blocked from using the interconnect line L(p,q) by a control signal originating from a node other than the node q, then at time t, sending the message M on the interconnect line L(p,q) so that at time t+1 the message M is located at the node q; and if at time t, the message M is blocked from using the interconnect line L(p,q) by a control signal originating from a node other than the node q, then at time t, sending the message M on an interconnect line L(p,r), where the node r and the node p are different nodes and the node r and the node q are different nodes, and a path exists from the node r to the set of nodes O(M) that does not pass through the node p and traverses no more than H+1 hops.

54. A method according to claim 53, further comprising: at time t+1, sending the message M on the interconnect line L(r,s), where the node s and the node p are different nodes, the node s and the node q are different nodes, the node s and the node r are different nodes, and the shortest path from the node s to the node of the plurality of nodes O(M) includes traversal of no more than H interconnect lines L.

55. A network comprising:
a plurality of nodes N; and
a plurality of interconnect lines L connecting the plurality of nodes N in a predetermined pattern, the interconnect lines carrying messages M and control signals C, the messages M and control signals C being received by a node of the plurality of nodes at a discrete time step t and the messages M being moved to subsequent nodes of the plurality of nodes in an immediately subsequent discrete time step t+1, the plurality of interconnect lines L connecting the plurality of nodes N to include:
a node $N_A$ having a message input interconnection for receiving a message $M_A$, a control input interconnection for receiving a control signal $C_A$, a direct message output interconnection to a node $N_D$, a direct message output interconnection to a node $N_E$, a direct control output interconnection to a device G, and a control logic for determining whether the message $M_A$ is sent to the node $N_D$ or the node $N_E$ based on:
(1) the control signal $C_A$ from a source distinct from the node $N_D$ and the node $N_E$;
(2) a location of the node $N_A$ within the plurality of interconnect lines L; and
(3) a routing information contained in the message $M_A$.

56. A network according to claim 55, wherein: the device G is an external device.

57. A network according to claim 55, wherein: the device G is node $N_G$.

58. A network according to claim 55, wherein: the control signal $C_A$ is sent by a node $N_F$ that is distinct from the node $N_A$, the device G, the node $N_D$, and the node $N_E$.

59. An interconnect apparatus comprising:
a plurality of nodes N; and
a plurality of interconnect lines L connecting the plurality of nodes N in a predetermined pattern, the plurality of interconnect lines L connecting the plurality of nodes N to include:
a node $N_A$ having a direct message input interconnection for receiving a message $M_A$ and having a plurality of direct message output interconnections for transmitting the message $M_A$ to a plurality of nodes including a preferred node $N_P$ being most preferred for receiving the message $M_A$, the preferred node $N_P$ being determined only by routing information in a header of the message $M_A$ and the position of the node $N_A$ within the plurality of interconnect lines L;
the preferred node $N_P$ having a plurality of direct message input interconnections for receiving a message $M_P$ from a plurality of nodes including a priority node $N_B$ which has priority for sending a message to the preferred node $N_P$, the priority node $N_B$ being determined by position of the node $N_B$ within the plurality of interconnect lines L so that:
if the node $N_A$ is the same as the node $N_B$, then the message $M_A$ is the message $M_P$ and is sent from the node $N_A$ to the node $N_P$; and
if the node $N_A$ is not the same as the node $N_B$ and the node $N_B$ directs a message $M_B$ to the node $N_P$, then the message $M_B$ is sent from the node $N_B$ to the node $N_P$, and the node $N_A$ uses a control signal to determine where to send the message $M_A$, the control signal not originating from a node capable of receiving a message directly from the node $N_A$.

60. A network capable of carrying a plurality of messages M concurrently comprising:
a plurality of output ports P;
a plurality of nodes N, the individual nodes N including a plurality of direct message input interconnections and a plurality of direct message output interconnections, the individual nodes N for passing messages M to predetermined output ports of the plurality of output ports P, the predetermined output ports P being designated by the message M; and
a plurality of interconnect lines in an interconnect structure selectively coupling the nodes in a hierarchical multiple level structure arranged to include a plurality of J+1 levels in an hierarchy of levels arranged from a lowest destination level $L_0$ to a highest level $L_J$ which is farthest from the lowest destination level $L_0$, the output ports P being connected to nodes at the lowest destination level $L_0$, the level of a node being determined entirely by the position of the node in the structure,
the network including a node $N_A$ of the plurality of nodes N, a control signal not originating at the node $N_A$ acting to limit the number of messages that are allowed to be sent to the node $N_A$, to eliminate contention for the predetermined output ports of the node $N_A$ so that the messages M are sent through the direct message output connections of the node $N_A$ to nodes $N_H$ that are a level L no higher than the level of the node $N_A$, the nodes $N_H$ being on a path to the designated predetermined output ports P of the message M.

61. An interconnect apparatus, comprising:
a plurality of nodes; and
a plurality of interconnect lines in an interconnect structure selectively coupling the nodes in a hierarchical multiple level structure arranged to include:
a plurality of J+1 levels with J an integer greater than 0 in an hierarchy of levels arranged from a lowest destination level $L_0$ to a highest level $L_J$ with the level of a node being determined entirely by the position of the node in the structure, the interconnect structure transmitting a plurality of multiple-bit messages entering the interconnect structure unsorted through a plurality of input ports, an individual message M of the plurality of messages being self-routing, the individual message M moving in a plurality of ways including three ways which are sufficient for the message M to exit the interconnect structure through an output port designated by the message M, the three ways being:

(1) the message M enters a node in the interconnect structure from a device external to the interconnect structure, the message M designating one or more designated output ports;

(2) the message M moves through an node in the interconnect structure without buffering to a designated output port; and (3) the message M moves either through a node U on a level $L_k$ of the interconnect structure without buffering to a different node V on the same level $L_k$ or moves through the node U on a level $L_k$ of the interconnect structure without buffering to a node W on a level $L_i$ nearer in the hierarchy to the destination level $L_0$ than the level $L_k$, and the node U uses a control signal from a source distinct from the node V and the node W to determine where to send the message M.

62. An interconnect apparatus as claimed in claim 61, wherein a node $N_{AK}$ on the level $L_k$ has a plurality of interconnections including:

a direct data input interconnection from a node $N_{Bk}$ on the level $L_k$;

a direct data output interconnection to a node $N_{Dk}$ on the level $L_k$;

a direct data input interconnection from a node $N_{Cm}$ on a level $L_m$ where m is greater than k, or from a device $D_c$ external to the interconnect structure; and a direct data output interconnection to a device $D_E$ external to the interconnect structure, or a direct data output interconnection to a node $N_{Ei}$ on the level $L_i$ where k is greater than i so that the level $L_i$ is closer in the hierarchy to the destination level $L_0$.

63. An interconnected apparatus as claimed in claim 62, wherein:

among devices having a direct interconnection to the node $N_{Ak}$, a precedence relationship exists for sending data to the node $N_{Ak}$ so that:

a node $N_{Bk}$ on the level $L_k$ having a direct interconnection to the node $N_{Ak}$ has precedence over a device $D_C$ where the device $D_C$ is a node $N_{Ci}$ on the level $L_i$ or a device $D_C$ external to the interconnect structure;

the precedence relationship for a message $M_B$ to be sent from the node $N_{Bk}$ to the node $N_{Ak}$ and a message $M_C$ to be sent from the device $D_C$ to the node $N_{Ak}$ in a same time interval results in the message $M_B$ being sent and the message $M_C$ prevented from being sent.

64. An interconnect apparatus as claimed in claim 61, wherein the interconnect structure:

carries messages and control signals;

including a node $N_E$ including:

a direct message input interconnection for receiving a message $M_A$ from a node $N_A$; and a direct message input interconnection for receiving a message $M_F$ from a node $N_F$; and the node $N_A$ has a control logic and a control input interconnection for receiving a control signal $C_A$ from the node $N_F$, the control signal $C_A$ enforcing a precedence of the direct message input interconnection from the node $N_F$ to the node $N_E$ over the message input interconnection from the node $N_A$ to the node $N_E$ so that the node $N_F$ sends a message $M_F$ to the node $N_E$ and sends a control signal $C_A$ designating a blocking condition to the node $N_A$, the node $N_A$ control logic receives the control signal $C_A$ designating the blocking condition and responds to the control signal $C_A$ by blocking transmission of the message $M_A$ destined to arrive at the node $N_E$ at the same time as the message $M_F$, causing the blocked message $M_A$ to be alternatively sent to a node $N_D$ where the node $N_D$ is distinct from the node $N_E$ and the node $N_D$ is distinct from the node $N_A$.

65. An interconnect apparatus as claimed in claim 61, wherein the interconnect structure:

carries messages and control signals;

includes a node $N_E$ including:

a direct message input interconnection for receiving a message $M_A$ from a node $N_A$, the message $M_A$ having a header; and a direct message input interconnection for receiving a message $M_F$ from a node $N_F$; and the node $N_A$ has a control logic and a control input interconnection for receiving a control signal $C_A$ from the node $N_F$, the control signal $C_A$ enforcing a precedence of the direct message input interconnection from the node $N_F$ to the node $N_E$ over the direct message input interconnection from the node $N_A$ to the node $N_E$ so that a message $M_A$ arriving at the node $N_A$ in the absence of a blocking control signal $C_A$ in a same time interval causes the node $N_A$ control logic to use a header of the message $M_A$ to determine a selected device for transmitting the message $M_A$, in case the selected device is the node $N_E$ then the message $M_A$ being sent to the node $N_E$.

66. An interconnect apparatus as claimed in claim 65, wherein:

the control logic of node $N_{Ak}$ determines:

whether in a first condition, the node $N_{Ak}$ has a direct output interconnection to a node $N_{Ei}$ on the level i nearer in the hierarchy to the destination level $L_0$ than the level $L_k$ in which the node $N_{Ei}$ has a pathway to a designated output port designated by the message $M_A$; and whether, in a second condition, the node $N_{Ei}$ is unblocked by another message; and the control logic of node $N_{Ak}$, when the first and second conditions are satisfied, sends the message $M_A$ to the node $N_{Ei}$; and the control logic of node $N_{Ak}$, when the first and second conditions are not both satisfied, sends the message $M_A$ to a node $N_D$ where node $N_{Ak}$ and node $N_{Dk}$ are distinct and the node $N_{Ei}$ and the node $N_D$ are distinct.

67. An interconnect apparatus as claimed in claim 61, further comprising:

a plurality of output ports including a plurality of accessible output ports that are accessible to a node $N_{Ak}$ on the level $L_k$, the accessible output ports being accessible via a pathway through the interconnect nodes; and each of the accessible output ports accessible to the node $N_{Ak}$ also being accessible to a node $N_{Ef}$ on a level $L_l$ nearer in the hierarchy to the destination level $L_o$ than the level $L_k$, the node $N_{Ak}$ having a direct output interconnection to the node $N_{Ei}$.

68. An interconnect apparatus as claimed in claim 61, wherein:

a node $N_E$ has a first data input interconnection from a node $N_A$ and a second data input interconnection from a node $N_F$; and a control interconnection between the node $N_A$ and node $N_F$ resolves contention for sending messages to the node $N_E$.

69. An interconnect apparatus as claimed in claim 61, further comprising:

a node $N_{Ck}$ on the level $L_k$ having a direct data output interconnection to a node $N_{Ai}$ on a level $L_i$ nearer in the hierarchy to the destination level $L_0$ than the level $L_k$, and having a precedence relationship with respect to a message $M_C$ which, at a time T, moves through the node $N_C$ and is preferentially sent to the node $N_A$, but is blocked from node $N_A$ by a message $M_B$ so that the message $M_C$ is deflected to a node on the level $L_k$ distinct from node $N_{Ck}$;

a node $N_{Gk}$ on the level $L_k$ having a direct data output interconnection to a node $N_{Di}$ on the level $L_i$, the node $N_{Di}$ having a pathway through the interconnect nodes to an accessible output port accessible to the message $M_C$, the message $M_C$ being deflected to pass through the node $N_{Gk}$ at a time T', a first time step following the time T that a node directs message $M_C$ to a lower level;

wherein the interconnect structure disallows the message $M_B$ from being in a position to block the message $M_C$ at the time T'.

70. A network according to claim 61 further comprising:

nodes B and C on a level $L_{j-1}$ that are nodes capable of receiving a message directly from the node A on a level $L_j$, devices D and E, each of which is either a node on a level $L_{j-N}$ where N is greater than 1 or a device external to the network, the node B being capable of sending a message directly to the device D, the node C being capable of sending a message directly to the device E, the device D being incapable of sending a message directly or indirectly to the device E, the device E being incapable of sending a message directly or indirectly to the device D.

71. An interconnect structure comprising:

a plurality of nodes; and a plurality of interconnect lines in an interconnect structure selectively coupling the nodes in a structure, the interconnect structure transmitting a plurality of multiple-bit messages entering the interconnect structure unsorted through a plurality of input ports, an individual message M of the plurality of message being self-routing, the interconnect structure including:

a node $N_E$ having a first data input interconnection from a node $N_A$ and a second data input interconnection from a node $N_F$ distinct from the node $N_A$; and a control interconnection between the node $N_A$ and node $N_F$ the control interconnection for carrying a control signal to resolve contention for sending messages to the node $N_F$, the control signal being supplied from the node $N_A$ or the node $N_F$ each distinct from the node $N_F$ with which messages are being communicated.

72. An interconnect apparatus as claimed in claim 71, wherein the interconnect structure:

carries messages and control signals;

includes a node $N_E$ including:

a direct message input interconnection for receiving a message $M_A$ from a node $N_A$; and a direct message input interconnection for receiving a message $M_F$ from a node $N_F$; and the node $N_A$ has a control logic and a control input interconnection for receiving a control signal $C_A$ from the node $N_F$, the control signal $C_A$ enforcing a precedence of the direct message input interconnection from the node $N_F$ to the node $N_E$ over the message input interconnection from the node $N_A$ to the node $N_E$ so that the node $N_F$ sends a message $M_F$ to the node $N_E$ and sends a control signal $C_A$ designating a blocking condition to the node $N_A$, the node $N_A$ control logic receives the control signal $C_A$ designating the blocking condition and responds to the control signal $C_A$ by blocking transmission of the message $M_A$ destined to arrive at the node $N_E$ at the same time as the message $M_F$, causing the blocked message $M_A$ to be alternatively sent to a node $N_D$ where the node $N_D$ is distinct from the node $N_E$ and the node $N_D$ is distinct from the node $N_A$.

73. An interconnect apparatus as claimed in claim 72, wherein the interconnect structure:

carries messages and control signals;

includes a node $N_E$ including:

a direct message input interconnection for receiving a message $M_A$ from a node $N_A$, the message $M_A$ having a header; and a direct message input interconnection for receiving a message $M_F$ from a node $N_F$; and the node $N_A$ has a control logic and a control input interconnection for receiving a control signal $C_A$ from the node $N_F$, the control signal $C_A$ enforcing a precedence of the direct message input interconnection from the node $N_F$ to the node $N_E$ over the direct message input interconnection from the node $N_A$ to the node $N_E$ so that a message $M_A$ arriving at the node $N_A$ in the absence of a blocking control signal $C_A$ in a same time interval causes the node $N_A$ control logic to use a header of the message $M_A$ to determine a selected device for transmitting the message $M_A$, in case the selected device is the node $N_E$ then the message $M_A$ being sent to the node $N_E$.

74. A method of moving messages through an interconnect structure comprising:

interconnecting a plurality of devices in a structure, the devices having a plurality of message input terminals and a plurality of message output terminals, a plurality of interconnect lines interconnecting the device with connections from a message output terminal of a sending device to a message input terminal of a receiving device;

assigning a priority among a plurality of sending devices having output message terminals coupled to the input message terminal of a single receiving device;

entering a message into the interconnect structure for transfer to one or more designated output ports;

sending a message, without buffering, from a sending device to a receiving device en route to the one or more output ports using self-routing, with the sending device neither requesting of the receiving device nor receiving from the receiving device, permission to send the message to the receiving device;

communicating among a plurality of sending devices that send messages to a single receiving device, a sending device with priority for sending messages to the single receiving device having a control signal output terminal connected by an interconnect line to a control signal input terminal of a sending device without priority, the sending device with priority sending a control signal to the sending device without priority;

deflecting a message intended to be sent from a sending device without priority to an intended receiving device, the deflected message being deflected to an alternative receiving device, the alternative receiving device also being en route to the one or more output ports, the message being deflected on the basis of a control signal being supplied from a node distinct from the node with which message are being communicated.

75. A method of moving messages through an interconnect structure comprising:

interconnecting a plurality of devices D to a node $N_E$ using a plurality of direct node $N_E$ input interconnections;

enforcing a precedence relationship among the devices D having a direct input interconnection to the node $N_E$ for sending a message to the node $N_E$;

sending a message $M_A$ from a node $N_A$ to the node $N_E$ in a time period T when:

in the time period T a message $M_A$ moves through a node $N_A$ having a direct input interconnection to the node $N_E$, the message $M_A$ is directed to be sent to the node $N_E$ in the time period T, and no message $M_F$ directed to be sent to the node $N_E$ or deflected to the node $N_E$ moves through a node $N_F$ having a direct input interconnection to the node $N_E$ in the time period T in which the node $N_F$ has precedence over the node $N_A$ for sending messages to node $N_E$.

76. A method as claimed in claim 75 further comprising:

aborting the sending of message $M_A$ to the node $N_A$ in the time period T if, in the time period T, the node $N_F$ sends a message $M_F$ to the node $N_E$.

77. A method as claimed in claim 76, further comprising:

sending the message $M_A$, aborted with respect to node $N_A$, to a node $N_D$, the node $N_D$ being distinct from the node $N_A$ and the node $N_E$.

78. A method as claimed in claim 77, further comprising:

sending a control signal, by the node $N_F$ to the node $N_A$ causing the message $M_A$ to be aborted with respect to the node $N_A$ and enforcing the precedence relationship.

79. A method of moving messages M through an interconnect structure including a plurality of nodes N and a plurality of interconnect lines L to a plurality of output buffers B, the method comprising:

selectively coupling the plurality of nodes N via the plurality of interconnect lines L so that an interconnect line L(p,q) carries data directly from a node p to a node q;

determining for a message M a set of nodes O(M) so that the output buffers B that are targets of the message M are connected to the set of nodes O(M);

if the beginning of the message M is located at the node p at a step t then at the step t, moving the message M on an interconnect line L(p,w) so that at a step t+1, the beginning of the message M is located at a node w, where the node w and the node p are different nodes;

if the beginning of the message M is located at the node p at the step t and the shortest path from the node p to a node of the set of nodes O(M) is H hops, determining an interconnect line L(p,q) so that the shortest path from the node q to a node of the set of nodes O(M) is H−1 hops;

if at the step t, the message M is not blocked from using the interconnect line L(p,q) by a control signal originating from a node other than the node q, then at the step t, sending the beginning of the message M on the interconnect line L(p,q) so that at the step t+1, the message M is located at the node q; and if at the step t, the message M is blocked from using the interconnect line L(p,q) by a control signal originating from a node other than the node q, then at the step t, sending the message M on an interconnect line L(p,r), where the node r and the node p are different nodes and the node r and the node s are different nodes, than at the step t+1, sending the message M on the interconnect line L(r,s), where the node s and the node p are different nodes, the node s and the node q are different nodes and the node s and the node r are different nodes, and the shortest path from the node s to a node of the plurality of nodes O(M) is no more than H hops.

80. A method of moving messages M through an interconnect structure including a plurality of nodes N and a plurality of interconnect lines L to a plurality of output buffers B, the method comprising:

selectively coupling the plurality of nodes N via the plurality of interconnect line L so that an interconnect line L(p,q) carries data directly from a node p to a node q;

determining for a message M a set of nodes O(M) so that the output buffers B that are targets of the message M are connected to the set of nodes O(M);

if a beginning portion of the message M is located at the node p at a step t then at the step t, moving the message M on an interconnect line L(p,w) so that at a step t+1, the beginning of the message M is located at a node w, where the node w and the node p are different nodes;

if the beginning of the message M is located at the node p at the step t and the shortest path from the node p to a node of the set of nodes O(M) is H hops, determining an interconnect line L(p,q) so that the shortest path from the node q to a node of the set of nodes O(M) is H−1 hops;

if at the step t, the message M is not blocked from using the interconnect line L(p,q) by a control signal originating from a node other than the node q, then at the step t, sending the message M on the interconnect line L(p,q) so that at the step t+1, the beginning portion of the message M is located at the node q; and if at the step t, the message M is blocked from using the interconnect line L(p,q) by a control signal originating from a node other than the node q, then at the step t, sending the message M on an interconnect line L(p,r), where the node r and the node p are different nodes and the node r and the node q are different nodes, and the shortest path from the node r to a node of the plurality of nodes O(M) is no more than H hops.

81. A method of sending data comprising:

providing an interconnect apparatus including a plurality of nodes N and a plurality of interconnect lines L connecting the plurality of nodes N in a predetermined pattern;

connecting the plurality of nodes N using the plurality of interconnect lines L to include:

a node $N_A$ having a direct message input interconnection for receiving a message $M_A$ and having a plurality of direct message output interconnections for transmitting the message $M_A$ to a plurality of nodes including a preferred node $N_P$ being most preferred for receiving the message $M_A$, the preferred node $N_P$ being only determined by routing information in a header of the message $M_A$ and the position of the node $N_A$ within the plurality of interconnect lines L;

the preferred node $N_P$ having a plurality of direct message input interconnections for receiving a message $M_P$ from a plurality of nodes including a priority node $N_B$ which has priority for sending a message to the preferred node $N_P$, the priority node $N_B$ being determined by position of the node $N_B$ within the plurality of interconnect lines L;

if the node $N_A$ is the same as the node $N_B$, sending the message $M_A$ as the message $M_P$ from the node $N_A$ to the node $N_P$; and if the node $N_A$ is not the same as the node $N_B$ and the node $N_B$ directs a message $M_B$ to the node $N_P$, then sending the message $M_B$ from the node $N_B$ to the node $N_P$, and the node $N_A$ uses a control signal from a source distinct from the node $N_P$ to determine where to send the message $M_A$.

82. A method of sending messages comprising:

providing a network for carrying a plurality of messages M concurrently including:
- a plurality of output ports P; and
- a plurality of nodes N, the individual nodes N including a plurality of direct message input interconnections and a plurality of direct message output interconnections, the individual nodes N for passing messages M to predetermined output ports of the plurality of output ports P, the predetermined output ports P being designated by the messages M; and
- a plurality of interconnect lines in an interconnect structure;

selectively coupling the nodes in a hierarchical multiple level structure to include a plurality of J+1 levels with J an integer greater than 0 in an hierarchy of levels arranged from a lowest destination level $L_0$ to a highest level $L_J$ which is farthest in the hierarchy from the lowest destination level $L^0$, the level of a node being determined entirely by the position of the node in the structure, the output ports P being connected to nodes at the lowest destination level $L_D$, including in the network a node $N_A$ of the plurality of nodes N;

limiting the number of messages M that are allowed to enter the plurality of direct message input interconnections of node $N_A$ by using a control signal not originating at the node $N_A$ to eliminate contention for the predetermined output ports of the node $N_A$ so that the messages M are sent through the direct message output connections of the node $N_A$ to nodes $N_H$ that are a level L no higher than the level of the node $N_A$, the nodes $N_H$ being on a path to the designated predetermined output ports P of the messages M.

83. A method of transmitting a message through an hierarchical interconnect structure including a plurality of nodes and a plurality of interconnect lines, the method comprising:

selectively coupling the nodes in an hierarchical multiple level structure arranged to include a plurality of J+1 levels with J an integer greater than 0 in an hierarchy of levels arranged from a lowest destination level $L_0$ to a highest level $L_J$, the level of a node being determined entirely by the position of the node in the structure;

entering a plurality of messages into the interconnect structure unsorted through a plurality of input ports;

moving, using self-routing, an individual message M of the plurality of messages through nodes, the message M moving in a plurality of ways including three ways which are sufficient for the message M to exit the interconnect structure through an output port designated by the message M, the three ways including:

(1) entering the message M to a node in the interconnect structure from a device external to the interconnect structure, the message M designating one or more designated output ports;

(2) moving the message M through a node in the interconnect structure without buffering to a designated output port; and (3) moving the message M either through a node U on a level $L_k$ of the interconnect structure without buffering to a different node V on the same level $L_k$, the different node V also having a pathway to a designated output port; or moving the message M through the node U on the level $L_k$ of the interconnect structure without buffering to a node W on a level $L_i$ nearer in the hierarchy to the destination level $L_0$ than the level $L_k$, the node U using a control signal from a source distinct from the node V and the node W to determine where to send the message M.

* * * * *